US012598300B2

(12) United States Patent
Zhang et al.

(10) Patent No.: US 12,598,300 B2
(45) Date of Patent: Apr. 7, 2026

(54) CODING MODE DEPENDENT SELECTION OF TRANSFORM SKIP MODE

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Yuhuai Zhang, Beijing (CN); Hongbin Liu, Beijing (CN); Yue Wang, Beijing (CN); Siwei Ma, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 151 days.

(21) Appl. No.: 18/172,129

(22) Filed: Feb. 21, 2023

(65) Prior Publication Data

US 2023/0199177 A1 Jun. 22, 2023

Related U.S. Application Data

(63) Continuation of application No. PCT/CN2021/113978, filed on Aug. 23, 2021.

(30) Foreign Application Priority Data

Aug. 23, 2021 (WO) ................ PCT/CN2021/113978

(51) Int. Cl.
*H04N 19/18* (2014.01)
*H04N 19/105* (2014.01)
(Continued)

(52) U.S. Cl.
CPC ......... *H04N 19/122* (2014.11); *H04N 19/105* (2014.11); *H04N 19/132* (2014.11);
(Continued)

(58) Field of Classification Search
CPC .. H04N 19/122; H04N 19/105; H04N 19/132; H04N 19/159; H04N 19/176;
(Continued)

(56) References Cited

U.S. PATENT DOCUMENTS 8,879,632 B2 11/2014 Joshi
9,008,182 B2 4/2015 Tsai
(Continued)

FOREIGN PATENT DOCUMENTS

CN 101083767 A 12/2007
CN 101415121 A 4/2009
(Continued)

OTHER PUBLICATIONS

Non-Final Office Action from U.S. Appl. No. 18/172,110 dated Sep. 18, 2024, 21 pages.
(Continued)

*Primary Examiner* — Nguyen T Truong
(74) *Attorney, Agent, or Firm* — Conley Rose, P.C.

(57) ABSTRACT

Methods, system and apparatus for video processing are described. One example method of processing video data includes performing a conversion between a current block of a video and a bitstream of the video according to a rule. The rule specifies that whether a transform skip mode is enabled is determined based on coding information of the current block. The transform skip mode is a coding mode in which a transform is skipped on a prediction residual of a video block.

18 Claims, 29 Drawing Sheets

(51) Int. Cl.

| | |
|---|---|
| *H04N 19/122* | (2014.01) |
| *H04N 19/132* | (2014.01) |
| *H04N 19/159* | (2014.01) |
| *H04N 19/176* | (2014.01) |
| *H04N 19/593* | (2014.01) |
| *H04N 19/61* | (2014.01) |
| *H04N 19/70* | (2014.01) |

(52) U.S. Cl.
CPC ......... *H04N 19/159* (2014.11); *H04N 19/176* (2014.11); *H04N 19/18* (2014.11); *H04N 19/593* (2014.11); *H04N 19/61* (2014.11); *H04N 19/70* (2014.11)

(58) Field of Classification Search
CPC ...... H04N 19/18; H04N 19/593; H04N 19/61; H04N 19/70
USPC ...................................................... 375/240.02
See application file for complete search history.

(56) References Cited

U.S. PATENT DOCUMENTS

| | | | |
|---|---|---|---|
| 9,088,770 | B2 | 7/2015 | Zhang |
| 9,357,214 | B2 | 5/2016 | Zhang |
| 9,432,685 | B2 | 8/2016 | Chon |
| 9,491,461 | B2 | 11/2016 | Chen |
| 9,538,180 | B2 | 1/2017 | Zhang |
| 9,549,180 | B2 | 1/2017 | Chen |
| 9,609,347 | B2 | 3/2017 | Thirumalai |
| 9,699,450 | B2 | 7/2017 | Zhang |
| 9,716,899 | B2 | 7/2017 | Thirumalai |
| 9,749,645 | B2 | 8/2017 | Li |
| 9,800,895 | B2 | 10/2017 | Thirumalai |
| 9,924,168 | B2 | 3/2018 | Zhang |
| 9,948,953 | B2 | 4/2018 | Zhang |
| 10,045,014 | B2 | 8/2018 | Zhang |
| 10,057,574 | B2 | 8/2018 | Li |
| 10,057,594 | B2 | 8/2018 | Xiu |
| 10,165,252 | B2 | 12/2018 | An |
| 10,171,818 | B2 | 1/2019 | Peng |
| 10,200,719 | B2 | 2/2019 | Zhang |
| 10,218,975 | B2 | 2/2019 | Chien |
| 10,264,271 | B2 | 4/2019 | Li |
| 10,326,986 | B2 | 6/2019 | Zhang |
| 10,362,330 | B1 | 7/2019 | Li |
| 10,390,046 | B2 | 8/2019 | Joshi |
| 10,397,603 | B1 | 8/2019 | Li |
| 10,448,010 | B2 | 10/2019 | Chen |
| 10,462,439 | B2 | 10/2019 | He |
| 10,469,847 | B2 | 11/2019 | Xiu |
| 10,484,686 | B2 | 11/2019 | Xiu |
| 10,506,230 | B2 | 12/2019 | Zhang |
| 10,523,963 | B1 | 12/2019 | Ye |
| 10,560,704 | B2 | 2/2020 | Peng |
| 10,560,718 | B2 | 2/2020 | Lee |
| 10,567,789 | B2 | 2/2020 | Chen |
| 10,567,799 | B2 | 2/2020 | Liu |
| 10,687,079 | B2 | 6/2020 | Liu |
| 10,721,469 | B2 | 7/2020 | Zhang |
| 10,721,489 | B2 | 7/2020 | Chen |
| 10,735,749 | B2 | 8/2020 | Li |
| 10,778,974 | B2 | 9/2020 | Karczewicz |
| 10,785,494 | B2 | 9/2020 | Chien |
| 10,855,985 | B2 | 12/2020 | Zhang |
| 11,128,884 | B2 | 9/2021 | Liu |
| 11,159,793 | B2 | 10/2021 | Ahn |
| 11,425,378 | B2 | 8/2022 | Chiang |
| 11,463,687 | B2 | 10/2022 | Zhang |
| 11,509,893 | B2 | 11/2022 | Zhang |
| 11,575,911 | B2 | 2/2023 | Zhang |
| 12,120,314 | B2 | 10/2024 | Zhang |
| 12,328,432 | B2 | 6/2025 | Zhang |
| 2005/0111545 | A1 | 5/2005 | Prabhakar |
| 2008/0163383 | A1 | 7/2008 | Kumar |

| | | | | |
|---|---|---|---|---|
| 2009/0196342 | A1 | 8/2009 | Divorra Escoda | |
| 2010/0124286 | A1 | 5/2010 | Wang | |
| 2011/0176613 | A1 | 7/2011 | Tsai | |
| 2011/0200110 | A1 | 8/2011 | Chen | |
| 2011/0228854 | A1 | 9/2011 | Shin | |
| 2012/0177114 | A1 | 7/2012 | Guo | |
| 2012/0207227 | A1 | 8/2012 | Tsai | |
| 2013/0084147 | A1 | 4/2013 | Abiva | |
| 2013/0107973 | A1 | 5/2013 | Wang | |
| 2013/0114730 | A1 | 5/2013 | Joshi | |
| 2013/0188733 | A1 | 7/2013 | Van Der Auwera | |
| 2013/0272414 | A1 | 10/2013 | Sole Rojals | |
| 2013/0294513 | A1 | 11/2013 | Seregin | |
| 2013/0329007 | A1 | 12/2013 | Zhang | |
| 2013/0336406 | A1 | 12/2013 | Zhang | |
| 2014/0050266 | A1 | 2/2014 | Zhang | |
| 2014/0071235 | A1 | 3/2014 | Zhang | |
| 2014/0092978 | A1 | 4/2014 | Bugdayci | |
| 2014/0169452 | A1 | 6/2014 | Lim | |
| 2014/0294067 | A1 | 10/2014 | Li | |
| 2015/0078457 | A1 | 3/2015 | Hendry | |
| 2015/0085929 | A1 | 3/2015 | Chen | |
| 2015/0110180 | A1 | 4/2015 | An | |
| 2015/0264403 | A1 | 9/2015 | Chong | |
| 2015/0271515 | A1 | 9/2015 | Pang | |
| 2015/0373359 | A1 | 12/2015 | He | |
| 2016/0100186 | A1 | 4/2016 | Gisquet | |
| 2016/0100189 | A1 | 4/2016 | Pang | |
| 2016/0105670 | A1 | 4/2016 | Pang | |
| 2016/0212438 | A1 | 7/2016 | Andersson | |
| 2016/0219278 | A1 | 7/2016 | Chen | |
| 2016/0219290 | A1 | 7/2016 | Zhao | |
| 2016/0234492 | A1 | 8/2016 | Li | |
| 2016/0337661 | A1 | 11/2016 | Pang | |
| 2016/0358312 | A1 | 12/2016 | Kolb, V | |
| 2017/0013269 | A1 | 1/2017 | Kim | |
| 2017/0054976 | A1 | 2/2017 | Li | |
| 2017/0094311 | A1 | 3/2017 | Chou | |
| 2017/0150186 | A1 | 5/2017 | Zhang | |
| 2017/0238020 | A1 | 8/2017 | Karczewicz | |
| 2017/0289566 | A1 | 10/2017 | He | |
| 2017/0332075 | A1 | 11/2017 | Karczewicz | |
| 2018/0041778 | A1 | 2/2018 | Zhang | |
| 2018/0041779 | A1 | 2/2018 | Zhang | |
| 2018/0048909 | A1 | 2/2018 | Liu | |
| 2018/0063543 | A1 | 3/2018 | Reddy | |
| 2018/0184127 | A1 | 6/2018 | Zhang | |
| 2018/0205946 | A1 | 7/2018 | Zhang | |
| 2018/0234701 | A1 | 8/2018 | Zhang | |
| 2018/0255295 | A1 | 9/2018 | Lee | |
| 2018/0288439 | A1 | 10/2018 | Hsu | |
| 2018/0343463 | A1 | 11/2018 | Xiu | |
| 2018/0352223 | A1 | 12/2018 | Chen | |
| 2019/0052886 | A1 | 2/2019 | Chiang | |
| 2019/0075328 | A1 | 3/2019 | Huang | |
| 2019/0104303 | A1 | 4/2019 | Xiu | |
| 2019/0116374 | A1 | 4/2019 | Zhang | |
| 2019/0191163 | A1 | 6/2019 | Lee | |
| 2019/0208203 | A1 | 7/2019 | Tsukuba | |
| 2019/0208225 | A1 | 7/2019 | Chen | |
| 2019/0238845 | A1 | 8/2019 | Zhang | |
| 2019/0281304 | A1 | 9/2019 | He | |
| 2019/0306502 | A1 | 10/2019 | Gadde | |
| 2019/0306521 | A1 | 10/2019 | Zhao | |
| 2019/0306536 | A1 | 10/2019 | Lim | |
| 2019/0349599 | A1 | 11/2019 | Li | |
| 2020/0007864 | A1 | 1/2020 | Li | |
| 2020/0029073 | A1 | 1/2020 | Chiang | |
| 2020/0092555 | A1 | 3/2020 | Zhao | |
| 2020/0145674 | A1 | 5/2020 | Peng | |
| 2020/0177893 | A1 | 6/2020 | Holcomb | |
| 2020/0195959 | A1 | 6/2020 | Zhang | |
| 2020/0236384 | A1 | 7/2020 | Xu | |
| 2020/0244995 | A1 | 7/2020 | Hsiang | |
| 2020/0260070 | A1* | 8/2020 | Yoo | H04N 19/103 |
| 2020/0260078 | A1 | 8/2020 | Zhao | |
| 2020/0260116 | A1 | 8/2020 | Francois | |
| 2020/0267381 | A1 | 8/2020 | Vanam | |
| 2020/0322628 | A1 | 10/2020 | Lee | |

(56) References Cited

U.S. PATENT DOCUMENTS

| | | |
|---|---|---|
| 2020/0336748 A1 | 10/2020 | Li |
| 2020/0344494 A1 | 10/2020 | Hu |
| 2020/0366891 A1 | 11/2020 | Hu |
| 2020/0374542 A1 | 11/2020 | Zhang |
| 2020/0382813 A1 | 12/2020 | Karczewicz |
| 2020/0389655 A1 | 12/2020 | Seregin |
| 2020/0404263 A1 | 12/2020 | Hu |
| 2020/0413038 A1 | 12/2020 | Zhang |
| 2020/0413044 A1 | 12/2020 | Zhang |
| 2021/0006787 A1 | 1/2021 | Zhang |
| 2021/0006788 A1 | 1/2021 | Zhang |
| 2021/0006790 A1 | 1/2021 | Zhang |
| 2021/0014527 A1 | 1/2021 | Iwamura |
| 2021/0021811 A1 | 1/2021 | Xu |
| 2021/0021856 A1 | 1/2021 | Zheng |
| 2021/0029374 A1 | 1/2021 | Zhang |
| 2021/0051324 A1 | 2/2021 | Zhang |
| 2021/0076029 A1 | 3/2021 | Han |
| 2021/0084325 A1 | 3/2021 | Lim |
| 2021/0092379 A1 | 3/2021 | Zhang |
| 2021/0092436 A1 | 3/2021 | Zhang |
| 2021/0105482 A1 | 4/2021 | Zhang |
| 2021/0120242 A1 | 4/2021 | Nam |
| 2021/0127129 A1 | 4/2021 | Zhang |
| 2021/0136407 A1 | 5/2021 | Aono |
| 2021/0152846 A1 | 5/2021 | Zhang |
| 2021/0160529 A1 | 5/2021 | Zhang |
| 2021/0160532 A1 | 5/2021 | Zhang |
| 2021/0176501 A1 | 6/2021 | Chen |
| 2021/0185342 A1 | 6/2021 | Zhang |
| 2021/0195216 A1 | 6/2021 | Peng |
| 2021/0195234 A1 | 6/2021 | Zhang |
| 2021/0211647 A1 | 7/2021 | Liu |
| 2021/0235073 A1 | 7/2021 | Liu |
| 2021/0235108 A1 | 7/2021 | Zhang |
| 2021/0250602 A1 | 8/2021 | Zhang |
| 2021/0258575 A1 | 8/2021 | Zhang |
| 2021/0266537 A1 | 8/2021 | Zhang |
| 2021/0266562 A1 | 8/2021 | Zhang |
| 2021/0281859 A1 | 9/2021 | Zhang |
| 2021/0281875 A1 | 9/2021 | Liu |
| 2021/0281877 A1 | 9/2021 | Liu |
| 2021/0297659 A1 | 9/2021 | Zhang |
| 2021/0314614 A1 | 10/2021 | Zhang |
| 2021/0314623 A1 | 10/2021 | Chang |
| 2021/0314628 A1 | 10/2021 | Zhang |
| 2021/0321092 A1 | 10/2021 | Zhang |
| 2021/0321095 A1 | 10/2021 | Zhang |
| 2021/0321121 A1 | 10/2021 | Zhang |
| 2021/0321136 A1 | 10/2021 | Jung |
| 2021/0329227 A1 | 10/2021 | Zheng |
| 2021/0337232 A1 | 10/2021 | Zheng |
| 2021/0337235 A1 | 10/2021 | Choi |
| 2021/0352312 A1 | 11/2021 | Zhang |
| 2021/0368171 A1 | 11/2021 | Zhang |
| 2021/0377524 A1 | 12/2021 | Zhang |
| 2021/0385446 A1 | 12/2021 | Liu |
| 2021/0385451 A1 | 12/2021 | Zhang |
| 2021/0392333 A1 | 12/2021 | Paluri |
| 2021/0392381 A1 | 12/2021 | Wang |
| 2021/0409684 A1 | 12/2021 | Wang |
| 2021/0409720 A1 | 12/2021 | Meng |
| 2022/0007022 A1 | 1/2022 | Kang |
| 2022/0007053 A1 | 1/2022 | Hanhart |
| 2022/0014791 A1 | 1/2022 | Liu |
| 2022/0030226 A1 | 1/2022 | Lee |
| 2022/0053186 A1 | 2/2022 | Paluri |
| 2022/0078455 A1 | 3/2022 | Yoo |
| 2022/0086433 A1 | 3/2022 | Zhang |
| 2022/0086444 A1 | 3/2022 | Piao |
| 2022/0094914 A1 | 3/2022 | Zhang |
| 2022/0103834 A1 | 3/2022 | Zhang |
| 2022/0132118 A1 | 4/2022 | Zhang |
| 2022/0132119 A1 | 4/2022 | Zhang |
| 2022/0159300 A1 | 5/2022 | Chiang |
| 2022/0201306 A1 | 6/2022 | Kato |
| 2022/0224897 A1 | 7/2022 | Zhang |
| 2022/0232221 A1 | 7/2022 | Lee |
| 2022/0286691 A1 | 9/2022 | Choi |
| 2022/0400266 A1 | 12/2022 | Koo |
| 2023/0007263 A1 | 1/2023 | Kang |
| 2023/0319259 A1 | 10/2023 | Cao |
| 2023/0379471 A1 | 11/2023 | Schwarz |
| 2024/0040151 A1 | 2/2024 | Nalci |
| 2024/0171759 A1 | 5/2024 | Koo |

FOREIGN PATENT DOCUMENTS

| | | |
|---|---|---|
| CN | 101822064 A | 9/2010 |
| CN | 101978698 A | 2/2011 |
| CN | 103081467 A | 5/2013 |
| CN | 103636225 A | 3/2014 |
| CN | 103942793 A | 7/2014 |
| CN | 104094605 A | 10/2014 |
| CN | 104126302 A | 10/2014 |
| CN | 104205838 A | 12/2014 |
| CN | 104469378 A | 3/2015 |
| CN | 104509113 A | 4/2015 |
| CN | 104838657 A | 8/2015 |
| CN | 105141957 A | 12/2015 |
| CN | 105264891 A | 1/2016 |
| CN | 105308960 A | 2/2016 |
| CN | 105325003 A | 2/2016 |
| CN | 105379282 A | 3/2016 |
| CN | 105794206 A | 7/2016 |
| CN | 106105206 A | 11/2016 |
| CN | 106464874 A | 2/2017 |
| CN | 106797476 A | 5/2017 |
| CN | 106797477 A | 5/2017 |
| CN | 106961606 A | 7/2017 |
| CN | 107079161 A | 8/2017 |
| CN | 107211154 A | 9/2017 |
| CN | 107211156 A | 9/2017 |
| CN | 107277514 A | 10/2017 |
| CN | 107690810 A | 2/2018 |
| CN | 108028939 A | 5/2018 |
| CN | 108141597 A | 6/2018 |
| CN | 108141605 A | 6/2018 |
| CN | 108353184 A | 7/2018 |
| CN | 108370441 A | 8/2018 |
| CN | 108449599 A | 8/2018 |
| CN | 108462873 A | 8/2018 |
| CN | 108605126 A | 9/2018 |
| CN | 108702515 A | 10/2018 |
| CN | 108713320 A | 10/2018 |
| CN | 108886620 A | 11/2018 |
| CN | 109076218 A | 12/2018 |
| CN | 109076236 A | 12/2018 |
| CN | 109479138 A | 3/2019 |
| CN | 109479139 A | 3/2019 |
| CN | 109496430 A | 3/2019 |
| CN | 109743576 A | 5/2019 |
| CN | 109792515 A | 5/2019 |
| CN | 110771170 A | 2/2020 |
| CN | 110839158 A | 2/2020 |
| CN | 114450959 B | 8/2024 |
| EP | 2173100 A2 | 4/2010 |
| FI | 20165257 L | 9/2017 |
| GB | 201509938 | 6/2015 |
| IN | 544769 | 7/2024 |
| JP | 2013085234 A | 5/2013 |
| JP | 2014096638 A | 5/2014 |
| JP | 2017535180 A | 11/2017 |
| JP | 2018530249 A | 10/2018 |
| JP | 2020017970 A | 1/2020 |
| JP | 2022535544 A | 8/2022 |
| JP | 7346599 B2 | 9/2023 |
| JP | 7568352 B2 | 10/2024 |
| KR | 20150116134 A | 10/2015 |
| KR | 101622122 B1 | 5/2016 |
| KR | 20190013380 A | 2/2019 |
| KR | 102736117 B1 | 12/2024 |
| TW | 201201526 A | 1/2012 |
| TW | 201820872 A | 6/2018 |

(56) References Cited

FOREIGN PATENT DOCUMENTS

| WO | 2012097740 A1 | 7/2012 |
| WO | 2013001278 A1 | 1/2013 |
| WO | 2013159643 A1 | 10/2013 |
| WO | 2013166395 A2 | 11/2013 |
| WO | 2014052775 A1 | 4/2014 |
| WO | 2014110652 A1 | 7/2014 |
| WO | 2015038877 A1 | 3/2015 |
| WO | 2015106121 A1 | 7/2015 |
| WO | 2015180014 A1 | 12/2015 |
| WO | 2016061245 A1 | 4/2016 |
| WO | 2016138854 A1 | 9/2016 |
| WO | 2017082670 A1 | 5/2017 |
| WO | 2017162911 A1 | 9/2017 |
| WO | 2017197126 A1 | 11/2017 |
| WO | 2018124843 A1 | 7/2018 |
| WO | 2018155986 A2 | 8/2018 |
| WO | 2018161954 A1 | 9/2018 |
| WO | 2018166357 A1 | 9/2018 |
| WO | 2019001734 A1 | 1/2019 |
| WO | 2019004283 A1 | 1/2019 |
| WO | 2019077197 A1 | 4/2019 |
| WO | 2019079611 A1 | 4/2019 |
| WO | 2019107927 A1 | 6/2019 |
| WO | 2020013532 A1 | 1/2020 |
| WO | 2020149608 A1 | 7/2020 |
| WO | 2020211775 A1 | 10/2020 |

OTHER PUBLICATIONS

Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.

Suehring, K., VTM version 8.0, Retrieved from the internet: https://vcgit.hhi.fraunhofer.de/jvet/VVCSoftware_VTM/tags/VTM-8.0, Nov. 30, 2022, 2 pages.

Document: JVET-M0102-v5, De-Luxan-Hernandez, S., et al., "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11 13th Meeting: Marrakech, MA, Jan. 9-18, 2019, 9 pages.

Document: JVET-N0193, Koo, M., et al., "CE6: Reduced Secondary Transform (RST) (CE6-3.1)," Joint Video Experts Team (JVET) of ITU-T SG 16 WP 3 and ISO/IEC JTC 1/SC 29/WG 11 14th Meeting: Geneva, CH, Mar. 19-27, 2019, 19 pages.

Document: JVET-K0099, Salehifar, M., et al., "CE 6.2.6: Reduced Secondary Transform (RST)," Joint Video Experts Team (JVET) of ITU-T SG 16 WP 3 and ISO/IEC JTC 1/SC 29/WG 11 11th Meeting: Ljubljana, SI, Jul. 10-18, 2018, 12 pages.

Document: JVET-L0133, Koo, M., "CE 6-2.1: Reduced Secondary Transform (RST)," Joint Video Experts Team (JVET) of ITU-T SG 16 WP 3 and ISO/IEC JTC 1/SC 29/WG 11 12th Meeting: Macao, CN, Oct. 3-12, 2018, 8 pages.

Document: JVET-N0217, Pfaff, J., et al., "CE3: Affine linear weighted intra prediction (CE3-4.1, CE3-4.2)," Joint Video Experts Team (JVET) of ITU-T SG 16 WP 3 and ISO/IEC JTC 1/SC 29/WG 11 14th Meeting: Geneva, CH, Mar. 19-27, 2019, 17 pages.

Document: JVET-Q0183-v2, Hsiang, S., et al., "AHG9: High-level syntax related to transform skip mode," Joint Video Experts Team (JVET) of ITU-T SG 16 WP 3 and ISO/IEC JTC 1/SC 29/WG 11 17th Meeting: Brussels, BE, Jan. 7-17, 2020, 6 pages.

Document: JVET-Q0448-v1, De-Luxan-Hernandez, S., et al., "MTS dependent coefficient subblock scanning for zero-out," Joint Video Experts Team (JVET) of ITU-T SG 16 WP 3 and ISO/IEC JTC 1/SC 29/WG 11 17th Meeting: Brussels, BE, Jan. 7-17, 2020, 8 pages.

JVET-Q0136-v1, Koo, M., et al., "Alignment of MTS index signalling condition with MTS zero-out," Joint Video Experts Team (JVET) of ITU-T SG 16 WP 3 and ISO/IEC JTC 1/SC 29/WG 11 17th Meeting: Brussels, BE, Jan. 7-17, 2020, 6 pages.

Document: JVET-M0464-v4, Bross, B., et al., "Non-CE8: Unified Transform Type Signalling and Residual Coding for Transform Skip," Joint Video Experts Team (JVET) of ITU-T SG 16 WP 3 and ISO/IEC JTC 1/SC 29/WG 11 13th Meeting: Marrakech, MA, Jan. 9-18, 2019, 13 pages.

Document: JVET-P0569-v2, Egilmez, H., et al., "AHG17/Non-CE6: High-level syntax for MTS and Implicit Transform Derivations," Joint Video Experts Team (JVET) of ITU-T SG 16 WP 3 and ISO/IEC JTC 1/SC 29/WG 11 16th Meeting: Geneva, CH, Oct. 1-11, 2019, 10 pages.

Document: JVET-P0495-v2, Wang, Y., et al., "Non-CE6: On implicit MTS," Joint Video Experts Team (JVET) of ITU-T SG 16 WP 3 and ISO/IEC JTC 1/SC 29/WG 11 16th Meeting: Geneva, CH, Oct. 1-11, 2019, 6 pages.

Document: JVET-N0123-v2, Tsukuba, T., et al., "AHG13/Non-CE6/CE8: Chroma Transform Skip," Joint Video Experts Team (JVET) of ITU-T SG 16 WP 3 and ISO/IEC JTC 1/SC 29/WG 11 14th Meeting: Geneva, CH, Mar. 19-27, 2019, 6 pages.

Document: JCTVC-J0093, He, D., et al., "Rotation of Residual Block for Transform Skipping," Joint Collaborative Team on Video Coding (JCT-VC) of ITU-T SG 16 WP 3 and ISO/IEC JTC 1/SC 29/WG 11 10th Meeting: Stockholm, SE, Jul. 11-20, 2012, 8 pages.

Foreign Communication From A Related Counterpart Application, PCT Application No. PCT/CN2021/079495, English Translation of International Search Report dated Jun. 8, 2021, 13 pages.

Foreign Communication From A Related Counterpart Application, PCT Application No. PCT/CN2021/079497, English Translation of International Search Report dated Jun. 8, 2021, 11 pages.

Foreign Communication From A Related Counterpart Application, PCT Application No. PCT/CN2021/082963, English Translation of International Search Report dated Jun. 17, 2021, 14 pages.

Foreign Communication From A Related Counterpart Application, PCT Application No. PCT/CN2021/113978, English Translation of International Search Report dated Nov. 23, 2021, 10 pages.

Foreign Communication From A Related Counterpart Application, PCT Application No. PCT/CN2021/113979, English Translation of International Search Report dated Nov. 23, 2021, 10 pages.

Foreign Communication From A Related Counterpart Application, PCT Application No. PCT/CN2021/132697, English Translation of International Search Report dated Feb. 15, 2022, 11 pages.

Non-Final Office Action from U.S. Appl. No. 17/939,717 dated Oct. 11, 2024, 22 pages.

Non-Final Office Action from U.S. Appl. No. 18/322,475 dated Jan. 15, 2025, 23 pages.

Chinese Office Action from Chinese Patent Application No. 202180019494.6 dated Mar. 5, 2025, 15 pages.

Chinese Notice of Allowance from Chinese Patent Application No. 202180020117.4 dated Mar. 28, 2025, 8 pages.

Chen C-C., et al., "Non-CE4/8: On Disabling Blending Process in TPM," Joint Video Experts Team (JVET) of ITU-T SG 16 WP 3 and ISO/IEC JTC 1/SC 29/WG 11, 15th Meeting: Gothenburg, SE, Jul. 3-17, 2019, Document: JVET-O1172-v3, 31 Pages.

Bross B., et al., "Versatile Video Coding (Draft 6)," The Joint Video Exploration Team of ISO/IEC JTC 1/SC29/WG11 and ITU-T SG.16, 15. JVET Meeting, Gothenburg, Jul. 3-12, 2019, Document: JVET-O2001-v2, XP030293932, 417 pages.

Bross B., et al., "Versatile Video Coding (Draft 6)," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O2001-vE, 474 Pages.

Chen J., et al., "Test Model 6 of Versatile Video Coding (VTM 6)," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O2002-v1, 82 pages.

Chien W-J., et al., "Methodology and reporting template for tool testing," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O2005, pp. 1-6, (6 Pages), XP030208574.

Document: JVET-P0068-v2, Gao, H., et al., "CE4: CE4-1.1, CE4-1.2 and CE4-1.14: Geometric Merge Mode (GEO)," Joint Video Experts Team (JVET) of ITU-T SG 16 WP 3 and ISO/IEC JTC 1/SC 29/WG11 16th Meeting: Geneva, CH, Oct. 1-11, 2019, 7 pages.

(56) References Cited

OTHER PUBLICATIONS

Wang Z., et al., "Non-CE4: Construction of Spatial Merge Candidates," Joint Video Experts Team (JVET) of ITU-T SG 16 WP 3 and ISO/IEC JTC 1/SC 29/WG 11, 16th Meeting: Geneva, CH, Oct. 1-11, 2019, Document: JVET-P0325-v1, 3 pages.

Deng Z., et al., "Non-CE6: Cleanups of Maximum Transform Size Related Syntax Elements," Joint Video Experts Team (JVET) of ITU-T SG 16 WP 3 and ISO/IEC JTC 1/SC 29/WG 11, 16th Meeting: Geneva, CH, Oct. 1-11, 2019, Document: JVET-P0405, 3 pages.

JVET-R0097-v2, Sarwer, M.G., et al., "AHG9: Transform and Transform-Skip Related HLS Clean-Up," Joint Video Experts Team (JVET) of ITU-T SG 16 WP 3 and ISO/IEC JTC 1/SC 29/WG 11, 18th Meeting: by teleconference, Apr. 15-24, 2020, 3 Pages.

Murakami A., et al., "High-Efficiency Image Symbolization Technology," High Efficiency Video Coding, HEVC/H.265, Nose, May 26, 2022, 39 Pages.

Chinese Office Action from Chinese Patent Application No. 202180051695.4 dated Jun. 3, 2025, 27 pages.

Chinese Office Action from Chinese Patent Application No. 202180079067.7 dated Aug. 2, 2025, 26 pages.

Non-Final Office Action from U.S. Appl. No. 18/172,110 dated Jul. 30, 2025, 20 pages.

Notice of Allowance from U.S. Appl. No. 18/322,475 dated Jun. 17, 2025, 21 pages.

"VVCSoftware_VTM," Aug. 13, 2021, 1 Page, Retrieved from URL: https://vcgit.hhi.fraunhofer.de/jvet/VVCSoftware_VTM/tags/VTM-3.0rc1.

Bossen F., "VTM-5.0," Retrieved from URL: https://vcgit.hhi.fraunhofer.de/jvet/VVCSoftware_VTM/tags/VTM-5.0, Mar. 5, 2022, 2 pages.

ITU-T: "Information Technology-High Efficiency Coding and Media Delivery in Heterogeneous Environments-Part 2: High Efficiency Video Coding," ISO/IEC JTC 1/SC 29/WG 11 N17661, Apr. 20, 2018, 8 pages.

JCTVC-AA1002-v1, Rosewarne, C., "High Efficiency Video Coding (HEVC) Test Model 16 (HM 16) Improved Encoder Description Update 8," Joint Collaborative Team on Video Coding (JCT-VC) of ITU-T SG16 WP3 and ISO/IEC JTC1/SC29/WG11, 27th meeting: Hobart, AU, Mar. 31-Apr. 7, 2017, 16 pages.

Rosewarne C., et al., "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG11, 25th Meeting: Chengdu, CN, Oct. 14-21, 2016, Document: JCTVC-Y1002, 70 Pages.

JEM-7.0: "svn_HMJEMSoftware—Revision 603: /tags/HM-16.6-JEM-7.0," Apache Subversion Version 1.9.7 (r1800392), 1 Page, Retrieved from URL: https://jvet.hhi.fraunhofer.de/svn/svn_HMJEMSoftware/tags/HM-16.6-JEM-7.0, Jul. 30, 2021, 1 page.

Chen J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, Document: JVET-G1001, 51 Pages.

Jeong S., et al., "CE4 Ultimate Motion Vector Expression (Test 4.5.4)," Joint Video Experts Team (JVET) of ITU-T SG 16 WP 3 and ISO/IEC JTC 1/SC 29/WG 11, 12th Meeting: Macao, CN, Oct. 3-12, 2018, Document JVET-L0054, 28 Pages.

Chiang M-S., et al., "CE10.1.1: Multi-hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11 12th Meeting: Macao, CN, Oct. 3-12, 2018, Document: JVET-L0100-v1, 13 Pages.

Chiang M-S., et al., "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0100-v3, 14 Pages.

Xiu X., et al., "CE9-Related: Complexity Reduction and Bit-Width Control for Bi-Directional Optical Flow (BIO)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0256-v2, 2018, 177 Pages.

Zhang L., et al., "CE4: History-Based Motion Vector Prediction (Test 4.4.7)," Joint Video Experts Team (JVET) of ITU-T SG 16 WP 3 and ISO/IEC JTC 1/SC 29/WG 11 12th Meeting: Macao, CN, Oct. 3-12, 2018, Document: JVET-L0266-v1, 4 Pages.

Zhang L., et al., "CE4: History-Based Motion Vector Prediction (Test 4.4.7)," Joint Video Experts Team (JVET) of ITU-T SG 16 WP 3 and ISO/IEC JTC 1/SC 29/WG 11, 12th Meeting: Macao, CN, Oct. 3, 2018-Oct. 12, 2018, Document: JVET-L0266-v2, 8 pages.

Chujoh T., et al., "Non-CE9: An Improvement of BDOF," Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0063-v3, 237 Pages.

Yu., R., et al., "CE4-related: On MVP candidate list generation for AMVP," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0117, 251 Pages.

Zhao J., et al., "CE2: History Based Affine Motion Candidate (Test 2.2.3)," Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0125, 8 Pages, DOI:20200401134129A, XP030200187.

Sethuraman S., "CE9: Results of DMVR Related Tests CE9.2.1 and CE9.2.2," Joint Video Experts Team (JVET) of ITU-T SG 16 WP 3 and ISO/IEC JTC 1/SC 29/WVG 11, 13th Meeting: Marrakech, MA, Jan. 9-18, 2019, Document: JVET-M0147-v7, 251 Pages.

Nam., et al., "CE8: Block Vector Prediction for CPR (Test 8.1.1a and Test 8.1.1b)," Joint Video Exploration Team of ISO/IEC JTC 1/SC 29/WG 11 and ITU-T SG 16, Jan. 9-18, 2019, Document: JVET-M0332, 29 Pages.

Xu X., et al., "CE4-Related: Simplified Merge Candidate List for Small Blocks," Joint Video Exploration Team (JVET) of ITU-T SG 16 WP 3 and ISO/IEC JTC 1/SC 29/WG 11, 13th Meeting: Marrakesh, MA, Jan. 9-18, 2019, Document: JVET-M0405-v1, 3 Pages.

Xiu X., et al., "CE9.1: Simplification of Bi-Directional Optical Flow," Joint Video Experts Team (JVET) of ITU-T SG 16 WP 3 and ISO/IEC JTC 1/SC 29/WG 11, 13TH Meeting: Marrakech, MA, Jan. 9-18, 2019, Document: JVET-M0487, 13 Pages.

Yang H., et al., "CE4: Summary Report on Inter Prediction and Motion Vector Coding," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0024-v2, 21 Pages.

Gao H., et al., "Non-CE8: IBC Merge List Simplification," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0176-v2, 19 Pages.

Wang X., et al., "CE4-Related: An Improved Method for Triangle Merge List Construction," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0340, 321 Pages.

Zhao X., "Non-CE6: Configurable Max Transform Size in VVC," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0362-v2, 24 Pages.

Nam, Junghak et al., "CE8-1.1: Block vector prediction for IBC", Joint Video Experts Team (JVET) of ITU-T SG 16 WP 3 and ISO/IEC JTC 1/SC 29/WG 11, 14th Meeting: Geneva, CH, Mar. 19-27, 2019, document JVET-N0457, 2019.

Nam, Junghak et al., "CE8-related: Default candidates for IBC merge mode", Joint Video Experts Team (JVET) of ITU-T SG 16 WP 3 and ISO/IEC JTC 1/SC 29/WG 11, 14th Meeting: Geneva, CH, Mar. 19-27, 2019, document: JVET-N0460, 2019.

Ikeda M., "Crosscheck of JVET-N0150 (AHG12: One CTU Delay Wavefront Parallel Processing)," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0646-v2, 2 Pages.

(56)        References Cited

OTHER PUBLICATIONS

Esenlik S., "Bog Report on CE9 Decoder Motion Vector Derivation Related Contributions," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0815-v3, 19 Pages.

Xu X., et al., "CE8-Related Combination Test of JVET-N0176/JVET-N0317/JVET-N0382 on Simplification of IBC Vector Prediction," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0843-v1, 23 Pages.

Bross B., et al., "Versatile Video Coding (Draft 5)", Joint Video Experts Team (JVET) of ITU-T SG 16 WP 3 and ISO/IEC JTC 1/SC 29/WG 11, 14 Meeting: Geneva, CH, Mar. 19-27, 2019, Document: JVET-N1001-v10, 407 Pages.

Bross B., et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-v2, 361 Pages.

Bross B., et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-v5, 374 Pages.

Bross B., et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-v6, 384 Pages.

Bross B., et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-v7, 384 Pages.

Bross B., et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-v8, 400 Pages.

Chen J., et al., "Algorithm description for Versatile Video Coding and Test Model 5 (VTM 5)," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1002-v1, 71 Pages.

Chen J., et al., "Algorithm Description for Versatile Video Coding and Test Model 5 (VTM 5)," Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1002-v2, 80 Pages.

Huang et al. "Non-CE4: Merge Modes Signaling," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0249, 2019.

Zhang K., et al., "Non-CE4: Cleanups on Syntax Design for Sub-Block Coding Tools," Joint Video Experts Team (JVET) of ITU-T SG 16 WP 3 and ISO/IEC JTC 1/SC 29/WG 11 15th Meeting: Gothenburg, SE, Jul. 3-12, 2019, Document: JVET-O0263, 2 Pages.

Document: JVET-O0288-v1, Chubach, O., et al., "CE5-related: On the syntax constraints of Alf Aps," Joint Video Experts Team (JVET) of ITU-T SG 16 WP 3 and ISO/IEC JTC 1/SC 29/WG 11 15th Meeting: Gothenburg, SE, Jul. 3-12, 2019, 5 pages.

Paluri et al. "AH17 Simplification of ALF Coefficients in the APS," Joint Video Experts Team {JVET) of ITU-T SG 16 WP 3 and ISO/IEC JTC 1/SC 29/WG 11 15th Meeting: Gothenburg, SE, Jul. 3-12, 2019, document JVET-O0302, 2019.

Document: JVET-O0309, Ko, G., et al., "Non-CE4: Merge mode signalling overhead reduction," Joint Video Experts Team (JVET) of ITU-T SG 16 WP 3 and ISO/IEC JTC 1/SC 29/WG 11 15th Meeting: Gothenburg, SE, Jul. 3-12, 2019, 8 pages.

Reuze K., et al., "Non-CE4: Simplification of Bi-Prediction MV Generation for Triangle Partition Mode Storage," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0411-v2, 5 Pages.

Blasi S., et al., "Non-CE4: CIIP Using Triangular Partitions," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0522, 35 Pages.

Zhao X., et al. "Non-CE6: Configurable Max Transform Size in VVC," Joint Video Experts Team (JVET) of ITU-T SG 16 WP 3 and ISO/IEC JTC 1/SC 29/WG 11 15th Meeting: Gothenburg, SE, Jul. 3-12, 2019, Document: JVET-O0545-v2, 8 Pages.

Zhang L., et al., "Non-CE8: Fixes of IBC BV Candidate List," Joint Video Experts Team (JVET) of ITU-T SG 16 WP 3 and ISO/IEC JTC 1/SC 29/WG 11 15th Meeting: Gothenburg, SE, Jul. 3-12, 2019, Document: JVET-O0574, 5 Pages.

Zhang L., et al., "Non-CE8: Simplified IBC BV Candidate List Construction Process," Joint Video Experts Team (JVET) of ITU-T SG 16 WP 3 and ISO/IEC JTC 1/SC 29/WG 11 15th Meeting: Gothenburg, SE, Jul. 3-12, 2019, Document: JVET-O0626-v1, 40 Pages.

Panusopone K., et al., "Simplification of MV Storage for Blending Blocks in Triangle Mode," Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0660-r1, 6 Pages.

Chen C.-C., et al., "BoG Report on CE4 Inter Prediction with Merge Modifications," Joint Video Experts Team (JVET) of ITU-T SG 16 WP 3 and ISO/IEC JTC 1/SC 29/WG 11, 15th Meeting: Gothenburg, SE, Jul. 3-17, 2019, Document JVET-O1039-v5, 41 Pages.

Esenlik S., et al. "BoG Report on CE9 Decoder Motion Vector Derivation Related Contributions," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O1100, 20 Pages.

Document: JVET-P0430, Chang, Y-J., et al., "AHG17:High level syntax cleanup on the syntax elements of transform skip," Joint Video Experts Team (JVET) of ITU-T SG 16 WP 3 and ISO/IEC JTC 1/SC 29/WG 11 16th Meeting: Geneva, CH, Oct. 1-11, 2019, 4 pages.

Chinese Office Action from a Chinese Patent Application No. 202180051689.9 dated Jan. 17, 2026, 36 pages.

* cited by examiner

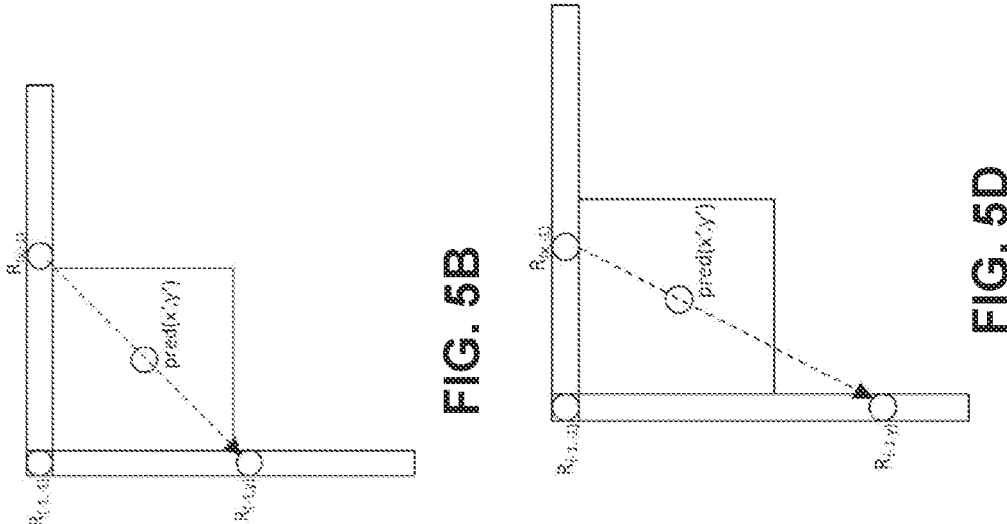
FIG. 5A
FIG. 5B
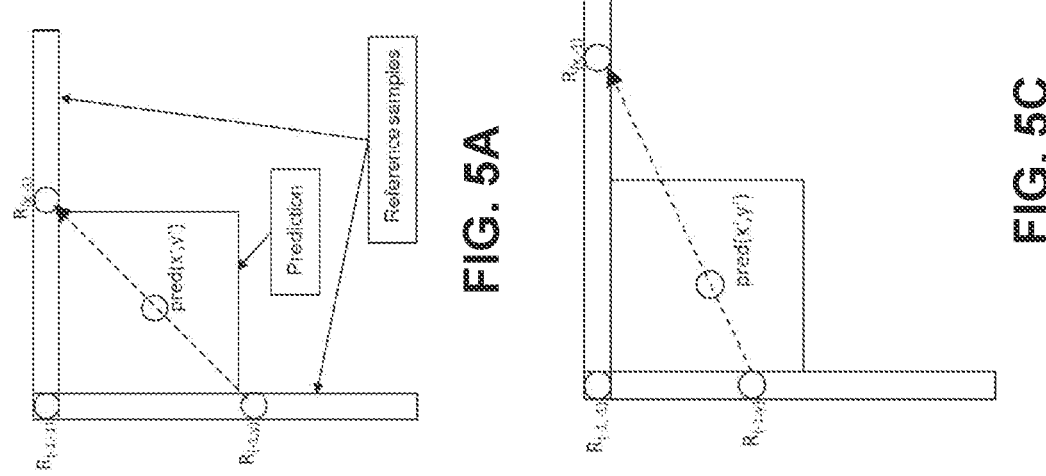
FIG. 5C
FIG. 5D

2200

2202 making a determination, for a conversion between a video block of a video and a coded representation of the video, whether a horizontal or a vertical identity transform is applied to the video block, based on a rule

2204 performing the conversion based on the determination (a) top-left partition          (b) top-right partition (c) bottom-left partition       (b) bottom-right partition

2400

2410 performing a conversion between a current block of a video and a bitstream of the video according to a rule specifying that whether a transform skip mode is enabled is determined based on coding information of the current block

2500

2510 performing a conversion between a current block of a video and a bitstream of the video according to a rule specifying that representative coefficients of one or more representative blocks in which at least one representative block is not identical to the current block determine usage of a transform skip mode for the current block

2600

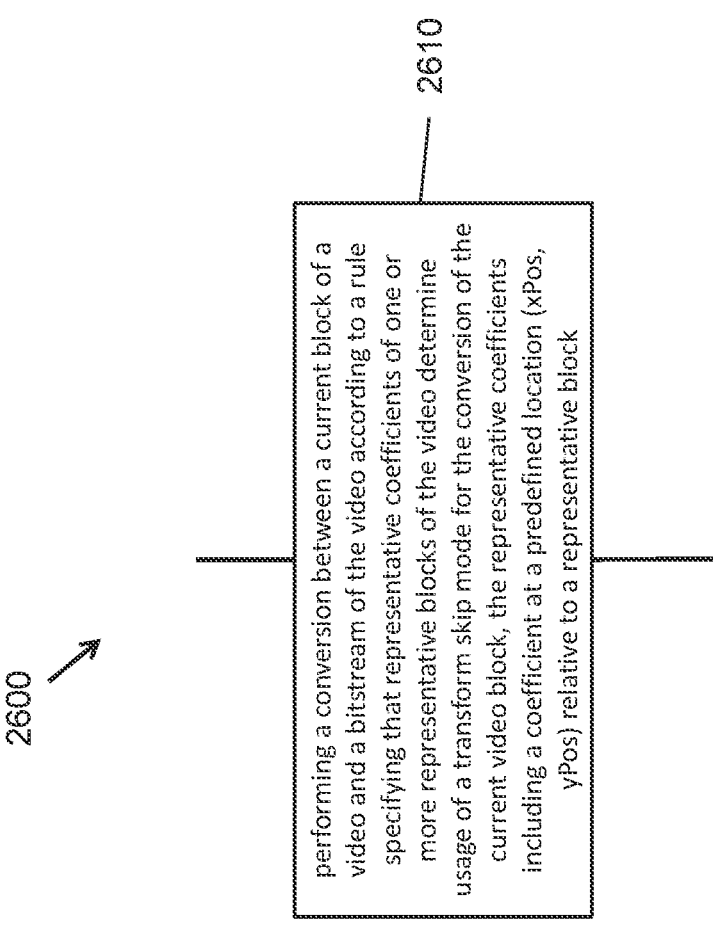

2610 performing a conversion between a current block of a video and a bitstream of the video according to a rule specifying that representative coefficients of one or more representative blocks of the video determine usage of a transform skip mode for the conversion of the current video block, the representative coefficients including a coefficient at a predefined location (xPos, yPos) relative to a representative block

FIG. 26 performing a conversion between a current block and a bitstream of the video according to a rule specifying that a transform skip mode is applied in response to an identity transform (IT) being used for coding the current block. The current block is coded in an inter coded mode or a direct coded mode

2710

2700

2800

2810

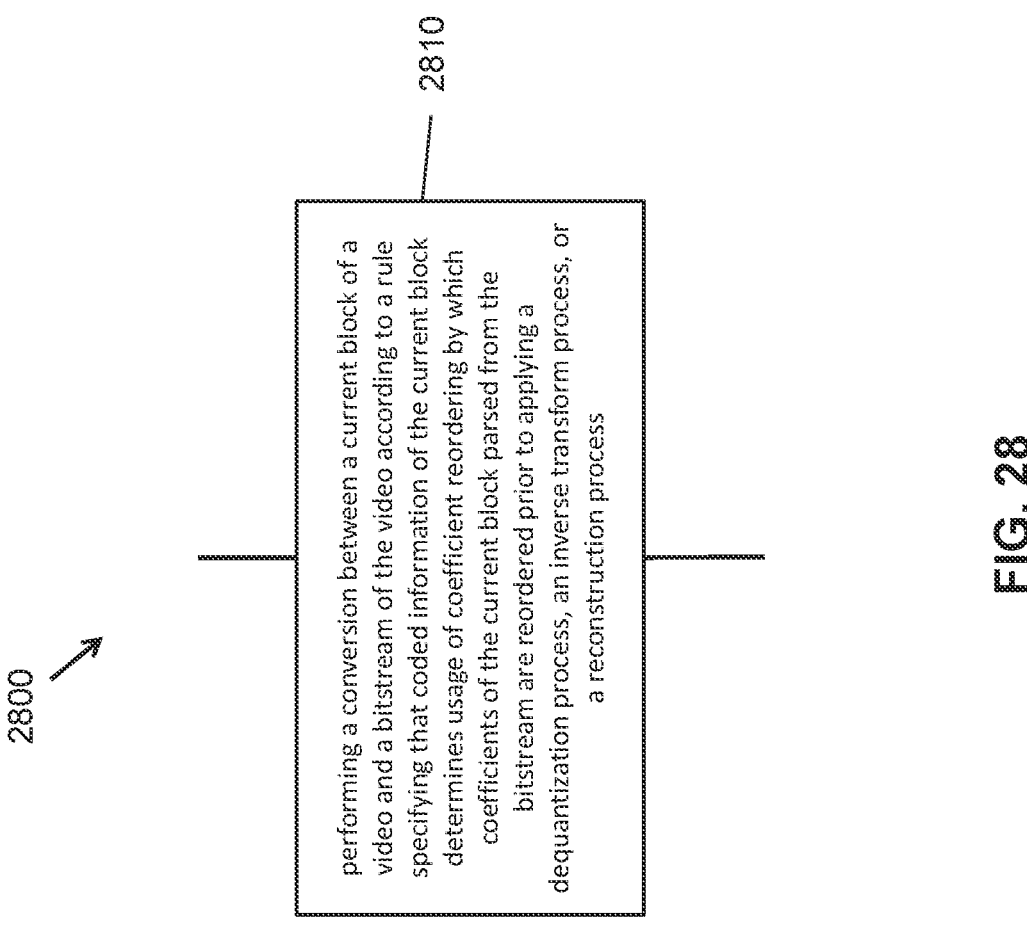

performing a conversion between a current block of a video and a bitstream of the video according to a rule specifying that coded information of the current block determines usage of coefficient reordering by which coefficients of the current block parsed from the bitstream are reordered prior to applying a dequantization process, an inverse transform process, or a reconstruction process

2910 performing a conversion between a current block of a video and a bitstream of the video according to a rule specifying that current block is partitioned into at least two parts in response to the current block having a specific mode, wherein at least one part of the at least two parts has no non-zero residues indicated in the bitstream

CODING MODE DEPENDENT SELECTION OF TRANSFORM SKIP MODE

CROSS REFERENCE TO RELATED APPLICATIONS

This application is a continuation of International Patent Application No. PCT/CN2021/113978 filed on Aug. 23, 2021, which claims the priority to and benefits of International Patent Application No. PCT/CN2020/110427, filed on Aug. 21, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of video using control information useful for decoding of the coded representation.

In one example aspect, a method of processing video data includes performing a conversion between a current block of a video and a bitstream of the video according to a rule. The rule specifies that whether a transform skip mode is enabled is determined based on coding information of the current block. The transform skip mode is a coding mode in which a transform is skipped on a prediction residual of a video block.

In another example aspect, a method of processing video data includes performing a conversion between a current block of a video and a bitstream of the video according to a rule. The rule specifies that representative coefficients of one or more representative blocks in which at least one representative block is not identical to the current block determine usage of a transform skip mode for the current block. The one or more representative blocks comprise last N blocks before the current block in a decoding order that have a same prediction mode, N being an integer greater than 1.

In another example aspect, a method of processing video data includes performing a conversion between a current block of a video and a bitstream of the video according to a rule. The rule specifies that representative coefficients of one or more representative blocks of the video determine usage of a transform skip mode for the conversion of the current video block. The representative coefficients include a coefficient at a predefined location (xPos, yPos) relative to a representative block.

In another example aspect, a method of processing video data includes performing a conversion between a current block and a bitstream of the video according to a rule. The rule specifies that a transform skip mode is applied in response to an identity transform (IT) being used for coding the current block. The current block is coded in an inter coded mode or a direct coded mode.

In another example aspect, a method of processing video data includes performing a conversion between a current block of a video and a bitstream of the video according to a rule. The rule specifies that coded information of the current block determines usage of coefficient reordering by which coefficients of the current block parsed from the bitstream are reordered prior to applying a dequantization process, an inverse transform process, or a reconstruction process.

In another example aspect, a method of processing video data includes performing a conversion between a current block of a video and a bitstream of the video according to a rule. The rule specifies that current block is partitioned into at least two parts in response to the current block having a specific mode. At least one part of the at least two parts has no non-zero residues indicated in the bitstream.

In another example aspect, a video processing method is disclosed. The method includes making a determination, for a conversion between a video block of a video and a coded representation of the video, whether a horizontal or a vertical identity transform is applied to the video block, based on a rule; and performing the conversion based on the determination. The rule specifies a relationship between the determination and representative coefficients from decoded coefficients of one or more representative blocks of the video.

In another example aspect, another video processing method is disclosed. The method includes making a determination, for a conversion between a video block of a video and a coded representation of the video, whether a horizontal or a vertical identity transform is applied to the video block, based on a rule; and performing the conversion based on the determination. The rule specifies a relationship between the determination and decoded luma coefficients of the video block.

In another example aspect, another video processing method is disclosed. The method includes making a determination, for a conversion between a video block of a video and a coded representation of the video, whether a horizontal or a vertical identity transform is applied to the video block, based on a rule; and performing the conversion based on the determination. The rule specifies a relationship between the determination and a value V associates with representative coefficients of decoded coefficients or a representative block.

In another example aspect, another video processing method is disclosed. The method includes determining that one or more syntax fields are present in a coded representation of a video where the video contains one or more video blocks; making a determination, based on the one or more syntax fields, whether a horizontal or a vertical identity transform is enabled for video blocks in the video.

In another example aspect, another video processing method is disclosed. The method includes making a first determination regarding whether use of an identity transform is enabled for a conversion between a video block of a video and a coded representation of the video; making a second determination regarding whether a zero-out operation is enabled during the conversion; and performing the conversion based on the first determination and the second determination.

In another example aspect, another video processing method is disclosed. The method includes performing a conversion between a video block of a video and a coded representation of the video; where the video block is represented in the coded representation as a coded block, where non-zero coefficients of the coded block are restricted to be within one or more sub-regions; and where an identity transform is applied for generating the coded block.

In another example aspect, another video processing method is disclosed. The method includes performing a conversion between a video comprising one or more video regions and a coded representation of the video, wherein the coded representation complies with a format rule; wherein the format rule specifies that coefficients of a video region are reordered according to a map after parsing from the coded representation.

In another example aspect, another video processing method is disclosed. The method includes determining, for a conversion of a video block of a video and a coded representation of the video, whether the video block meets a condition for signaling in the coded representation as a partial residual block; and performing the conversion according to determining; wherein the partial residual block is partitioned into at least two parts, with at least one part having no non-zero residues signaled in the coded representation.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present document.

BRIEF DESCRIPTION OF DRAWINGS

FIG. 5A shows an example definition of samples used by PDPC applied to diagonal and adjacent angular intra modes.

FIG. 5B shows another example definition of samples used by PDPC applied to diagonal and adjacent angular intra modes.

FIG. 5C shows another example definition of samples used by PDPC applied to diagonal and adjacent angular intra modes.

FIG. 5D show yet another example definition of samples used by PDPC applied to diagonal and adjacent angular intra modes.

FIG. 26 is a flowchart representation of another method of processing video data in accordance with the present technology.

FIG. 28 is a flowchart representation of another method of processing video data in accordance with the present technology.

DETAILED DESCRIPTION

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Overview

This document is related to video coding technologies. Specifically, it is related to transform skip mode and transform types (e.g., including identity transform) in video coding. It may be applied to the existing video coding standard like HEVC, or the standard (Versatile Video Coding) to be finalized. It may be also applicable to future video coding standards or video codec.

2. Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/ HEVC standards. Since H.262, the video coding standards are based on the hybrid video coding structure where temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1. Coding Flow of a Typical Video Codec

Figure 1:
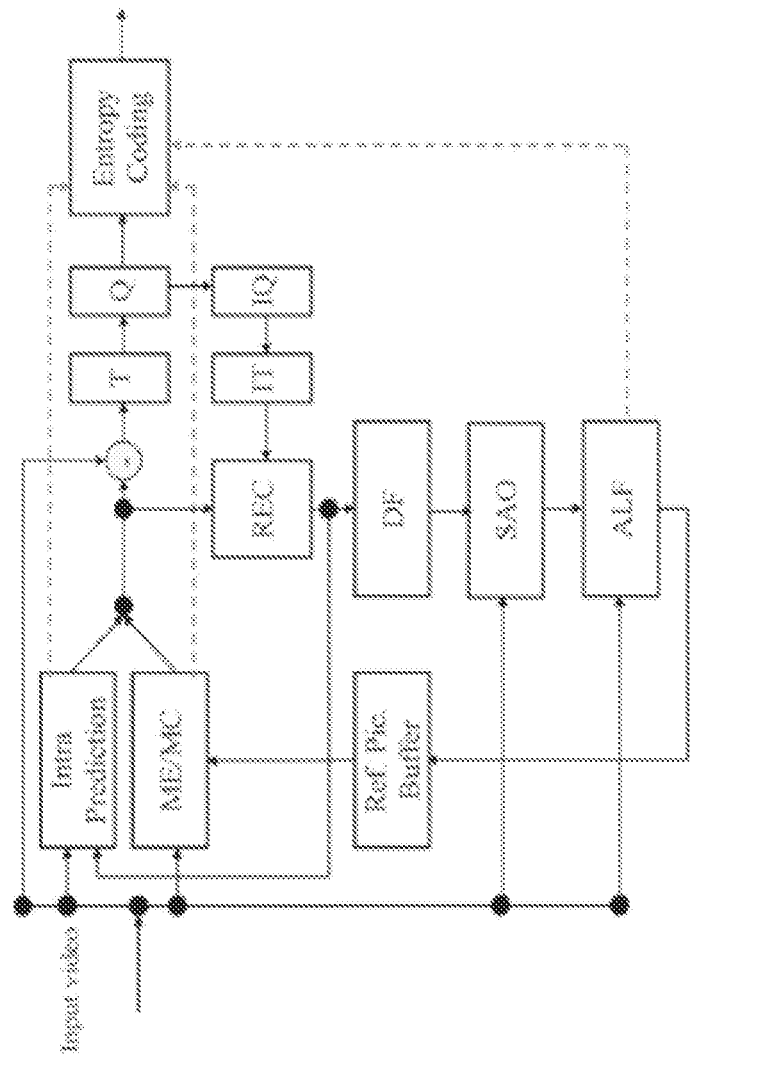
FIG. 1 shows an example video encoder block diagram.

FIG. 1 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.2. Intra Mode Coding with 67 Intra Prediction Modes

To capture the arbitrary edge directions presented in natural video, the number of directional intra modes is extended from 33, as used in HEVC, to 65. The additional directional modes are depicted as red dotted arrows in FIG. 2, and the planar and DC modes remain the same. These denser directional intra prediction modes apply for all block sizes and for both luma and chroma intra predictions.

Figure 2:
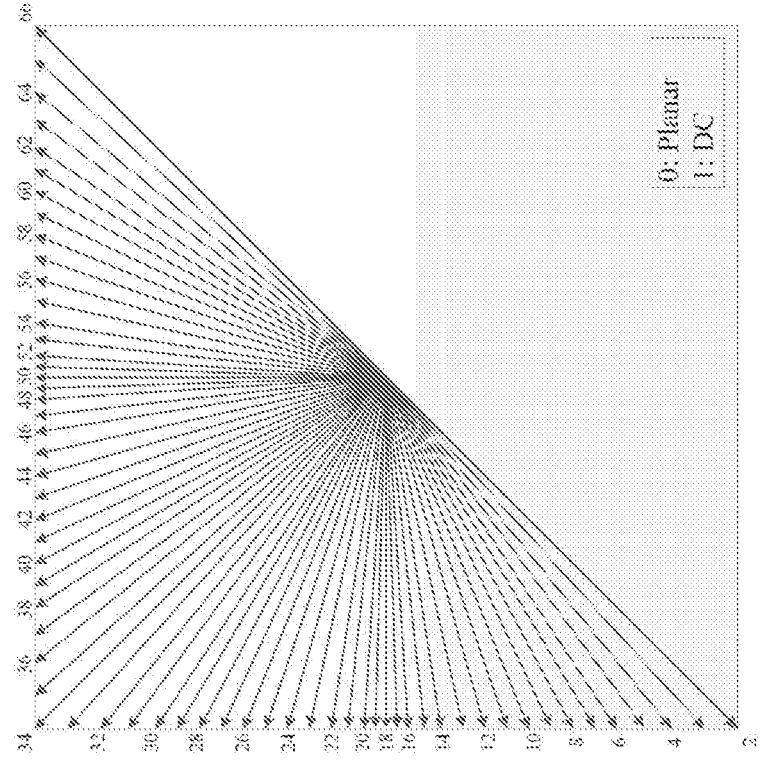
FIG. 2 shows an example of 67 intra prediction modes.

Conventional angular intra prediction directions are defined from 45 degrees to −135 degrees in clockwise direction as shown in FIG. 2. In VTM2, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, e.g., 67, and the intra mode coding is unchanged.

In the HEVC, every intra-coded block has a square shape and the length of each of its side is a power of 2. Thus, no division operations are required to generate an intra-predictor using DC mode. In VVV2, blocks can have a rectangular shape that necessitates the use of a division operation per block in the general case. To avoid division operations for DC prediction, only the longer side is used to compute the average for non-square blocks.

2.3. Wide-Angle Intra Prediction for Non-Square Blocks

Conventional angular intra prediction directions are defined from 45 degrees to −135 degrees in clockwise direction. In VTM2, several conventional angular intra prediction modes are adaptively replaced with wide-angle intra prediction modes for non-square blocks. The replaced modes are signaled using the original method and remapped to the indexes of wide angular modes after parsing. The total number of intra prediction modes for a certain block is unchanged, e.g., 67, and the intra mode coding is unchanged.

Figures 3A, 3B:
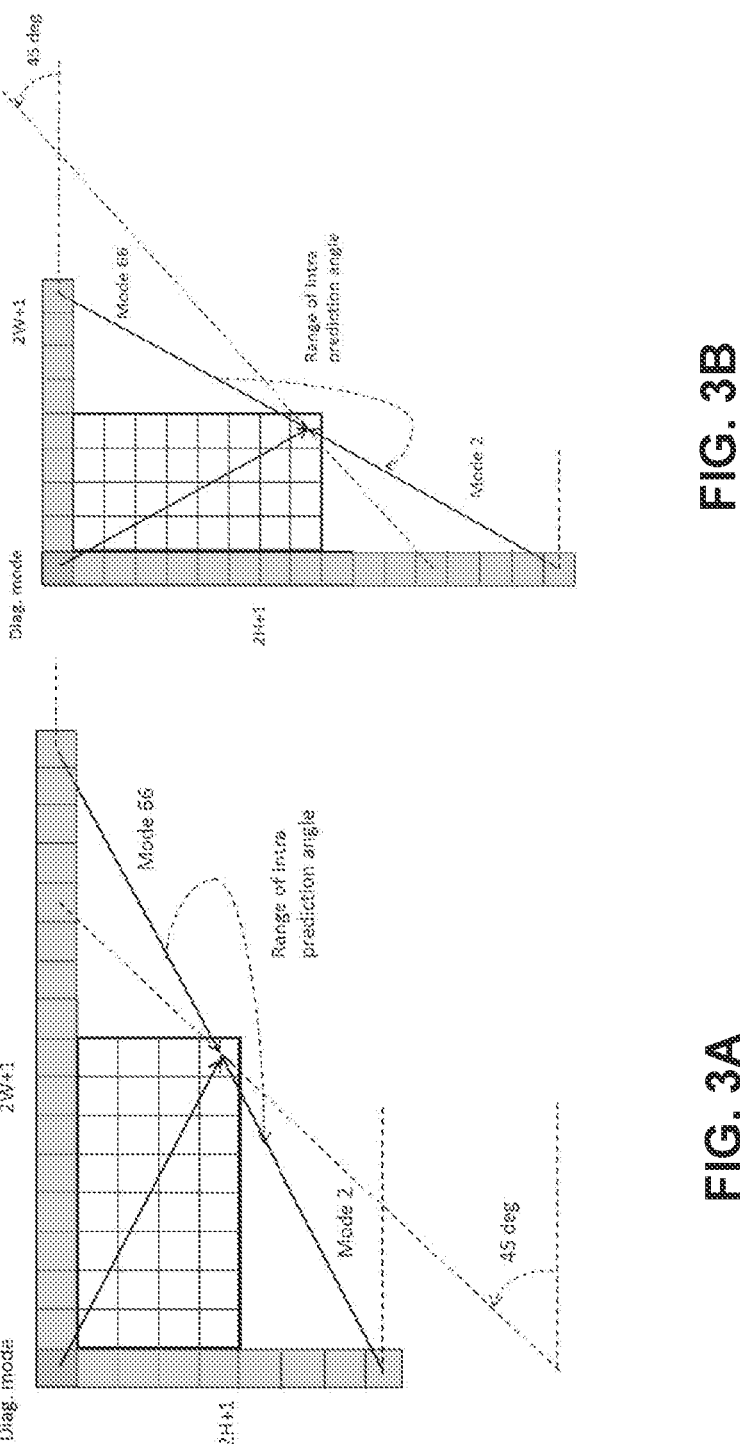
FIG. 3A shows an example of reference samples for wide-angular intra prediction
FIG. 3B shows another example of reference samples for wide-angular intra prediction.

To support these prediction directions, the top reference with length 2 W+1, and the left reference with length 2H+1, are defined as shown in FIG. 3A-3B.

The mode number of replaced mode in wide-angular direction mode is dependent on the aspect ratio of a block. The replaced intra prediction modes are illustrated in Table 1.

TABLE 1

| Intra prediction modes replaced by wide-angular modes | |
| --- | --- |
| Condition | Replaced intra prediction modes |
| W/H == 2 | Modes 2, 3, 4, 5, 6, 7 |
| W/H > 2 | Modes 2, 3, 4, 5, 6, 7, 8, 9, 10, 11 |
| W/H == 1 | None |
| H/W == 1/2 | Modes 61, 62, 63, 64, 65, 66 |
| H/W < 1/2 | Mode 57, 58, 59, 60, 61, 62, 63, 64, 65, 66 |

Figure 4:
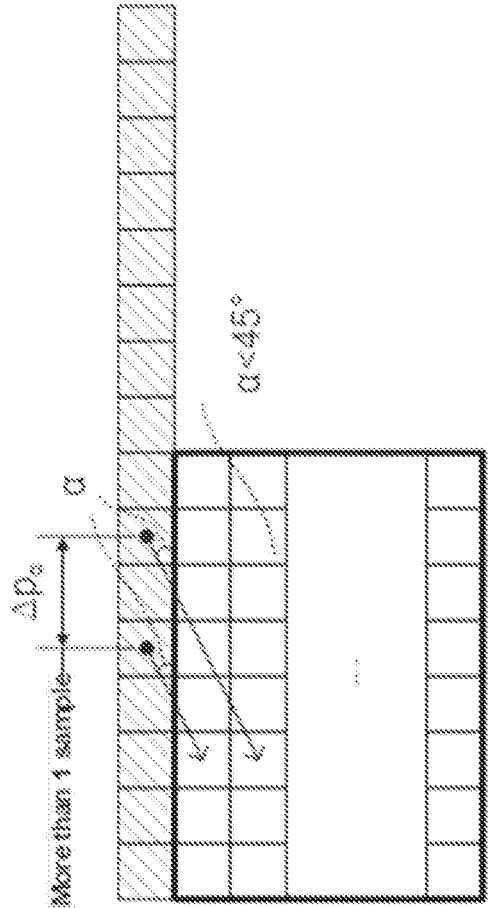
FIG. 4 illustrates a problem of discontinuity in case of directions beyond 45 degree.

As shown in FIG. 4, two vertically-adjacent predicted samples may use two non-adjacent reference samples in the case of wide-angle intra prediction. Hence, low-pass reference samples filter and side smoothing are applied to the wide-angle prediction to reduce the negative effect of the increased gap $\Delta p_\alpha$.

2.4. Position Dependent Intra Prediction Combination

In the VTM2, the results of intra prediction of planar mode are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signaling: planar, DC, horizontal, vertical, bottom-left angular mode and its eight adjacent angular modes, and top-right angular mode and its eight adjacent angular modes.

The prediction sample pred(xy) is predicted using an intra prediction mode (DC, planar, angular) and a linear combination of reference samples according to the Equation as follows: $\text{pred}(xy)=(wL \times R_{-1,y}+wTR_{x,-1}-wTL \times R_{-1,-1}+(64-wL-wT+wTL) \times \text{pred}(xy)+32) >> 6$ where $R_{x,-1}$, $R_{-1,y}$ represent the reference samples located at the top and left of current sample (x, y), respectively, and $R_{-1,-1}$ represents the reference sample located at the top-left corner of the current block.

If PDPC is applied to DC, planar, horizontal, and vertical intra modes, additional boundary filters are not needed, as required in the case of HEVC DC mode boundary filter or horizontal/vertical mode edge filters.

FIG. 5A-5D illustrate the definition of reference samples ($R_{x,-1}$, $R_{-1,y}$ and $R_{-1,-1}$) for PDPC applied over various prediction modes. The prediction sample pred (x', y') is located at (x', y') within the prediction block. The coordinate x of the reference sample $R_{x,-1}$ is given by: x=x' +y' +1, and the coordinate y of the reference sample $R_{-1,y}$ is similarly given by: y=x'+y'+1. FIG. 5A shows a diagonal top-right mode. FIG. 5B shows a diagonal bottom-left mode. FIG. 5C shows an adjacent diagonal top-right mode. FIG. 5D shows an adjacent diagonal bottom-left mode.

The PDPC weights are dependent on prediction modes and are shown in Table 2.

TABLE 2

| Example of PDPC weights according to prediction modes | | | |
|---|---|---|---|
| Prediction modes | wT | wL | wTL |
| Diagonal top-right | 16 >> ( ( y' << 1 ) >> shift) | 16 >> ( ( x' << 1 ) >> shift) | 0 |
| Diagonal bottom-left | 16 >> ( ( y' << 1 ) >> shift ) | 16 >> ( ( x' << 1 ) >> shift ) | 0 |
| Adjacent diagonal top-right | 32 >> ( ( y' << 1 ) >> shift ) | 0 | 0 |
| Adjacent diagonal bottom-left | 0 | 32 >> ( ( x' << 1 ) >> shift ) | 0 |

2.5. Intra Subblock Partitioning (ISP)

Figure 6:
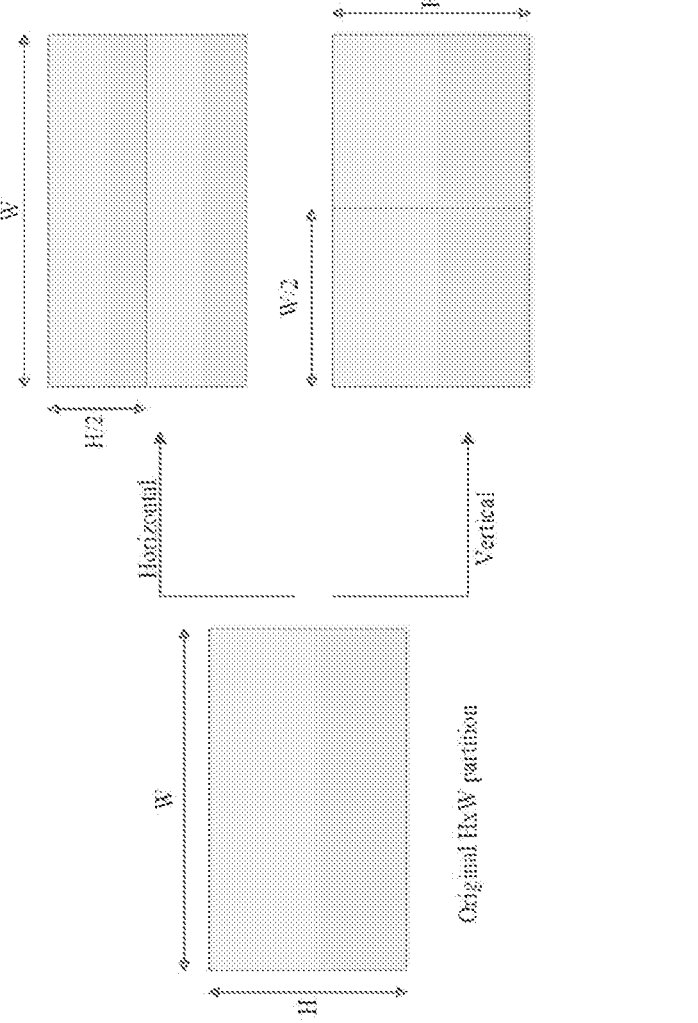
FIG. 6 shows an example of division of 4×8 and 8×4 blocks.
Figure 7:
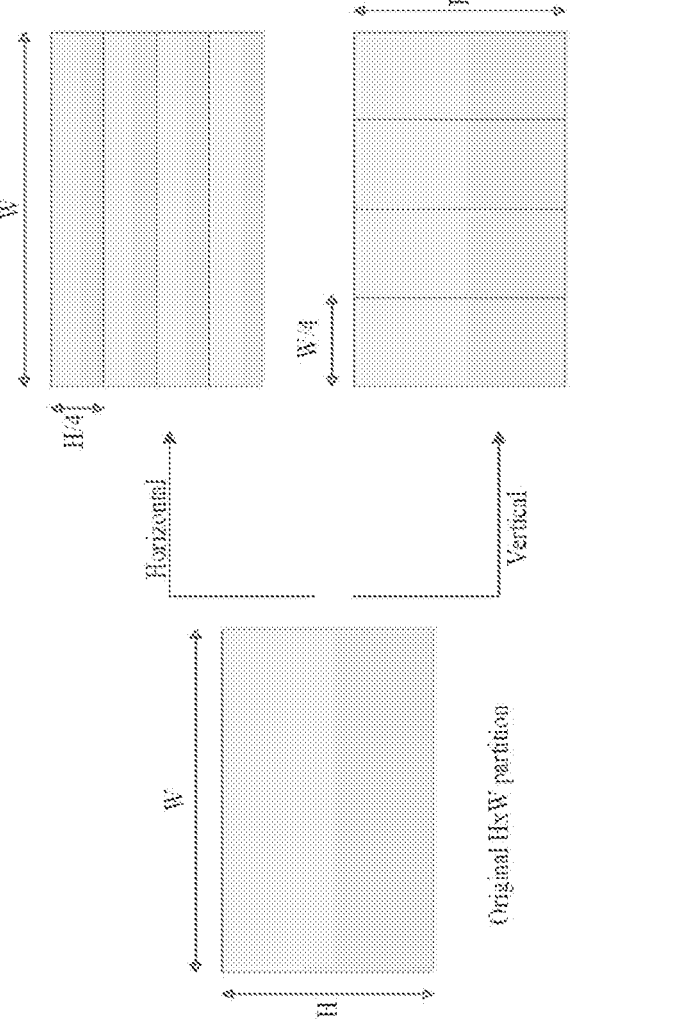
FIG. 7 shows an example of division of all blocks except 4×8, 8×4 and 4×4.

In some embodiments, ISP is proposed, which divides luma intra-predicted blocks vertically or horizontally into 2 or 4 sub-partitions depending on the block size dimensions, as shown in Table 3. FIG. 6 and FIG. 7 show examples of the two possibilities. All sub-partitions fulfill the condition of having at least 16 samples.

TABLE 3

| Number of sub-partitions depending on the block size. | |
|---|---|
| Block Size | Number of Sub-Partitions |
| 4 × 4 | Not divided |
| 4 × 8 and 8 × 4 | 2 |
| All other cases | 4 |

For each of these sub-partitions, a residual signal is generated by entropy decoding the coefficients sent by the encoder and then invert quantizing and invert transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

Based on the intra mode and the split utilized, two different classes of processing orders are used, which are referred to as normal and reversed order. In the normal order, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. On the other hand, the reverse processing order either starts with the sub-partition containing the bottom-left sample of the CU and continues upwards or starts with sub-partition containing the top-right sample of the CU and continues leftwards.

2.6. Multiple Transform Set (MTS)

In addition to DCT-II which has been employed in HEVC, a Multiple Transform Selection (MTS) scheme is used for residual coding both inter and intra coded blocks. It uses multiple selected transforms from the DCT8/DST7. The newly introduced transform matrices are DST-VII and DCT-VIII. Table 4 shows the basis functions of the selected DST/DCT.

TABLE 4

| transform types and basis functions | |
|---|---|
| Transform Type | Basis function $T_i(j)$, i, j = 0, 1, . . . , N − 1 |
| DCT-II (DCT2) | $T_i(j) = \omega_0 \cdot \sqrt{\dfrac{2}{N}} \cdot \cos\left(\dfrac{\pi \cdot i \cdot (2j+1)}{2N}\right)$ where, $\omega_0 = \begin{cases} \sqrt{\dfrac{2}{N}} & i = 0 \\ 1 & i \neq 0 \end{cases}$ |
| DCT-VIII (DCT8) | $T_i(j) = \sqrt{\dfrac{4}{2N+1}} \cdot \cos\left(\dfrac{\pi \cdot (2i+1) \cdot (2j+1)}{4N+2}\right)$ |
| DST-VII (DST7) | $T_i(j) = \sqrt{\dfrac{4}{2N+1}} \cdot \sin\left(\dfrac{\pi \cdot (2i+1) \cdot (j+1)}{2N+1}\right)$ |

There are two ways to enable MTS, one is explicit MTS; and the other is implicit MTS.

2.6.1. Implicit MTS

Implicit MTS is a recent tool in VVC. The variable implicitMtsEnabled is derived as follows: Whether to enable implicit MTS is dependent on the value of a variabel implicitMtsEnabled. The variable implicitMtsEnabled is derived as follows:

If sps_mts_enabled_flag is equal to 1 and one or more of the following conditions are true, implicitMtsEnabled is set equal to 1:

IntraSubPartitionsSplitType is not equal to ISP_NO_SPLIT (that is, ISP is enabled)

cu_sbt_flag is equal to 1 (that is, ISP is enabled) and Max(nTbW, nTbH) is less than or equal to 32 sps_explicit_mts_intra_enabled_flag is equal to 0 (that is, explicity MTS is disabled) and CuPredMode[0][xTbY][yTbY] is equal to MODE_INTRA and lfnst_idx[x0][y0] is equal to 0 and intra_mip_flag[x0][y0] is equal to 0

Otherwise, implicitMtsEnabled is set equal to 0.

The variable trTypeHor specifying the horizontal transform kernel and the variable trTypeVer specifying the vertical transform kernel are derived as follows:

If one or more of the following conditions are true, trTypeHor and trTypeVer are set equal to 0 (e.g., DCT2).

cIdx is greater than 0 (that is, for a chroma component)

IntraSubPartitionsSplitType is not equal to ISP_NO_SPLIT and lfnst_idx is not equal to 0

Otherwise, if implicitMtsEnabled is equal to 1, the following applies:

If cu_sbt_flag is equal to 1, trTypeHor and trTypeVer are specified in Table 40 depending on cu_sbt_horizontal_flag and cu_sbt_pos_flag.

Otherwise (cu_sbt_flag is equal to 0), trTypeHor and trTypeVer are derived as follows:

$$\text{Trtypehor}=(\text{ntbw}>=4\ \&\&\ \text{ntbw}<=16)?1{:}0 \tag{1188}$$

$$\text{Trtypever}=(\text{ntbh}>=4\ \&\&\ \text{ntbh}<=16)?1{:}0 \tag{1189}$$

Otherwise, trTypeHor and trTypeVer are specified in Table 39 depending on mts_idx.

The variables nonZeroW and nonZeroH are derived as follows:

If ApplyLfnstFlag is equal to 1 and ntbw is greater than or equal to 4 and ntbh is greater than or equal to 4, the Following applies:

$$\text{nonZeroW}=(\text{ntbw}==4\ \text{ntbh}==4)?4{:}8 \tag{1190}$$

$$\text{nonZeroH}=(\text{ntbw}==4\ \text{ntbh}==4)?4{:}\ 8 \tag{1191}$$

Otherwise, the following applies:

$$\text{nonZeroW}=\text{Min}(\text{ntbw},\ (\text{trTypeHor}>0)?16{:}\ 32) \tag{1192}$$

$$\text{nonZeroH}=\text{Min}(\text{ntbh},\ (\text{trTypeVer}>0)?16{:}\ 32) \tag{1193}$$

2.6.2. Explicit MTS

In order to control MTS scheme, one flag is used to specify whether explicit MTS for intra/inter is present in a bitstream. In addition, two separate enabling flags are specified at SPS level for intra and inter, respectively to indicate whether explicit MTS is enabled. When MTS is enabled at SPS, a CU level transform index may be signaled to indicate whether MTS is applied or not. Here, MTS is applied only for luma. The MTS CU level index (denoted by mts_idx) is signaled when the following conditions are satisfied.

Both width and height smaller than or equal to 32

CBF luma flag is equal to one

Non-TS

Non-ISP

Non-SBT

LFNST is disabled

Non-zero coefficient is existing which is not in the DC position (top-left position of a block)

There are no non-zero coefficients outside the top-left 16×16 region

If $1^{st}$ bin of mts_idx is equal to zero, then DCT2 is applied in both directions. However, if $1^{st}$ bin of the mts_idx is equal to one, then two more bins are additionally signaled to indicate the transform type for the horizontal and vertical directions, respectively. Transform and signaling mapping table as shown in Table 5. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

TABLE 5

| signaling of MTS | | | | | |
| --- | --- | --- | --- | --- | --- |
| | | | Intra/inter | | |
| $0^{th}$-bin | $1^{st}$-bin | $2^{nd}$-bin | Horizontal | Vertical | mts_idx |
| 0 | | | DCT2 | | 0 |
| 1 | 0 | 0 | DST7 | DST7 | 1 |

TABLE 5-continued

| signaling of MTS | | | | | |
| --- | --- | --- | --- | --- | --- |
| | | | Intra/inter | | |
| $0^{th}$-bin | $1^{st}$-bin | $2^{nd}$-bin | Horizontal | Vertical | mts_idx |
| | 0 | 1 | DCT8 | DST7 | 2 |
| | 1 | 0 | DST7 | DCT8 | 3 |
| | 1 | 1 | DCT8 | DCT8 | 4 |

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

As in HEVC, the residual of a block can be coded with transform skip mode. To avoid the redundancy of syntax coding, the transform skip flag is not signaled when the CU level MTS_CU_flag is not equal to zero. The block size limitation for transform skip is the same to that for MTS in JEM4, which indicate that transform skip is applicable for a CU when both block width and height are equal to or less than 32.

2.6.3. Zero-out in MTS

In VTM8, large block-size transforms, up to 64×64 in size, are enabled, which is primarily useful for higher resolution video, e.g., 1080p and 4K sequences. High frequency transform coefficients of blocks with DCT2 transform applied are zeroed out for the transform blocks with size (width or height, or both width and height) no smaller than 64, so that only the lower-frequency coefficients are retained, all other coefficients are forced to be zeros without being signaled. For example, for an MxN transform block, with M as the block width and N as the block height, when M is no smaller than 64, only the left 32 columns of transform coefficients are kept. Similarly, when N is no smaller than 64, only the top 32 rows of transform coefficients are kept.

High frequency transform coefficients of blocks with DCT8 or DST7 transform applied are zeroed out for the transform blocks with size (width or height, or both width and height) no smaller than 32, so that only the lower-frequency coefficients are retained, all other coefficients are forced to be zeros without being signaled. For example, for an MxN transform block, with M as the block width and N as the block height, when M is no smaller than 32, only the left 16 columns of transform coefficients are kept. Similarly, when N is no smaller than 32, only the top 16 rows of transform coefficients are kept.

2.7. Low Frequency Non-Separable Secondary Transform (LFNST)

2.7.1. Non-Separable Secondary Transform (NSST) in JEM

Figure 8:
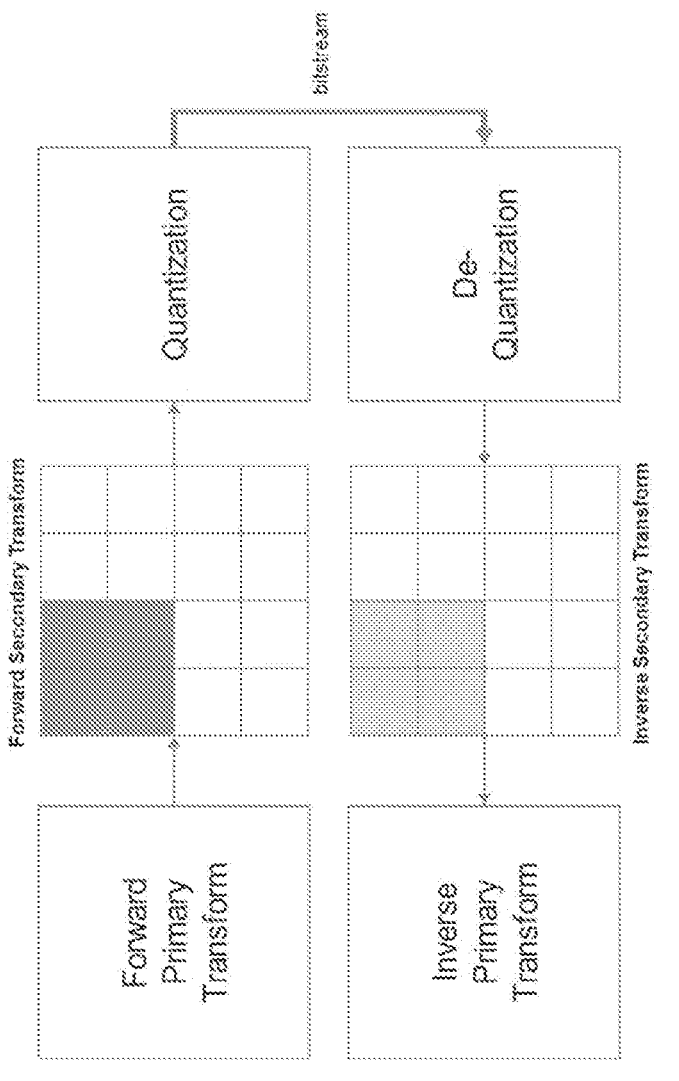
FIG. 8 shows an example of a secondary transform in JEM.

In JEM, secondary transform is applied between forward primary transform and quantization (at encoder) and between de-quantization and invert primary transform (at decoder side). As shown in FIG. 8, 4×4 (or 8×8) secondary transform is performed depends on block size. For example, 4×4 secondary transform is applied for small blocks (e.g., min (width, height)<8) and 8×8 secondary transform is applied for larger blocks (e.g., min (width, height) >4) per 8×8 block.

Application of a non-separable transform is described as follows using input as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is first represented as a vector $\vec{X}$ : $\vec{X}$ =[$X_{00}$ $X_{01}$ $X_{02}$ $X_{03}$ $X_{10}$ $X_{11}$ $X_{12}$ $X_{13}$ $X_{20}$ $X_{21}$ $X_{22}$ $X_{23}$ $X_{30}$ $X\_X_{32}$ $X_{33}$]$^T$ The non-separable transform is calculated as $\vec{F}$ =T$\vec{X}$ , where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index will be placed with the smaller scanning index in the 4×4 coefficient block. There are totally 35 transform sets and 3 non-separable transform matrices (kernels) per transform set are used. The mapping from the intra prediction mode to the transform set is pre-defined. For each transform set, the selected non-separable secondary transform candidate is further specified by the explicitly signaled secondary transform index. The index is signaled in a bit-stream once per Intra CU after transform coefficients.

2.7.2. Reduced Secondary Transform (LFNST)

Figure 9:
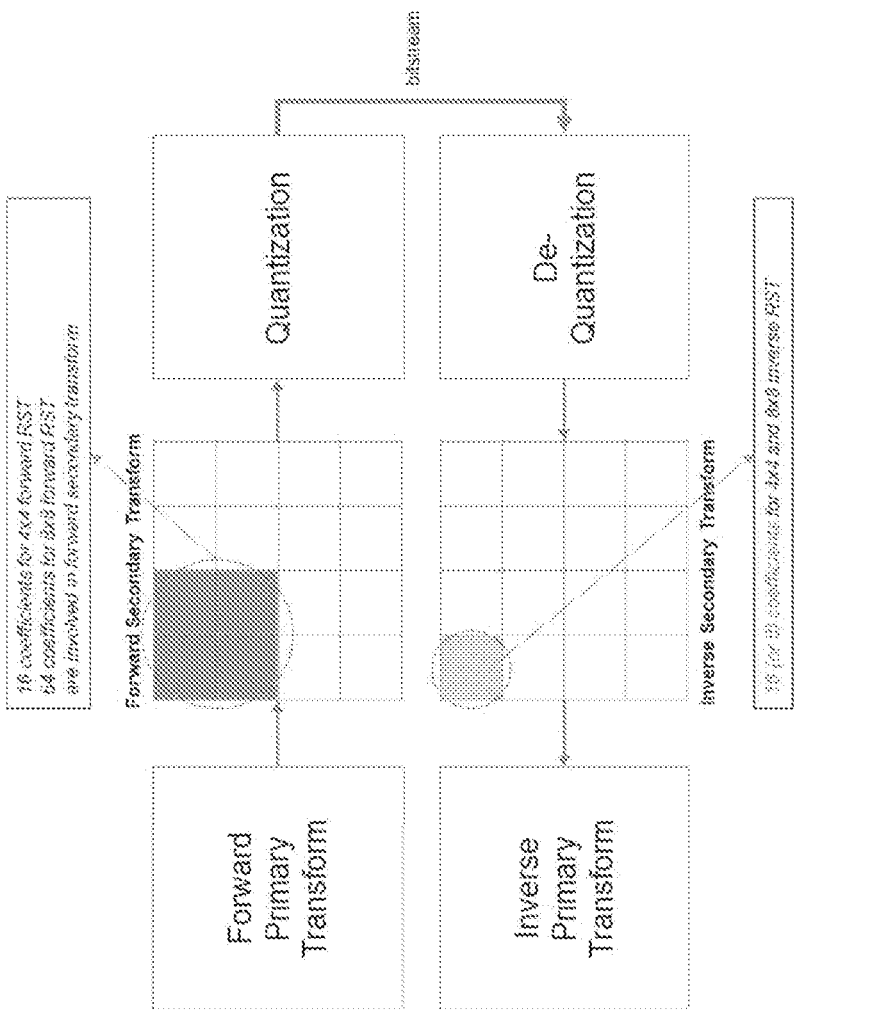
FIG. 9 shows an example of reduced secondary transform LFNST.

The LFNST was introduced and 4 transform set (instead of 35 transform sets) mapping has been used in some embodiments. In some implementations, 16×64 (may further be reduced to 16×48) and 16×16 matrices are employed for 8×8 and 4×4 blocks, respectively. For notational convenience, the 16×64 (may further be reduced to 16×48) transform is denoted as LFNST8×8 and the 16×16 one as LFNST4×4. FIG. 9 shows an example of LFNST.

LFNST Computation

Figures 10A, 10B:
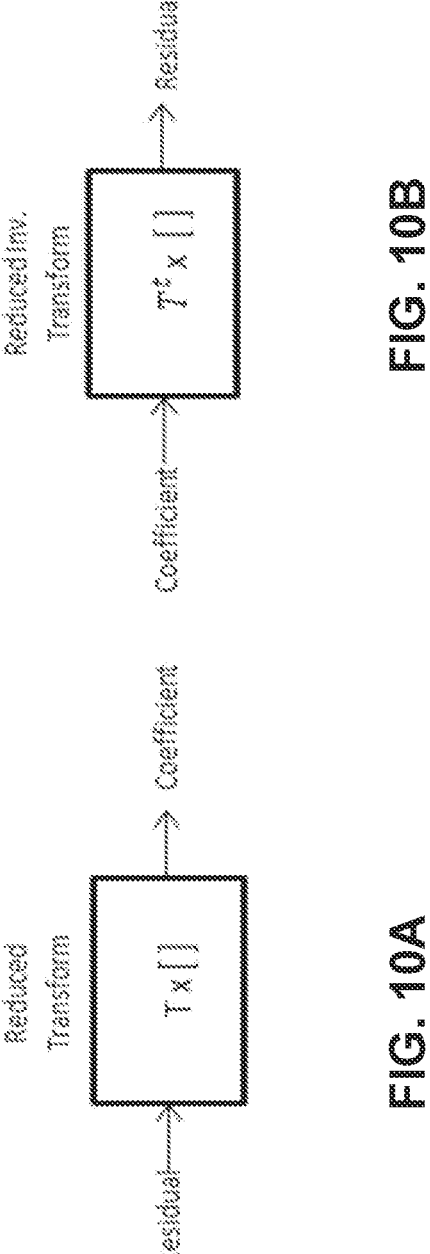
FIG. 10A shows an example of a forward reduced transform.
FIG. 10B shows an example of an invert reduced transform.

The main idea of a Reduced Transform (RT) is to map an N dimensional vector to an R dimensional vector in a different space, where R/N (R<N) is the reduction factor. The RT matrix is an R×N matrix as follows:

$$T_{R \times N} = \begin{bmatrix} t_{11} & t_{12} & t_{13} & \cdots & t_{1N} \\ t_{21} & t_{22} & t_{23} & & t_{2N} \\ \vdots & & \ddots & & \vdots \\ t_{R1} & t_{R2} & t_{R2} & \cdots & t_{RN} \end{bmatrix}$$

where the R rows of the transform are R bases of the N dimensional space. The invert transform matrix for RT is the transpose of its forward transform. The forward and invert RT are depicted in FIGS. 10A, 10B.

In this contribution, the LFNST8×8 with a reduction factor of 4 (¼ size) is applied. Hence, instead of 64×64, which is conventional 8×8 non-separable transform matrix size, 16×64 direct matrix is used. In other words, the 64×16 invert LFNST matrix is used at the decoder side to generate core (primary) transform coefficients in 8×8 top-left regions. The forward LFNST8×8 uses 16×64 (or 8×64 for 8×8 block) matrices so that it produces non-zero coefficients only in the top-left 4×4 region within the given 8×8 region. In other words, if LFNST is applied then the 8×8 region except the top-left 4×4 region will have only zero coefficients. For LFNST4×4, 16×16 (or 8×16 for 4×4 block) direct matrix multiplication is applied.

An invert LFNST is conditionally applied when the following two conditions are satisfied:

a. Block size is greater than or equal to the given threshold (W>=4 && H>=4)

b. Transform skip mode flag is equal to zero

If both width (W) and height (H) of a transform coefficient block is greater than 4, then the LFNST8×8 is applied to the top-left 8×8 region of the transform coefficient block. Otherwise, the LFNST4×4 is applied on the top-left min(8, W)×min(8, H) region of the transform coefficient block.

If LFNST index is equal to 0, LFNST is not applied. Otherwise, LFNST is applied, of which kernel is chosen with the LFNST index. The LFNST selection method and coding of the LFNST index are explained later.

Furthermore, LFNST is applied for intra CU in both intra and inter slices, and for both Luma and Chroma. If a dual tree is enabled, LFNST indices for Luma and Chroma are signaled separately. For inter slice (the dual tree is disabled), a single LFNST index is signaled and used for both Luma and Chroma.

In 13$^{th}$ JVET meeting, Intra Sub-Partitions (ISP), as a new intra prediction mode, was adopted. When ISP mode is selected, LFNST is disabled and LFNST index is not signaled, because performance improvement was marginal even if LFNST is applied to every feasible partition block. Furthermore, disabling LFNST for ISP-predicted residual could reduce encoding complexity.

LFNST Selection

A LFNST matrix is chosen from four transform sets, each of which consists of two transforms. Which transform set is applied is determined from intra prediction mode as the following:

1) If one of three CCLM modes is indicated, transform set 0 is selected.

2) Otherwise, transform set selection is performed according to Table 6.

TABLE 6

| transform set selection table | |
| --- | --- |
| IntraPredMode | Tr. set index |
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

The index to access the Table, denoted as IntraPredMode, have a range of [−14, 83], which is a transformed mode index used for wide angle intra prediction.

LFNST Matrices of Reduced Dimension

Figure 11:
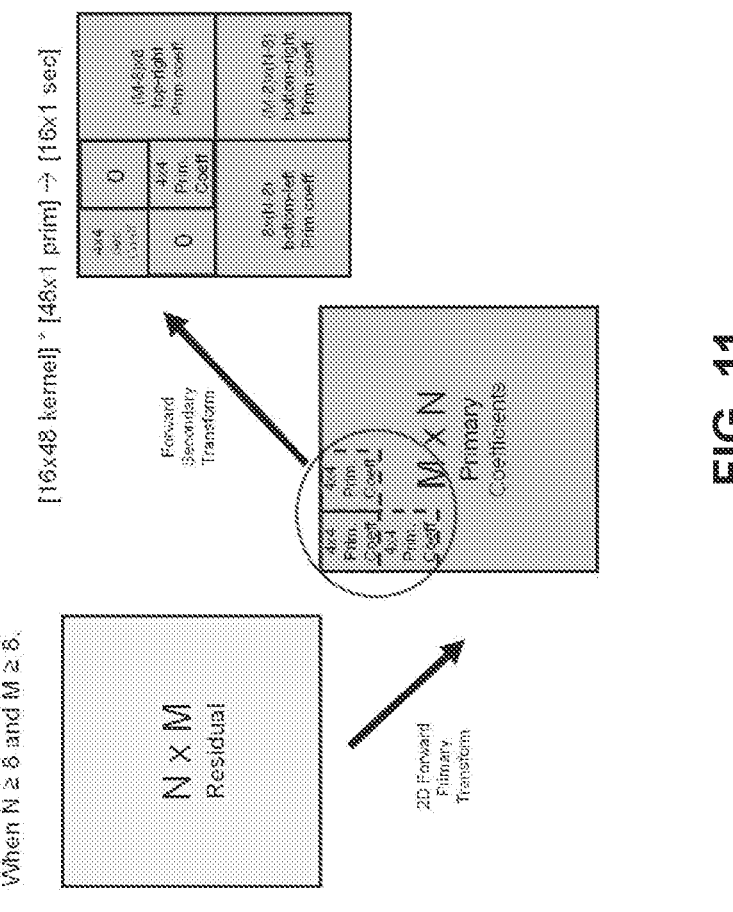
FIG. 11 shows an example of forward LFNST8×8 process with 16×48 matrix.

As a further simplification, 16×48 matrices are applied instead of 16×64 with the same transform set configuration, each of which takes 48 input data from three 4×4 blocks in a top-left 8×8 block excluding right-bottom 4×4 block (FIG. 11).

LFNST Signaling

Figure 12:
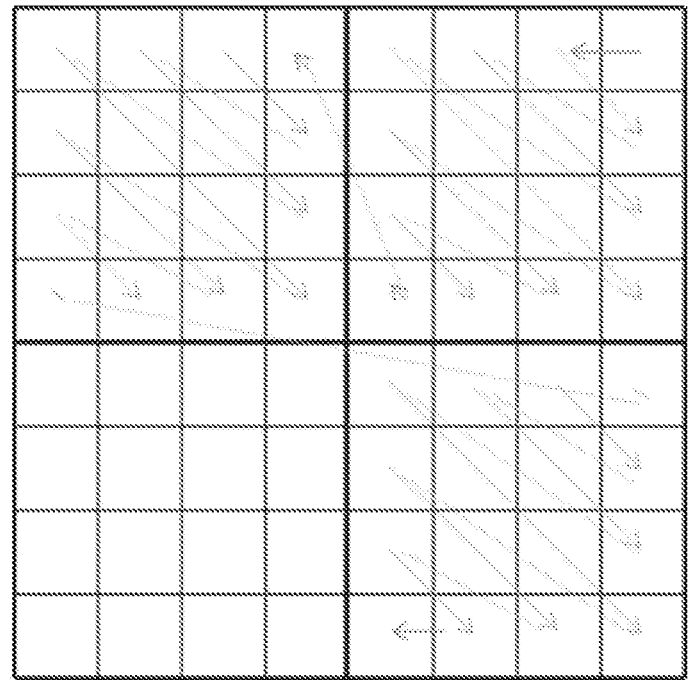
FIG. 12 illustrates an example of scanning position 17 to 64 for non-zero element.

The forward LFNST8×8 with R=16 uses 16×64 matrices so that it produces non-zero coefficients only in the top-left 4×4 region within the given 8×8 region. In other words, if LFNST is applied then the 8×8 region except the top-left 4×4 region generates only zero coefficients. As a result, LFNST index is not coded when any non-zero element is detected within 8×8 block region other than top-left 4×4 (which is depicted in FIG. 12) because it implies that LFNST was not applied. In such a case, LFNST index is inferred to be zero.

Zero-Out Range

Usually, before applying the invert LFNST on a 4×4 sub-block, any coefficient in the 4×4 sub-block may be non-zero. However, it is constrained that in some cases, some coefficients in the 4×4 sub-block must be zero before invert LFNST is applied on the sub-block.

Let nonZeroSize be a variable. It is required that any coefficient with the index no smaller than nonZeroSize when it is rearranged into a 1-D array before the invert LFNST must be zero.

When nonZeroSize is equal to 16, there is no zero-out constrain on the coefficients in the top-left 4×4 sub-block.

In some embodiments, when the current block size is 4×4 or 8×8, nonZeroSize is set equal to 8. For other block dimensions, nonZeroSize is set equal to 16.

2.8. Affine Linear Weighted Intra Prediction (ALWIP, a.k.a. Matrix Based Intra Prediction)

Affine linear weighted intra prediction (ALWIP, a.k.a. Matrix based intra prediction (MIP)) is used in some embodiments.

In some embodiments, two tests are conducted. In test 1, ALWIP is designed with a memory restriction of 8K bytes and at most 4 multiplications per sample. Test 2 is similar to test 1, but further simplifies the design in terms of memory requirement and model architecture.

Single set of matrices and offset vectors for all block shapes.

Reduction of number of modes to 19 for all block shapes.

Reduction of memory requirement to 5760 10-bit values, that is 7.20 Kilobyte.

Linear interpolation of predicted samples is carried out in a single step per direction replacing iterative interpolation as in the first test.

2.9. Sub-Block Transform

For an inter-predicted CU with cu_cbf equal to 1, cu_sbt flag may be signaled to indicate whether the whole residual block or a sub-part of the residual block is decoded. In the former case, inter MTS information is further parsed to determine the transform type of the CU. In the latter case, a part of the residual block is coded with inferred adaptive transform and the other part of the residual block is zeroed out. The SBT is not applied to the combined inter-intra mode.

Figure 13:
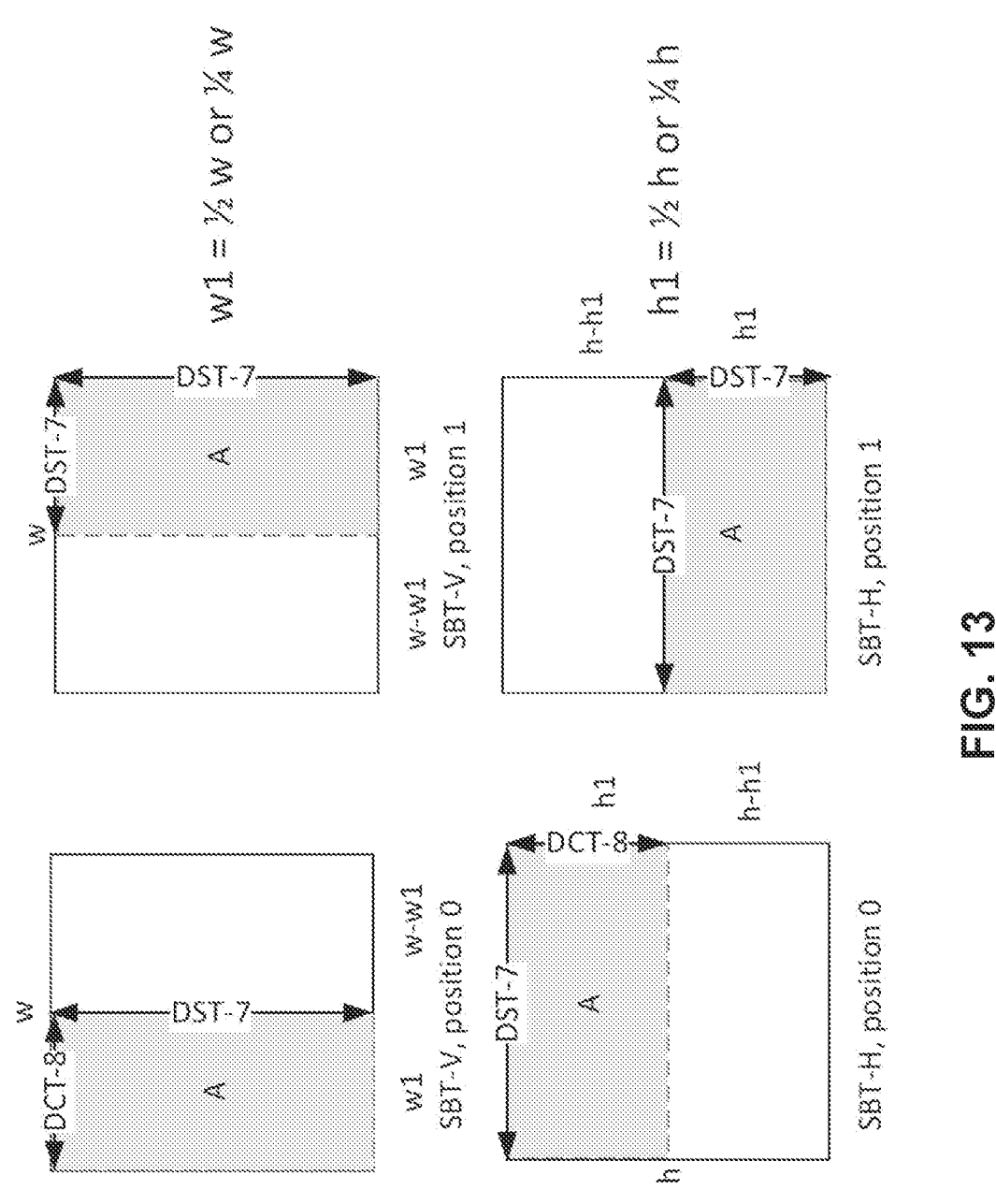
FIG. 13 is an example Illustration of sub-block transform modes SBT-V and SBT-H.

In sub-block transform, position-dependent transform is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 13. For example, the horizontal and vertical transforms for SBT-V position 0 is DCT-8 and DST-7, respectively. When one side of the residual TU is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

2.10. Scan Region Based Coefficient Coding (SRCC)

Figure 14B:
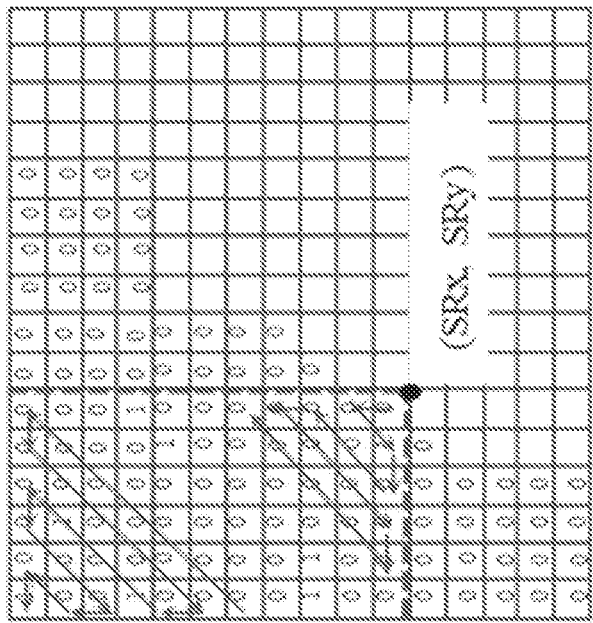
FIG. 14B illustrates another example of Scan region based Coefficient Coding (SRCC).
Figure 14A:
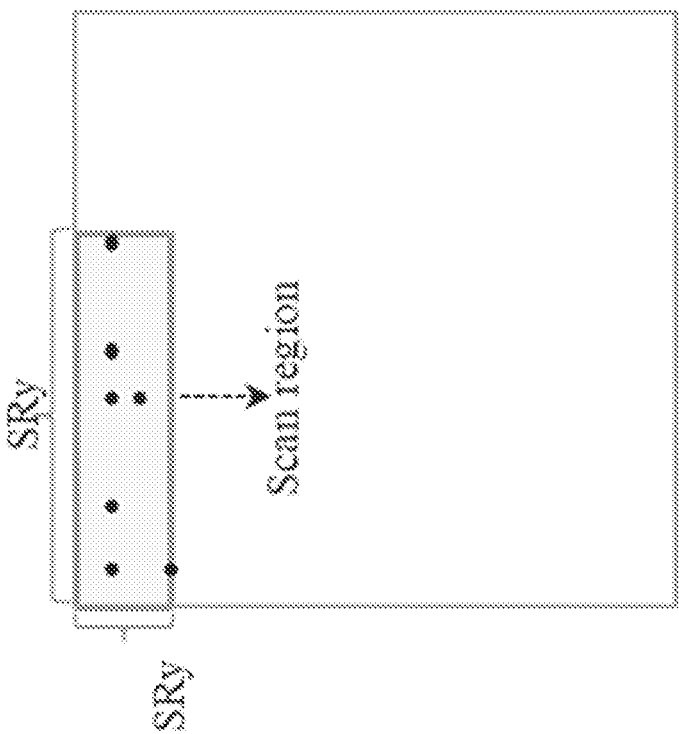
FIG. 14A illustrates an example of Scan region based Coefficient Coding (SRCC).

SRCC has been adopted into AVS-3. With SRCC, a bottom-right position (SRx, SRy) as shown in FIGS. 14A-14B is signaled, and only coefficients inside a rectangle with four corners (0, 0), (SRx, 0), (0, SRy), (SRx, SRy) are scanned and signaled. All coefficients out of the rectangle are zero.

2.11. Implicit Selection of Transform (IST)

As disclosed in PCT/CN2019/090261 (incorporated herein by reference), an implicit selection of transform solution is given where the selection of transform matrices (either DCT2 for both horizontal and vertical transform or DST7 for both) is determined by the parity of non-zero coefficients in the transform block.

The proposed method is applied to luma component of intra coded blocks excluding those blocks coded with DT, and the allowed block sizes are from 4×4 to 32×32. The transform type is hidden in the transform coefficients. Specifically, the parity of the number of significant coefficients (e.g., non-zero coefficients) in one block is employed to represent the transform types. Odd number indicates DST-VII is applied, while even number indicates DCT-II is applied.

Figure 15A:
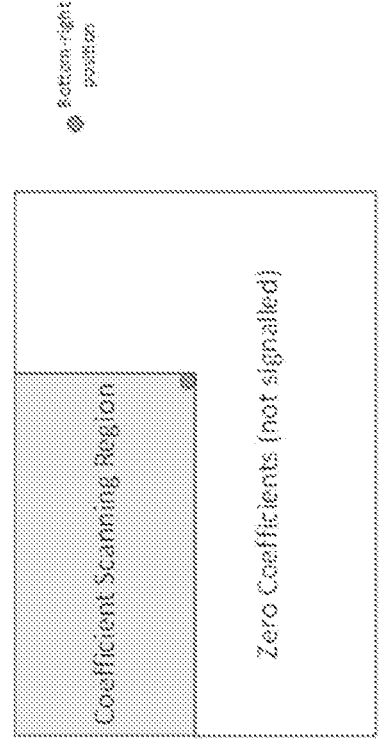
FIG. 15A illustrates an example restriction of IST according to non-zero coefficients' positions.
Figure 15B:
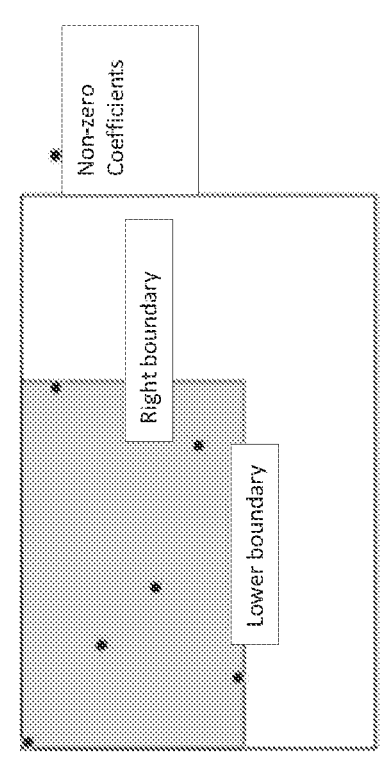
FIG. 15B illustrates another example restriction of IST according to non-zero coefficients' positions.

To remove the 32-point DST-7 introduced by IST, it is proposed to restrict the usage of IST based on the range of residual scanning region when SRCC is used. As shown in FIGS. 15A-15B, IST is disallowed when either x- or y-coordinate of the bottom-right position in the residual scanning region is no smaller than 16. That is, for this case, DCT-II is directly applied.

For another case when run-length coefficient coding is used, each non-zero coefficient needs checking. IST is disallowed when either x- or y- coordinate of one non-zero coefficient position is no smaller than 16.

The corresponding syntax changes are indicated using bold italicized and underlined texts as follows:

| Transform blocks definition | Descriptor |
| --- | --- |
| block(i, blockWidth, blockHeight, CuCtp, isChroma, isPcm, component) { | |
| ... | |
|   if (! isPcm) { | |
|     if (CuCtp & (1 << i)) { | |
|       if (SrccEnableFlag) { | |
|         scan_region_x | ae(v) |
|         scan_region_y | ae(v) |
|         initScanOrder( ScanOrder, scan_region_x + 1, scan_region_y + 1, blockWidth ) | |
|         lastScanPos = ( (scan_region_x + 1) * (scan_region_y + 1) ) − 1 | |
|         lastSet = lastScanPos >> 4 | |
|         is_last_x = 0 | |
|         is_last_y = 0 | |
|         escapeDataPresent = 0 | |
|         *NumNonZeroCoeff = 0* | |
|         for(i = lastset; i >= 0; i—) { | |
|           setPos = i << 4 | |
|           firstSigScanPos = 16 | |
|           lastSigScanPos = −1 | |
|           set_nz[i] = 0 | |
|           for( n = ( i == lastSet ? lastScanPos − setPos : 15); n >= 0; n− − ) { | |
|             blkpos = ScanOrder[ setPos + n ]; | |

-continued

| Transform blocks definition | Descriptor |
|---|---|

```
            sx = blkpos & (blockwidth − 1)
            sy = blkpos >> log2width
            if(( sx = = 0 && sy = = scan_region_y && is_last_y = =0 ) || (sy = = 0 &&
sx = =        scan_region_x && is_last_x = = 0 ) ) {
                sig_flag[ blkpos ] = 1
            }
            else {
                sig_flag[ blkpos ]                                          ae(v)
            }
            if( sig_flag[ blkpos ] ) {
                if( sx = = scan_region_x ) is_last_x = 1
                if( sy = = scan_region_y ) is_last_y = 1
                if( lastSigScanPos = = −1 ) lastSigScanPos = n
                firstSigScanPos = n
                NumNonZeroCoeff ++
                set_nz[i]++
            }
        } // for
        if (set_nz[i]) {
            escapeDataPresent = 0
            for( n = ( i = = lastSet ? lastScanPos − setPos : 15); n >= 0; n− − ) {
                blkpos = ScanOrder[ setPos + n ]
                if( sig_flag[ blkpos ] ) {
                    coeff_abs_level_greater1_flag[ blkpos ]                  ae(v)
                    if(coeff_abs_level_greater1_flag[ blkpos ]) {
                        coeff_abs_level_greater2_flag[ blkpos ]              ae(v)
                        if( coeff_abs_level_greater2_flag[ blkpos ] ) {
                            escapeDataPresent = 1
                        }
                    }
                } // if(sig_flag)
            } // for
        } // if(set_nz[i])
        if( escapeDataPresent ) {
            for( n =( i = = lastSet ? lastScanPos − setPos: 15); n >= 0; n− − ) {
                blkpos = ScanOrder[ setPos + n ];
                if( sig_flag[ blkpos ] ) {
                    base_level = 3
                    abs_coef[ blkpos ] = 1 + coeff_abs_level_greater1_flag[ blkpos ]
+
    coeff_abs_level_greater2_flag[ blkpos ]
                    if( abs_coef[ blkpos ] = = base_level ) {
                        coeff_abs_level_remaining[ blkpos ]                   ue(v)
                        abs_coef[ blkpos ]   +=   coeff_abs_level_remaining
[ blkpos ]
                    }
                }
            } // for
        } // if(escapeDataPresent)
        for( n = ( i = = lastSet ? lastScanPos − setPos : 15); n >= 0; n− − ) {
            blkpos = ScanOrder[ setPos + n ]
            if( sig_flag[ blkpos ] ) {
                coeff_sign [ blkpos ]                                         ae(v)
            }
        } // for
    }
    if (IstEnableFlag && !DtSplitFlag) {
        IstTuFlag   =   (scan_region_x   >=16   ||   scan_region_y >=16)?
0:(NumNonZeroCoeff % 2 ?       1 : 0)
    }
    else {
        blockwidth = isChroma ? blockWidth / 2 : blockwidth
        blockHeight = isChroma ? blockHeight / 2 : blockHeight
        idxW = Log(blockWidth) − 1
        idxH = Log(blockEHeight) − 1
        NumOf Coeff = blockwidth * blockHeight
        NumNonZeroCoeff = 0
        IstTuFlag = 0
        ScanPosOffset = 0
        CoeffRestrict = 0
        do {
            coeff_run
            coeff_level_minus1
            coeff_sign
            AbsLevel = coeff_level_minus1 + 1
            if (AbsLevel != 0) {
                NumNonZeroCoeff ++
```

-continued

| Transform blocks definition | Descriptor |
|---|---|

```
          }
          ScanPosOffset = ScanPosOffset + coeff_run
          PosxInBlk = InvScanCoeffInBlk[idxW][idxH][ScanPosOffset][0]
          PosyInBlk = InvScanCoeffInBlk[idxW][idxH][ScanPosOffset][1]
          if (PosxInBlk >= 16 ||PosyInBlk >= 16) {
             CoeffRestrict = 1
          }
          QuantCoeffMatrix[PosxInBlk][PosyInBlk]  =  coeff_sign  ?  −AbsLevel  :
AbsLevel
          if (ScanPosOffset >= NumOf Coeff − 1) {
            break
          }
          coeff_last
          ScanPosOffset = ScanPosOffset + 1
       } while (! Coeff_last)
     }
     if (IstEnableFlag && ! DtSplitFlag) {
        IstTuFlag = NumNonZero Coeff % 2 ? 1 : 0
     }
     if (CoeffRestrict) {
        IstTuFlag = 0
     }
  }
```

2.12. SBT in AVS3

The corresponding syntax changes are highlighted as follows (bold italics):

| Coding Unit Definition | Descriptor |
|---|---|

```
coding_unit(x0, y0, width, height, mode, component) {
                    ...
   if (! IntraCuFlag && ! SkipFlag) {
                    ...
     if (! CtpZeroFlag) {
                    ...
       if (PbtEnableFlag && (width / height < 4) && (height / width < 4) && (width >= 8) &&
(width <= 32) && (height >= 8) && (height <= 32) && (InterpfFlag == 0)) {
          pbt_cu_flag                                                              ae(v)
       }
       if (! PbtCuFlag) {
                    ...
          if (SbtEnableFlag && (width <= 64) & & (height <= 64)&& (width > 4 ||height > 4)
&& (InterpfFlag == 0) && ctp_y[0] ) {
             sbt_cu_flag                                                           u(1)
          if (SbtEnableFlag && (width <= 64)&& (height <= 64)&& (width > 4 |height >
4) && (InterpfFlag == 0) && ctp_y[0] ) {
             sbt_cu_flag                                                           u(1)
             if (SbtCuFlag) {
                SbtVerHalf = width >= 8
                SbtVerQuad = width >= 16
                SbtHorHalf = height >= 8
                SbtHorQuad = height >= 16
                if ( (SbtVerHalf ||SbtHorHalf) &&(SbtVerQuad ||SbtHorQuad) ) {
                   sbt_quad_flag                                                   ae(v)
                }
                if ( (SbtQuadFlag&& SbtVerQuad && SbtVHorQuad) ||(!SbtQuadFlag
&& SbtVerHalf && SbtHorHalf)) {
                   sbt_dir_flag                                                    ae(v)
                }
                sbt_pos_flag                                                      ae(v)
             }
          }
                    ...
       }
                    ...
     }
                    ...
   }
                    ...
  }
                    ...
}
```

7.2.6 Coding Unit

Sub-block transformation flag sbt_cu_flag

Binary variable. See 8.3 for analysis process. The value of SbtCuFlag is equal to the value of sbt_cu_flag. If sbt_cu_flag does not exist in the bit stream, the value of SbtCuFlag is 0.

Sub-block transformation quarter size flag sbt_quad_flag

Binary variable. See 8.3. for the analysis process. The value of SbtQuadFlag is equal to the value of sbt_quad_flag. If sbt_quad_flag does not exist in the bitstream, the value of SbtQuadFlag is 0.

Sub-block transformation direction flag sbt_dir_flag

Binary variable. For the analysis process, see 8.3. The value of SbtDirFlag is equal to the value of sbt_dir_flag. If sbt_dir_flag does not exist in the bitstream, when SbtQuadFlag is 1, the value of SbtDirFlag is equal to the value of SbtHorQuad; when SbtQuadFlag is 0, the value of SbtDirFlag is equal to the value of SbtHorHalf.

Sub-block transfonnation position flag sbt_pos_flag

Binary variable. See 8.3 for the analysis process. The value of SbtPosFlag is equal to the value of sbt_pos_flag. If sbt_pos_flag does not exist in the bit stream, the value of SbtPosFlag is 0.

3. Examples of Technical Problems Addressed by Disclosed Technical Solutions The current design of IST and MTS has the following problems:

1. TS mode in VVC is signaled in block level. However, DCT2 and DST7 are working well for residual blocks in camera captured sequences while for videos with screen content, transform skip (TS) mode is more frequently used compared to DST7. How to determine the usage of TS mode in a more efficient way needs to be studied.

2. In VVC, the maximum allowed TS block size is set to 32×32. How to support TS for large blocks needs to be further studied.

4. Example Techniques and Embodiments

The items listed below should be considered as examples to explain general concepts. These items should not be interpreted in a narrow way. Furthermore, these items can be combined in any manner. min(x, y) returns the smaller one of x and y.

Implicit Determination of Transform Skip Mode/Identity Transform

It is proposed to determine whether horizontal and/or vertical identity transform (IT) (e.g., the transform skip mode) is applied to a current first block according to decoded coefficients of one or multiple representative blocks. Such a method is called 'implicit determination of IT'. When horizontal and vertical transforms are both ITs, transform skip (TS) mode is used for the current first block.

The 'block' may be a transform unit (TU)/prediction unit (PU)/coding unit (CU)/transform block (TB)/prediction block (PB)/coding block (CB). The TU/PU/CU may include one or multiple color components, such as only luma component for the dual tree partitioning and current coded color component is luma; and two chroma components for the dual tree partitioning and current coded color component is chroma; or three color components for the single tree case.

1. The decoded coefficients may be associated with one or multiple representative blocks in the same color component or different color components to the current first block.

a. In one example, the representative block is the first block, and the decoded coefficients associated with the first block are used to determine the usage of IT on the first block.

b. In one example, the determination on the usage of IT to the first block may depend on the decoded coefficients of multiple blocks comprising at least one block not identical to the first block.

i. In one example, multiple blocks may comprise the first block.

ii. In one example, multiple blocks may comprise one block or plurality of blocks neighboring to the first block.

iii. In one example, multiple blocks may comprise one block or plurality of blocks with the same block dimensions as the first block.

iv. In one example, multiple blocks may comprise last N decoded block satisfying certain conditions, such as with the same prediction mode (e.g., all are intra-coded or IBC-coded) or the same dimensions to the current block, before the first block in the decoding order. N is an integer larger than 1.

1) The same prediction mode may be inter-coded mode.

2) The same prediction mode may be direct-coded mode.

v. In one example, multiple blocks may comprise one block or plurality of blocks not in the same color component as the first block.

1) In one example, the first block may be in the luma component. Multiple blocks may comprise blocks in chroma components (e.g., a second block in the Cb/B component, and a third block in the Cr/R component).

a) In one example, the three blocks are in the same coding unit.

b) Alternatively, furthermore, implicit MTS is applied only to the luma blocks, not to chroma blocks.

2) In one example, the first block in the first color component and the plurality of blocks not in the first component color component comprised in the multiple blocks may be at the corresponding or collocated locations of a picture.

2. The decoded coefficients utilized for determination of usage of IT are called representative coefficients.

a. In one example, representative coefficients only include coefficients unequal to zero (denoted as significant coefficients)

b. In one example, the representative coefficients may be modified before being used to determine the usage of IT.

i. For example, a representative coefficient may be clipped before being used to derive the transforms.

ii. For example, a representative coefficient may be scaled before being used to derive the transforms.

iii. For example, a representative coefficient may be added by an offset before being used to derive the transforms.

iv. For example, representative coefficients may be filtered before being used to derive the transforms.

v. For example, a coefficient or representative coefficients may be mapped to other values (e.g., via look up tables or dequantized) before being used to derive the transforms.

c. In one example, representative coefficients are all the significant coefficients in the representative blocks.

d. Alternatively, representative coefficients are partial of significant coefficients in the representative blocks.

i. In one example, representative coefficients are those decoded significant coefficients which are odd.

1) Alternatively, representative coefficients are those decoded significant coefficients which are even.

ii. In one example, representative coefficients are those decoded significant coefficients which are larger than or no smaller than a threshold.

1) Alternatively, representative coefficients are those decoded significant coefficients where magnitudes of which are larger than or no smaller than a threshold.

iii. In one example, representative coefficients are those decoded significant coefficients which are smaller than or no greater than a threshold.

1) Alternatively, representative coefficients are those decoded significant coefficients where magnitudes of which are smaller than or no greater than a threshold.

iv. In one example, representative coefficients are the first K (K>=1) decoded significant coefficients in the decoding order.

v. In one example, representative coefficients are the last K (K>=1) decoded significant coefficients in the decoding order.

vi. In one example, representative coefficients may be those at a predefined location in a block.

1) In one example, representative coefficients may comprise only one coefficient located at (xPos, yPos) coordinate relative to the representative block. E.g. xPos=yPos=0.

2) In one example, representative coefficients may comprise only one coefficient located at (xPos, yPos) coordinate relative to the representative block. And xPos and/or yPos satisfy the following conditions:

a) In one example, xPos is no greater than a threshold Tx (e.g., 31) and/or yPos is no greater than a threshold Ty (e.g., 31).

b) In one example, xPos is no smaller than a threshold Tx (e.g., 32) and/or yPos is no smaller than a threshold Ty (e.g., 32).

3) For example, the positions may depend on the dimensions of the block.

4) In one example, representative coefficients may comprise only coefficients located at (xPos, yPos) coordinate(s) relative to the representative block. And xPos and/or yPos satisfy the following conditions:

a) In one example, xPos is no greater than athreshold Tx (e.g., 31) and/or yPos is no greater than a threshold Ty (e.g., 31).

b) In one example, xPos is no smaller than a threshold Tx (e.g., 32) and/or yPos is no smaller than a threshold Ty (e.g., 32).

5) In one example, representative coefficients may comprise only coefficients located at (xPos, yPos) coordinate(s) relative to the representative block. And xPos and/or yPos may be derived according to syntax elements which indicate the allowed subblock with non-zero coefficients.

a) In one example, the syntax elements are the same as those used to indicate the pattern of subblock transform (such as SBT, e.g., SbtCu-Flag, SbtQuadFlag, SbtDirFlag, SbtPosFlag, or Position Based Transform (pbt))

vii. In one example, representative coefficients may be those at a predefined position in the coefficient scanning order.

e. Alternatively, representative coefficients may also comprise those zero coefficients.

f. Alternatively, representative coefficients may be those derived from decoded coefficients, such as via clipping to a range, via quantization.

g. In one example, representative coefficients may be coefficients before the last significant coefficient (may include the last significant coefficient).

3. The determination on the usage of IT to the first block may depend on the decoded luma coefficients of the first block.

a. Alternatively, furthermore, the determined usage of IT is only applied to the luma component of the first block while DCT2 is always used for chroma components of the first block.

b. Alternatively, furthermore, the determined usage of IT is applied to all color components of the first block. That is, the same transform matrix is applied to all color components of the first block.

4. The determination ofusage of IT may depend on a function of representative coefficients, such as a function with a value V as the output, using representative coefficients as inputs.

a. In one example, V is derived as the number of representative coefficients.

i. Alternatively, V is derived as the sum of representative coefficients.

1) Alternatively, V is derived as the sum of levels (or their absolute values) of representative coefficients.

2) Alternatively, V may be derived as the level (or its absolute value) of one representative coefficient (such as the last one).

3) Alternatively, V may be derived as the number of representative coefficients whose levels are even numbers.

4) Alternatively, V may be derived as the number of representative coefficients whose levels are odd numbers.

5) Alternatively, furthermore, the sum may be clipped to derive V.

6)

ii. Alternatively, V is derived as the output of a function where the function defines residual energy distribution.

1) In one example, the function returns the ratio of sum of absolute values of partial of representative coefficients compared to the absolute values of all representative coefficients.

2) In one example, the function returns the ratio of sum of square of absolute values of partial of representative coefficients compared to the sum of square of absolute values of all representative coefficients.

3) In one example, the function returns whether the energy of the first K representative coefficients times a scaling factor is greater than the energy of the first M (M>K) or all representative coefficients.

4) In one example, the function returns whether the energy of the representative coefficients in a first sub-region of a representative block times a scaling factor is greater than the energy of the representative coefficients in a second sub-region which contains the first sub-region and larger than the first sub-region.

a) Alternatively, the function returns whether the energy of the representative coefficients in a first sub-region of a representative block times a scaling factor is greater than the energy of the representative coefficients in a second sub-region which is non-overlapped from the first sub-region.

b) In one example, the first sub-region is top-left MxN sub-region (i.e., M=N=1, only DC).

i. Alternatively, the first sub-region is the second sub-region excluding the top-left M×K sub-region (i.e., excluding DC).

c) In one example, the first sub-region is top-left 4×4 sub-region.

5) In above examples, the energy is defined as sum of absolute values or sum of squares of values.

iii. Alternatively, V is derived as whether at least one representative coefficient is located outside a sub-region of a representative block.

1) In one example, the sub-region is defined as the top-left sub-region of the representative block, e.g., the top-left quarter of the representative block.

b. In one example, the determination of usage of IT may be dependent on the parity of V.

i. For example, if V is even, IT is used; and if V is odd, IT is not used.

1) Alternatively, if V is even, IT is used; and if V is odd, IT is not used.

ii. In one example, if V is smaller than a threshold T1, IT is used; and if V is larger than a threshold T2, IT is not used.

1) Alternatively, if V is greater than a threshold T1, IT is used; and if V is smaller than a threshold T2, IT is not used.

iii. For example, the thresholds may depend on the coded information, such as block dimensions, prediction mode.

iv. For example, the threshold may depend on the QP.

c. In one example, the determination of usage of IT may depend on a combination of V and other coding information (e.g, prediction mode, slice/picture types, block dimension).

5. The determination of usage of IT may further depend on the coded information of current block.

a. In one example, the determination may further depend on the mode information (e.g., intra, intra or IBC).

i. In one example, the mode may be inter-coded mode.

ii. In one example, the mode may be direct-coded mode.

iii. In one example, the current block may be coded with the SBT mode (e.g., sbt_cu_flag being equal to 1).

1) Alternatively, furthermore, whether to use the current transform sets (e.g., DCT2/DST7/DCT8) or use the IT may depend on the representative coefficients.

a) In one example, if the determination of usage of IT is that IT is not used, then DCT2/DST7/DCT8 may be used and determination of which transform to be used may follow the prior art (e.g., described in section 2.12, 2.9).

iv. In one example, the determination of usage of IT may depend on a syntax element signaled in a higher level like in picture header and/or sequence header and/or SPS/PPS/VPS/slice header.

b. In one example, whether to apply IT may depend on representative coefficients for an inter-coded block, which is not direct and not using SBT.

c. In one example, IT may be applied for inter-coded blocks if SBT is used.

d. A first message (denoted as ph_ts_inter_enable_flag) is signaled in picture header. An inter-coded block can apply IT only if ph_ts_inter_enable_flag is true. Otherwise, a default transform (such as DCT2) is used.

i. A second message (denoted as ts_inter_enable_flag) is signaled in sequence header. ph_ts_inter_enable_flag is signaled only if ts_inter_enable_flag is true. Otherwise, ph_ts_inter_enable_flag is not signaled and inferred to be false.

e. In one example, the transform determination may depend on a scan region which is a smallest rectangular covering all the significant coefficients (e.g., as depicted FIG. 14).

i. In one example, if the size of the scan region (e.g. width multiplied with height) associated with current block is larger than a given threshold, a default transform (such as DCT-2), including horizontal and vertical transform, may be utilized. Otherwise, the rules, such as defined in bullet 3 (e.g., IT when V is even and DCT-2 when V is odd) may be utilized.

ii. In one example, if the width of the scan region associated with current block is larger (or lower) than a given maximum width (e.g., 16), a default horizontal transform (such as DCT-2) may be utilized. Otherwise, the rules, such as defined in bullet 3 may be utilized.

iii. In one example, if the height of the scan region associated with current block is larger (or lower) than a given maximum height (e.g., 16), a default vertical transform (such as DCT-2) may be utilized. Otherwise, the rules, such as defined in bullet 3 may be utilized.

iv. In one example, the given size is LxK where L and K are integers, such as 16.

v. In one example, the default transform matrix may be DCT-2 or DST-7.

f. In one example, only when the conditions (e.g., mode information) are satisfied, the determination of usage of IT may be invoked, otherwise, other transforms (excluding identity transform) may be used instead.

6. One or multiple of the methods disclosed in bullet 1-bullet 5 can only be applied to specific blocks.

a. For example, one or multiple of the methods disclosed in bullet 1- bullet 5 can only be applied to IBC-coded blocks and/or intra-coded blocks excluding DT.

i. In one example, one or multiple of the methods disclosed in bullet 1- bullet 5 may be applied to inter-coded blocks.

ii. In one example, one or multiple of the methods disclosed in bullet 1- bullet 5 may be applied to direct-coded blocks.

b. For example, one or multiple of the methods disclosed in bullet 1- bullet 5 can only be applied to blocks with specific constrains on the coefficients.

i. A rectangle with four corners (0, 0), (CRx, 0), (0, CRy), (CRx, CRy) is defined as the constrained rectangle, e.g., in the SRCC method. In one example, one or multiple of the methods disclosed in bullet 1-bullet 5 can be applied only if all coefficients out of the constrained rectangle are zero. E. g. CRx=CRy=16.

1) For example, CRx=SRx and CRy=SRy, where (SRx, SRy) is defined in SRCC as described in section 2.14.

2) Alternatively, furthermore, the above method is only applied when either block width or block height is greater than K.

a) In one example, K is equal to 16.

b) In one example, the above method is only applied when the block width is greater than K1 and K1 is equal to CRx; or when the block height is greater than K2 and K2 is equal to CRy.

ii. One or multiple of the methods may be applied only when the last non-zero coefficients (in forward scanning order) satisfies certain conditions, e.g., when the horizontal/vertical coordinator is no greater than a threshold (e.g., 16/32).

7. When IT is determined to be not used, a default transform such as DCT-2 or DST-7 may be used instead.

a. Alternatively, multiple default transforms such as DCT-2 or DST-7 may be chosen from, when IT is determined to be not used.

8. For determination of transforms from a transform set to be applied to a block coded with prediction mode A, the representative coefficients (e.g., bullet 2) in one or multiple representative blocks (e.g., bullet 1) are used, and the transform set may be dependent on prediction mode A and/or one or more syntax elements and/or other coded information (e.g., usage of DT, block dimension).

a. In one example, the transform set is {DCT2}.

b. In one example, the transform set is {IT}.

c. In one example, the transform set includes {DCT2, IT}.

d. In one example, the transform set includes {DCT2, DST7}.

e. In one example, when number of representative coefficients is even, DCT2 is used. Otherwise (when number of representative coefficients is odd), DST7 or IT is used which may be determined by the prediction mode A and/or one or more syntax elements and/or other coded information.

i. In one example, if the prediction mode A is IBC, IT is always used when number of representative coefficients is odd.

ii. In one example, if the prediction mode A is intra and DT is applied, DCT2 is always used when number of representative coefficients is odd.

iii. In one example, if the prediction mode A is intra and DT is not applied, and the one or more syntax elements indicate the use of implicit determination of IT or usage of implicit determination of transform skip mode is enabled, IT is always used when number of representative coefficients is odd.

9. Whether to and/or how to apply the disclosed methods above may be signaled at a video region level, such as sequence level/picture level/slice level/tile group level/tile level/subpicture level.

a. In one example, it may be signaled (e.g., a flag) in sequence header/picture header/SPS/VPS/DCI/DPS/PPS/APS/slice header/tile group header.

i. Alternatively, furthermore, one or multiple syntax elements (e.g., one or multiple flags) may be signaled to specify whether the method of implicit determination of IT or usage of implicit determination of transform skip mode is enabled or not.

1) In one example, a first flag may be signaled to control the usage of the method of implicit determination of IT for IBC coded blocks in the video region level.

a) Alternatively, furthermore, the flag may be signaled under the condition check of whether IBC is enabled.

b) Alternatively, whether the usage of the method of implicit determination of IT for IBC coded blocks is enabled may be controlled by the same flag which is used to control the usage of implicit selection of transform (IST) mode for intra coded blocks excluding the derived tree (DT) mode.

2) In one example, a second flag maybe signaled to control the usage of the method of implicit determination of IT for intra coded blocks (e.g., may exclude blocks with derived tree (DT) mode) in the video region level.

3) In one example, a third flag may be signaled to control the usage of the method of implicit determination of IT for inter coded blocks in the video region level.

4) In one example, a flag may be signaled to control the usage of the method of implicit determination of IT for intra coded blocks (e.g., may exclude blocks with DT mode) and inter coded blocks in the video region level.

5) In one example, a flag may be signaled to control the usage of the method of implicit determination of IT for IBC coded blocks and intra coded blocks (e.g., may exclude blocks with DT mode) in the video region level.

ii. Alternatively, furthermore, when the method of implicit determination of IT is enabled for a video region (e.g., the flag is true), the following may be further applied:

1) In one example, for IBC coded blocks, if IT is used for a block, TS mode is applied; otherwise, DCT2 is used.

2) In one example, for intra coded blocks (e.g., may exclude blocks with DT mode), if IT is used for a block, TS mode is applied; otherwise, DCT2 is used.

3) In one example, for inter coded blocks, if IT is used for a block, TS mode is applied; otherwise, the following may apply:

a) In one example, DCT2 is used.

b) In one example, DCT2/DST7/DCT8 is used according to the usage of SBT.

4) In one example, for direct coded blocks, if IT is used for a block, TS mode is applied; otherwise, the following may apply.

a) In one example, DCT2 is used.

b) In one example, DCT2/DST7/DCT8 is used according to the usage of SBT.

iii. Alternatively, furthermore, when the method of implicit determination of IT is disabled for a video region (e.g., the flag is false), the following may be further applied:

1) In one example, for IBC and/or intra coded blocks, DCT-2 is used.

2) In one example, for intra coded blocks (e.g., excluding blocks with DT mode), DCT-2 or DST-7 may be determined on-the-fly, such as by IST.

b. Multiple-level control of enabling/applying IT methods may be signaled in multiple video unit levels (e.g., sequence, picture, slice levels).

i. In one example, a first video unit level is defined as the sequence level.

1) Alternatively, furthermore, a first syntax element (e.g., a flag) is signaled in sequence header/SPS/to indicate the usage of IT.

a) In one example, the first syntax element equal to 0 indicates that the Implicit Selected Transform Skip (ISTS) method cannot be used in the sequence. Otherwise (the first syntax element equal to 1) indicates that the Implicit Selected Transform Skip (ISTS) method may be used in the sequence.

b) Alternatively, furthermore, the first syntax element may be conditionally signaled, such as according to "implicit selection of transform (IST) is enabled/ist_enable_flag being equal to 1".

c) Alternatively, furthermore, when the first syntax element is not present, it is inferred to be a default value. For example, the IT is inferred to be disabled for the first video unit level.

ii. In one example, a second video unit level is defined as the picture/slice level.

1) Alternatively, furthermore, a second syntax element (e.g., a flag) is signaled in picture header (e.g., intra picture header and/or inter picture header)/slice header to indicate the usage of IT.

a) Alternatively, furthermore, the second syntax element may be conditionally signaled, such as according to "implicit selection of transform (IST) is enabled" or "ist_enable_flag being equal to 1" and/or "the IT method is enabled at the first video unit level (e.g., sequence)".

b) Alternatively, furthermore, when the second syntax element is not present, it is inferred to be a default value. For example, the IT is inferred to be disabled for the second video unit level.

c. A syntax element to indicate an allowed transform set may be signaled at a video unit level (e.g., picture) and it may be conditionally signaled according to whether the implicit selection of transform (IST) is enabled.

i. In one example, the syntax element (e.g., a flag or an index) is signaled in picture header (e.g., intra picture header and/or inter picture header)/slice header.

1) Alternatively, furthermore, N different allowed transform sets are supported, and the selection of allowed transform set is dependent on the syntax element.

a) In one example, N is set to 2.

b) In one example, the selection of transform set may depend on block information, such as the coding mode of a CU, or whether the CU is code with (Derived Tree) DT mode.

i. For example, DCT2 is always used for a CU with DT mode.

'ii. For example, DCT2 is always used for a chroma block.

c) In one example, two sets are {DCT2, DST7} and {DCT2, IT}.

i. Alternatively, they are used for intra coded blocks.

ii. Alternatively, they are used for non-DT-coded intra coded blocks.

d) In one example, two sets are {DCT2} and {DCT2, IT}.

i. Alternatively, they are used for intra block copy (IBC) coded blocks.

ii. Alternatively, they are used for non-DT-coded intra block copy (IBC) coded blocks.

e) In one example, two sets are {DCT2} and {DCT2, IT}.

i. Alternatively, furthermore, they are used for inter coded blocks.

ii. Alternatively, furthermore, they are used for non-DT-coded inter coded blocks.

f) In one example, two sets are {DCT2} and {DCT2, IT}.

i. Alternatively, furthermore, they are used for direct coded blocks.

ii. Alternatively, furthermore, they are used for non-DT-coded direct coded blocks.

2) Alternatively, furthermore, if not present, it is inferred to be a default value. For example, the allowed transform set is inferred to be only one transform type (e.g., DCT2) is allowed.

ii. In one example, the syntax element (e.g., a flag or an index) is used to control the selection of transforms from an allowed transform set for blocks with certain coded mode.

1) In one example, it controls the selection of transforms from an allowed transform set for intra coded blocks/intra coded blocks excluding those with DT applied and excluding those with Pulse-Code Modulation (PCM) mode.

2) Alternatively, furthermore, for blocks with other coded mode, the allowed transform set may be independent from the syntax element.

a) In one example, for inter coded blocks, the allowed transform set is {DCT2}.

b) In one example, for IBC coded blocks, the allowed transform set is {DCT2} or {DCT2, IT}, which may depend on e.g., whether IST is enabled or whether IBC is enabled for current picture.

c) In one example, for inter coded blocks, the allowed transform set is {DCT2, IT} d) In one example, for direct coded blocks, the allowed transform set is {DCT2, IT} e) In one example, how to select the allowed transform set may depend on e.g., whether IST/SBT is enabled.

d. Whether to and/or how to apply the disclosed methods in this document may be determined by both considering one or multiple messages signaled at a video region level, such as sequence level/picture level/slice level/tile group level/tile level/subpicture level, and the picture/slice type and/or CTU/CU/PU/TU mode.

i. For example, for a first CU mode (such as IBC or inter), TS is applied if a message signaled at a video region level, such as picture level, indicates that TS is enabled. For a second CU mode (such as intra), TS is applied if the message signaled at a video region level indicates that TS should be used and an additional condition is satisfied (such as the parity of coefficients satisfy some requirements as proposed in this document).

ii. For example, for a first mode (e.g. CU/TU/PU) mode (such as DT coded), TS is applied if a message signaled at a video region level, such as picture level, indicates that TS is enabled. For a second mode (such as non-DT coded), TS is applied if the message signaled at a video region level indicates that TS should be used and an additional condition is satisfied (such as the parity of coefficients satisfy some requirements as proposed in this document).

iii. For example, for a first mode (e.g. CU/TU/TU mode) (such as SBT coded), TS is applied if a message signaled at a video region level, such as picture level, indicates that TS is enabled. For a second mode (such as non-SBT coded), TS is applied if the message signaled at a video region level indicates that TS should be used and an additional condition is satisfied (such as the parity of coefficients satisfy some requirements as proposed in this document).

10. An indication of whether zero-out is applied to a transform block (including identity transform) is signaled in at a video region level, such as sequence level/picture level/slice level/tile group level/tile level/subpicture level.

a. In one example, it may be signaled (e.g., a flag) in sequence header/picture header/SPS/VPS/DCI/DPS/PPS/APS/slice header/tile group header.

b. In one example, when it specifies zero-out is enabled, then only IT transforms are allowed.

c. In one example, when it specifies zero-out is disabled, then only non-IT transforms are allowed.

d. Alternatively, furthermore, the binarization/context modeling/allowed range of last significant coefficient/bottom-right position (e.g., maximum X/Y coordinate relative to the top-left position of the block) in SRCC may be dependent on the indication.

11. A first rule (e.g., in above bullets 1-7) may be used to determine the usage of IT for a first block, and a second rule may be used to determine the transform type excluding IT.

a. In one example, the first rule may be defined as the residual energy distribution.

b. In one example, the second rule may be defined as the parity of representative coefficients.

Transform Skip

12. Zero-out is applied to IT (e.g. TS) coded blocks, where the non-zero coefficients are restricted to be within certain sub-regions of a block.

a. In one example, the zero-out range for IT (e.g. TS) coded blocks is set to the top-right K*L sub-region of a block, where K is set to min(T1, W) and L is set to min(T2, H) where W and H are the block width/height, respectively and T1/T2 are two thresholds.

i. In one example, T1 and/or T2 may be set to 32 or 16.

ii. Alternatively, furthermore, the last non-zero coefficient shall be located within the K*L sub-region.

iii. Alternatively, furthermore, the bottom-right position (SRx, SRy) in the SRCC method shall be located within the K*L sub-region.

13. Multiple zero-out types of IT (e.g. TS) coded blocks are defined where each type corresponds to a sub-region of a block where non-zero coefficients are only existing in the sub-region.

a. In one example, non-zero coefficients are only existing in the top-left K0*L0 sub-region of a block.

b. In one example, non-zero coefficients are only existing in the top-right K1*L1 sub-region of a block.

i. Alternatively, furthermore, indication of the bottom-left position of the sub-region with non-zero coefficients may be signaled.

c. In one example, non-zero coefficients are only existing in the bottom-left K2*L2 sub-region of a block.

i. Alternatively, furthermore, indication of the top-right position of the sub-region with non-zero coefficients may be signaled.

d. In one example, non-zero coefficients are only existing in the bottom-right K3*L3 sub-region of a block.

i. Alternatively, furthermore, indication of the top-left position of the sub-region with non-zero coefficients may be signaled.

e. Alternatively, furthermore, an indication of the zero-out type of IT maybe further explicitly signaled or derived on-the-fly.

14. IT (e.g. TS) is not used in a block when there is at least one significant coefficient outside the zero-out region defined by IT (e.g. TS), for example, outside of the top-left K0*L0 sub-region of a block.

a. Alternatively, furthermore, for this case, a default transform is used.

15. IT (e.g. TS) is used in a block when there is at least one significant coefficient outside the zero-out region defined by another transform matrix (e.g. DST7/DCT2/DCT8), for example, outside of the top-left K0*L0 sub-region of a block.

a. Alternatively, furthermore, for this case, TS mode is inferred to be used.

Figures 16A, 16B, 16C, 16D:
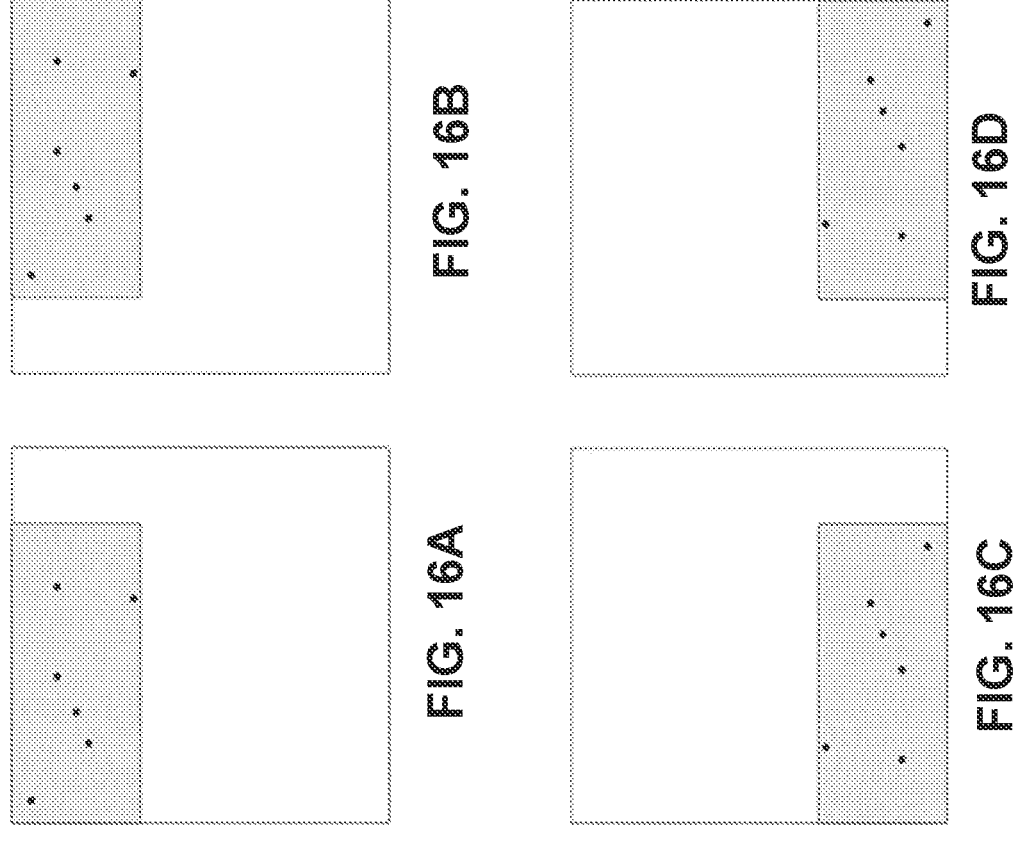
FIG. 16A shows an example zero-out type of TS coded blocks.
FIG. 16B shows another example zero-out type of TS coded blocks.
FIG. 16C shows another example zero-out type of TS coded blocks.
FIG. 16D shows yet another zero-out type of TS coded blocks.

FIG. 16A-16D show multiple zero-out types of TS coded blocks. FIG. 16A shows top-left K0*L0 sub-region. FIG. 16B shows top-right K1*L1 sub-region. FIG. 16C shows bottom-left K2*L2 sub-region. FIG. 16D shows bottom-right K3*L3 sub-region.

General

16. The decision of transform matrix may be done in CU/CB-level or TU-level.

a. In one example, the decision is made in CU level where all TUs share the same transform matrix.

i. Alternatively, furthermore, when one CU is split to multiple TUs, coefficients in one TU (e.g., the first or the last TU) or partial or all TUs may be utilized to determine the transform matrix.

b. Whether to use the CU-level solution or TU-level solution may depend on the block size and/or VPDU size and/or maximum CTU size and/or coded information of one block.

i. In one example, when the block size is larger than the VPDU size, CU-level determination method may be applied.

17. Whether to and/or how to apply the disclosed methods above may depend on coding information which may include:

a. Block dimensions.

i. In one example, for blocks with width and/or height no greater than a threshold (e.g., 32), the above-mentioned methods may be applied.

ii. In one example, for blocks with width and/or height no smaller than a threshold (e.g., 4), the above-mentioned methods may be applied.

iii. In one example, for blocks with width and/or height smaller than a threshold (e.g., 64), the above-mentioned methods may be applied.

b. QPs c. Picture or slice type (such as I-frame or P/B-frame, I-slice or P/B-slice)

i. In one example, the proposed method may be enabled on I-frames but be disabled on P/B frames.

d. Structure partitioning method (single tree or dual tree)

i. In one example, for single tree partitioning applied slices/pictures/bricks/tiles, the above-mentioned methods may be applied.

e. Coding mode (such as inter mode/intra mode/IBC mode etc.)
   i. In one example, for intra-coded blocks, the above-mentioned methods may be applied.
   ii. In one example, for intra-coded blocks excluding those with DT applied and excluding those with PCM mode, the above-mentioned methods may be applied.
   iii. In one example, for intra-coded blocks excluding those with DT applied and excluding those with PCM mode, and IBC coded blocks, the above-mentioned methods may be applied.
f. Coding methods (such as Intra Sub-block partition, Derived Tree (DT) method, etc.)
   i. In one example, for intra-coded blocks with DT applied, the above-mentioned methods may be disabled.
   ii. In one example, for intra-coded blocks with ISP applied, the above-mentioned methods may be disabled.
   iii. Coding methods may comprise Sub-block Transform (SBT).
   iv. Coding methods may comprise Position Based Transform (PBT)
   v. In one example, for IBC-coded or inter-coded blocks with SBT applied, the above-mentioned methods may be applied.
g. Color components
   i. In one example, for luma blocks, the above-mentioned methods may be applied while for chroma blocks, it is not applied.
h. Intra-prediction mode (such as DC, vertical, horizontal, etc.)
i. Motion information (such as MV and reference index).
j. Standard Profiles/Levels/Tiers Coefficients Reordering At the decoder side, coefficients reordering is defined as how to reorder or map the parsed coefficients to coefficients before de-quantization, or before inverse-transform, or before reconstruction. The coefficients may be used to reconstruct samples with or without inverse-transform.

18. Coefficients reordering may be done at CU level or TU level or PU level.

19. Whether to/how to apply coefficients reordering may depend on coded information.
   a. In one example, the coded information may include the TU location for TU level partial sub-blocks.
   b. In one example, coded information may include the transform type.
      i. In one example, the transform type may be derived based on coefficients as proposed in bullets 1-17.
      ii. The transform type may comprise DCT-II, DST-VII, DCT-VIII and TS (a.k.a. IT).
      iii. In one example, how to do coefficients reordering may depend on whether TS (a.k.a. IT) is used.
         1) In one example, the parsed coefficients are rearranged in a reversed order before being dequantized.
         2) In one example, the parsed coefficients are rearranged in a reversed order before being used in reconstruction.
         3) In one example, parsed coefficients $C(i, j)$ with $i=0,1, \ldots, M-1, j=0, 1, \ldots, N-1$ are rearranged to be $C'(i, j)$ in a reversed order as $C'(i, j)=$ 20. Whether to determine the coefficients reordering according to the transform type may depend on the slice/picture/tile type.

a. In one example, the coefficients reordering is determined according to the transform type for specific slice/picture/tile type(s), such as I-slice or I-picture.
   b. In one example, the coefficients reordering is NOT determined according to the transform type for specific slice/picture/tile type(s), such as P-slice and/or B-slice or P-picture and/or B-picture, 21. Whether to determine the coefficients reordering according to the transform type may depend on the CTU/CU/block type.
   a. In one example, the coefficients reordering is determined according to the transform type for specific CTU/CU/block type(s), such as intra-coded blocks.
   b. In one example, the coefficients reordering is NOT determined according to the transform type for specific CTU/CU/block type(s), CTU/CU/block type(s), such as inter-coded blocks or IBC-coded blocks.
   c. In one example, the coefficients reordering is NOT determined according to the transform type for DT-coded blocks.

22. Whether to determine the coefficients reordering according to the transform type may depend on a message which may be signaled in VPS/SPS/PPS/sequence header/picture header/slice header/CTU/CU/block.
   a. The message may be a flag.
   b. The message may be conditionally signaled.
      i. For example, the message can only be signaled if the CU level block is not a zero-residue block.
      ii. For example, the message can only be signaled if the TU level block or partial sub-block is not a zero-residue block.
      iii. If the message is not signaled, it is inferred to be a default value such as 0 or 1.
      iv. For example, the message can only be signaled if TS is enabled.
   c. For example, a first message (denoted as ph_rts_enable_flag) is signaled in picture header. A TS-coded block can reorder the coefficients only if ph_rts_enable_flag is true.
      i. A second message (denoted as rts_enable_flag) is signaled in sequence header. ph_rts_enable_flag is signaled only if rts_enable_flag is true. Otherwise, ph_rts_enable_flag is not signaled and inferred to be false.

23. How to do coefficients reordering may depend on a message which may be signaled in VPS/SPS/PPS/sequence header/picture header/slice header/CTU/CU/block.
   a. The message may be a flag.
   b. The message may be conditionally signaled.
      i. If the message is not signaled, it is inferred to be a default value such as 0 or 1.
      ii. For example, the message can only be signaled if TS is enabled.
      iii. For example, the message can only be signaled for specific CTU/CU/block type(s), CTU/CU/block type(s), such as inter-coded blocks or IBC-coded blocks.

Partial Residual Blocks

24. The message indicating whether to apply position based transform (denoted as pbt cu_flag) may not be signaled if the current block is IBC-coded.

Figure 23:
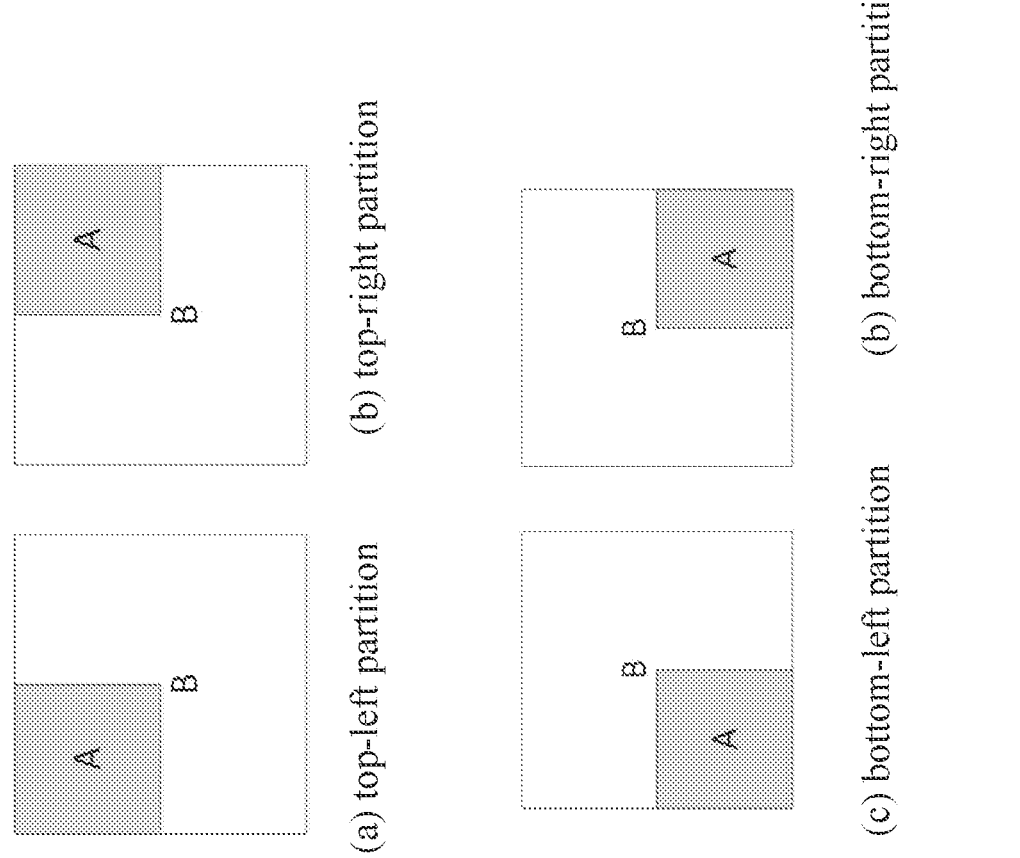
FIG. 23 shows an example of an L shaped partition of a partial residual block.

25. It is proposed that a block with a specific mode may be partitioned into at least two parts, and at least one part of the parts have no non-zero residues (in other words, residues are set to zero without being signalled). Such a block is called a partial residual block (PRB).

a. In one example, the specific mode is IBC.

i. In one example, IT or DCT2 may be applied to the PRB.

ii. In one example, IT is applied to the PRB.

b. In one example, the message indicating whether SBT is used (denoted as sbt_cu_flag) may be signaled if the current block is IBC coded.

i. If sbt_cu_flag is true for a IBC coded block, the block is coded with PRB. And the partitioning method is same as that defined by the messages describing the SBT partitioning (such as sbt_quad_flag, sbt_dir_flag, sbt_pos_flag).

c. In one example, the specific mode is inter and only IT (or one of the IT/DCT2) is applied to the block.

d. In one example, a M×N block is partitioned in two parts:

i. The two parts may be a (M/k)×N block A and a (M-M/k))×N block B, wherein k is an integer larger than 1, such as 2, 4, 8, 16.

ii. The two parts may be a M×(N/k) block A and a M×(N–N/k) block B, wherein k is an integer larger than 1, such as 2, 4, 8, 16.

iii. The two parts may be a (M/k)×(N/k) block A and the other part is a 'L' shaped region B, wherein k is an integer larger than 1, such as 2, 4, 8, 16. The block A can be located in the top-left corner, the top-right corner, the bottom-left corner and the bottom-right corner of the M×N block as shown in FIG. 23.

iv. In one example, block A may have no residue and block B may have non-zero residues.

v. In one example, block B may have no residue and block A may have non-zero residues.

vi. In one example, the message (such as cbf) to indicate whether a block has non-zero residues or not may not be signaled and inferred to be one for the part to be determined with non-zero residues in a PRB.

e. In one example, the part which have non-zero coefficients (or which have all zero coefficients) may be signaled in the bitstream.

i. In one example, indication of the part may be signaled, such as that used for SBT.

ii. In one example, allowed set of partitions (e.g., described in the above bullet) may be pre-defined according to the decoded information (e.g., modes) and/or indicated in the bitstream.

f. In one example, transform-skip can be applied to the PRBs with dimension (width and/or height) constraints.

i. In one example, transform-skip can be applied only if (W<=T1) && (H<=T1) && (W>T2 λH >T2), wherein W and H are width and height of the coding block. T1 and T2 are integers, e.g. T1=64, T2=4.

ii. In one example, transform-skip can be applied only if (W<=T1) && (H<=T2), wherein T1 and T2 are integers such as 32 or 64, W and H are width and height of the non-zero part of a PRB, or of the coding block.

iii. In one example, transform-skip can be applied only if (W >T1)λ(H >T2), wherein T1 and T2 are integers such as 4 or 8, W and H are width and height of the non-zero part of a PRB, or of the coding block.

g. In one example, transform or transform-skip can be applied to the part with non-zero residues in a PRB.

i. All the bullets and embodiments in this document can be applied to the part to determine whether and/or how to use the transform.

h. In one example, whether a block is a PRB depends on a message which may be signaled in VPS/SPS/PPS/sequence header/picture header/slice header/CTU/CU/block.

i. The message may be a flag.

ii. The message may be conditionally signaled.

4) If the message is not signaled, it is inferred to be a default value such as 0 or 1.

iii. For example, the message can only be signaled for specific CTU/CU/block type(s), CTU/CU/block type(s), such as IBC-coded blocks.

iv. If a block is a PRB, a message is signaled to indicate how to partition the PRB.

i. In one example, multiple level signalling may be used to determine whether PRB is used.

i. In one example, for a first level, e.g., in sequence/picture level, an indication of whether PRB is enabled may be signaled.

5) Alternatively, furthermore, the indication may be conditionally signalled, e.g., according to whether IBC/screen content is used.

ii. In one example, for a second level, e.g., in block level, an indication of whether PRB is applied may be signaled.

6) Alternatively, furthermore, furthermore, the indication may be conditionally signalled, e.g., according to the indication in the first level and/or other decoded information (e.g., block dimension/mode).

j. Whether PRB mode is allowed or not may depend on signaled information or may be determined on the fly according to decoded information (e.g., color component).

k. For example, a first message (denoted as ph_pts_enable_flag) is signaled in picture header. An IBC-coded block can apply PRB only if ph_pts_enable_flag is true.

i. A second message (denoted as pts_enable_flag) is signaled in sequence header. ph_pts_enable_flag is signaled only if pts_enable_flag is true. Otherwise, ph_pts_enable_flag is not signaled and inferred to be false.

5. Example Embodiments

Below are some example embodiments for some of the invention aspects summarized above in Section 4, which can be applied to the VVC specification. Most relevant parts that have been added or modified are underlined in *boldface italics,* , and some of the deleted parts are indicated using.

5.1. Embodiment #1

This section presents an example of a solution for Implicit Selection of Transform Skip mode (ISTS). Basically, it follows the design principle of the Implicit Selection of Transform (IST) which has been adopted by AVS3. One high level flag is signaled in picture header to indicate ISTS is enabled. If it is enabled, the allowed transform set is set to {DCT-II TS}, and the determination of TS mode is based on the parity of number of non-zero coefficients in a block. Compared with HPM6.0, simulation results reportedly show that the proposed ISTS achieves 15.86% and 12.79% bitrate reduction for screen content coding under the AI and RA configurations, respectively. It is asserted that encoder and decoder complexity increasement is negligible.

5.1.1. Introduction

In current design of AVS3, only DCT-II is allowed for coding residual blocks for IBC modes. While for intra coded blocks excluding DT, IST is applied which allows a block to select either DCT-II or DST-VII according to the parity of number of non-zero coefficients. However, for screen content coding, DST-VII is much less efficient. Transform skip (TS) mode is an efficient coding method for screen content coding. How to allow the codec to support TS without being explicitly signaled for a block needs to be studied.

5.1.2. Proposed Method

In some embodiments, an Implicit Selection of Transform Skip mode (ISTS) can be used. A high-level flag is signaled in picture header to indicate whether ISTS is enabled.

When ISTS is enabled, the allowed transform set is set to {DCT-II TS}, and the determination of TS mode is based on

7.1.3.1 Picture Header of I Pictures

TABLE 27

| Intra prediction header definition | |
| --- | --- |
| Intra prediction header definition | Descriptor |
| intra_picture_header( ) { | |
| ... | ... |
|   if (IbcEnableFlag) { | |
|     ibc_pic_flag | u(1) |
|   } | |
|   *if (IstsEnableFlag) {* | |
|     *ph_ists_enable_flag* | *u(1)* |
|   *}* | |
|   next_start_code( ) | |
|   ... | |
| } | |

7.1.3.2 Inter Prediction Header Definition

TABLE 28

| Inter prediction header definition | |
| --- | --- |
| Inter prediction header definition | Descriptor |
| inter_picture_header( ) { | |
|   ... | ... |
|   if (IbcEnableFlag) { | |
|     ibc_pic_flag | u(1) |
|   } | |
|   *if (IstsEnableFlag) {* | |
|     *ph_ists_enable_flag* | *u(1)* |
|   *}* | |
|   next_start_code( ) | |
|   ... | |
| } | |
| block(i, blockWidth, blockHeight, CuCtp, isChroma, isPcm, component) { | |
|   ... | |
|     if ((~~IstEnableFlag~~ ||*PhIstsEnableFlag* ) && ! DtSplitFlag) { | |
|       IstTuFlag = *(!PhIstsEnableFlag &&* (scan_region_x >=16 || scan_region_y >=16)) ? 0 : NumNonZeroCoeff % 2 ? 1 : 0 | |
|     } | |
|   ... | | the parity of number of non-zero coefficients in a block, which is following the same design principle of IST. An odd number indicates TS is applied, while an even number indicates DCT-II is applied. ISTS is applied to CUs with sizes from 4×4 to 32×32 for either intra-coded or IBC-coded CUs, excluding those with DT applied or with PCM.

When ISTS is disabled and IST is enabled, the allowed transform set is set to {DCT-II DST-VII} which is the same as current AVS3 design.

5.1.3. Proposed Changes to Syntax Tables, Semantics and Decoding Process

7.1.2.2 Sequence Header

TABLE 14

| Sequence Header Definition | |
| --- | --- |
| Sequence Header Definition | Descriptor |
| sequence_header( ) { | |
|   ... | ... |
|   ist_enable_flag | u(1) |
|   *ists_enable_flag* | *u(1)* |
|   srcc_enable_flag | u(1) |
|   ... | |
| } | |

7.2.2.2 Sequence Header *Transformation skip enable flag istsenable flag*

Binary variable. A value of '1' indicates that the implicitly selective transform skip method can be used; a value of '0' indicates that the implicitly selective transform skip method should not be used. The value of IstsEnableFlag is equal to ists_enable_flag. If ists_enable_flag does not exist in the bit stream, the value of IstsEnableFlag is 0.

7.2.3.1 Intra Prediction Header

*Intra prediction mode conversion skip enable flag ph_ists_enable_flag*

*Binary variable. A value of '1' indicates that the luma intra prediction block and the luma block copy intra prediction block in the current frame use the transform skip method; a value of '0' indicates the luma intra prediction transform block and the luma block copy in the current frame The prediction block cannot use the transform skip method. The value of PhIstsEnableFlag is equal to the value of ph_ists_enable_flag. If ph_ists_enable_flag does not exist in the bit stream, the value of PhIstsEnableFlag is 0.*

9.6.3 Inverse Transform

This article defines the process of converting the M1×M2 transformation coefficient matrix CoeffMatrix into the residual sample matrix ResidueMatrix.; If the intra prediction mode is neither 'Intra_Luma_PCM' nor 'Intra_Chroma_PCM' *or the current block uses* *the block copy intra* *prediction mode, then:* If *PhIstsEnableFlag is 0,* the current transform block is a luma intra prediction residual block, the values of M1 and M2 are both less than 64 and the value of IstTuFlag is equal to 1, then the residual sample matrix ResidueMatrix is derived according to the method defined by 0;

*Otherwise, if PhIstsEnableFlag is 1,*
*the current transform block is*
*a luma intra prediction residual block or*
*a block copy intra prediction block,*
*the values of M1 and M2 are both*
*less than 64 and the value of IstTuFlag is* *equal to 1,*
*then the residual is derived according*
*to the method defined by 0*
*Sample matrix ResidueMatrix;*

Otherwise, the residual sample matrix ResidueMatrix is derived according to the method defined in 9.6.3.1.

Otherwise (the intra prediction mode is 'Intra_Luma_PCM' or 'Intra_Chroma_PCM'), the residual sample matrix ResidueMatrix is derived according to the method defined in 9.6.3.3.

*9.6.3.4 Implicit inverse transform skip method*
*If the current transform block is*
*a luma intra prediction residual block or a luma intra*
*prediction residual block, and PhIstsEnableFlag is 1,*
*the values of M1 and M2 are*
*both less than 64 and the value of*
*IstTuFlag is equal to 1, then:*
*1) Calculate the shift shift,*
*shift is equal to 15 – BitDepth –((logM1 + logM2) >> 1)*
*2) If shift is greater than or equal to 0,*
*the carry factor rnd factor is equal to 1 << (shift – 1).*
*Get the matrix W from the transformation*
*coefficient matrix:wij = (CoeffMatrixij*
*+ rnd factor) >> shift*

*3) If shift is less than 0, let shift = -shift.*
*Get the matrix W from thetransformation matrix:*
*wij = (CoeffMatrixij+ rnd factor) << shift*

The matrix W is directly used as the residual sample matrix ResidueMatrix to end the implicit selective inverse transformation operation.

5.2. Embodiment #2

5.2.1. Proposed changes to syntax tables, semantics and decoding process 7.1.2.2 Sequence Header Definition

TABLE 14

| Sequence Header Definition | |
| --- | --- |
| Sequence Header Definition | Descriptor |
| ... | ... |
| ist_enable_flag | u(1) |
| ists_enable_flag | u(1) |
| *ts inter enable flag* | *u(1)* |

7.1.3.2 Inter Prediction Header Definition

| Inter prediction header definition | Descriptor |
| --- | --- |
| ... | ... |
| if (IstsEnableFlag) { | |
| ph_ists_enable_flag | u(1) |
| } | |
| *if (TsInterEnableFlag) {* | |
| *ph ts inter enable flag* | *u(1)* |
| *}* | |
| next_start_code( ) | |

7.1.6 Coding Unit Definition

| Coding Unit Definition | Descriptor |
| --- | --- |
| coding_unit(x0, y0, width, height, mode, component) { | |
| ... | |
| *isIstApply = ((((! IntraCuFlag && ! DirectFlag && !SkipFlag && !SbtCuFlag &&* *PhTsInterEnableFlag) ||(IntraCuFlag && !IscCuFlag)&& PhIstsEnableFlag)* || *(IntraCuFlag && !IscCuFlag && !IbcCuFlag && IstEnableFlag)) && !DtSplitFlag &&* *width<64 && height<64 && !isChroma* | |
| block(i, blockwidth, blockHeight, CuCtp, IsChroma, IsPcmMode[i], [[IntraCuFlag]]*isIstApply,* co mponent) | |

7.1.7 Transform Block Definition

| Transform Block Definition | Descriptor |
| --- | --- |
| block(i, blockWidth, blockHeight, CuCtp, isChroma, isPcm, [[isIntra]]*isIstApply,* component) { | |
| if (! isPcm) { | |
| if (CuCtp & (1 << i)) { | |
| if (SrccEnableFlag) { | |
| ... | |
| if ([[isIntra && (IstEnableFlag || PhIstsEnableFlag) && ! DtSplitFlag]] | |
| *isIstApply*) { | |
| IstTuFlag  =  (!PhIstsEnableFlag  &&  (scan_region_x  >=16  || | |

-continued

| Transform Block Definition | Descriptor |
|---|---|
| scan_region_y >=16)) ? 0 : NumNonZeroCoeff % 2 ? 1 : 0 | |

```
scan_region_y >=16)) ? 0 : NumNonZeroCoeff % 2 ? 1 : 0
                    }
            }
                else {
                                        ...
                        if ([[isIntra && IstEnableFlag && ! DtSplitFlag]] isIstApply} {
                                IstTuFlag = NumNonZeroCoeff % 2 ? 1 : 0
                        }
                                        ...
                }
                            ...
        }
                        ...
    }
```

7.2.2.2 Sequence Header

*Inter-frame transform skip enable flag ts inter enable flag*

*Binary variable. A value of '1' means that the local transform skip method can be used; the value of '0' means that the local transform skip method should not be used The value of TsInterEnableFlag is equal to ts inter enable flag. If ts inter enable flag does not exist in the bit stream, the value of TsInterEnableFlag is 0.*

7.2.3.2 Inter Prediction Image Header

*Inter-frame prediction mode transform skip enable flag ph ts inter enable flag*

*Binary variable. A value of '1' means that the luminance inter prediction residual block and the luminance direct mode residual block of the current frame use the transform skip method; a value of '0' means the luminance inter prediction residual block and the luminance direct mode residual block of the current frame The difference block cannot use the transform skip method. The value of PhTsInterEnable Flag is equal to the value of ph ts inter enable flag. if ph ts inter enable flag does not exist in the bit stream, the value of PhTsInterEnableFlag is 0.*

9.6.3 Inverse Transformation

If the intra prediction mode is neither 'Intra_Luma_PCM' nor 'Intra_Chroma_PCM' or the current block uses the block copy intra prediction mode, then: If PhIstsEnableFlag is 0 and the current transform block is a luma intra prediction residual block, the values of M1 and M2 are both less than 64 and the value of IstTuFlag is equal to 1, then the residual sample matrix ResidueMatrix is derived according to the method defined in 9.6.3.2;

Otherwise, if PhIstsEnableFlag is 1, and the current transform block is a luma intra prediction residual block or a luma block copy ultra prediction residual block

*or luma inter prediction residual block, or the value of the current transform block SbtCuFlag is greater than 0 PhTsInterEnableFlag is 1,* the values of M1 and M2 are both less than 64 and the value of IstTuFlag is equal to 1, then the residual sample matrix ResidueMatrix is derived according to the method defined in 9.6.3.4;

Otherwise, the residual sample matrix ResidueMatrix is derived according to the method defined in 9.6.3.1.

Otherwise (the intra prmdiction mode is 'Intra_Luma_PCM' or 'Intra_Chroma_PCM'), the residual sample matrix ResidueMatrix is derived according to the method defined in 9.6.3.3.

5.3. Embodiment #3

7.1.2.2 Sequence Header Definition

| Sequence Header Definition | Descriptor |
|---|---|
| ... | ... |
| ist_enable_flag | u(1) |
| ists_enable_flag | u(1) |
| *ts inter enable flag* | *u(1)* |
| *pts enable flag* | *u(1)* |
| srcc_enable_flag | u(1) |

7.1.3.2 Interprediction Header Definition

| Inter prediction header definition | Descriptor |
|---|---|
| ... | ... |
| if (IstsEnableFlag) { | |
|     ph_ists_enable_flag | u(l) |
| } | |
| *if (TsInterEnableFlag) {* | |
|     *ph ts inter enable flag* | *u(1)* |
| *}* | |
| *if (PtsEnableFlag) {* | |
|     *ph pts enable flag* | *u(1)* |
| *}* | |
| next_start_code( ) | |

7.1.6 Coding Unit Definition

| Coding Unit Definition | Descriptor |
|---|---|
| coding_unit(x0, y0, width, height, mode, component) { | |

```
coding_unit(x0, y0, width, height, mode, component) {
                                    ...
        if ((! IntraCuFlag || (IbcCuFlag && PtsEnableFlag)) && ! SkipFlag) {
                                ...
            if (! CtpZeroFlag) {
```

-continued

| Coding Unit Definition | Descriptor |
|---|---|

```
            ...
        if (PbtEnableFlag && !IbcCuFlag && (width / height < 4) && (height / width <
4) && (width >= 8) && (width <= 32) && (height >= 8) && (height <= 32) && (InterpfFlag ==
0)) {
            pbt_cu_flag                                                          ae(v)
        }
        if (! PbtCuFlag) {
            ...
            if ((SbtEnableFlag ||(IbcCuFlag && PtsEnableFlag)) && (width <= 64)
&& (height <= 64) && (width >4 || height > 4) && (InterpfFlag == 0) && ctp_y[0] ) {
            sbt_cu_flag                                                          u(1)
            ...
        IsIstApply = (((((!IntraCuFlag && !DirectFlag && !SkipFlag && !SbtCuFlag
&& PhTsInterEnableFlag) ||(IntraCuFlag && !IscCuFlag)) && PhIstsEnableFlag)
(IntraCuFlag && !IscCuFlag && !IbcCuFlag && IstEnableFlag)) && !DtSplitFlag &&
Width<64 && height<64 && !isChroma
        block(i,  blockwidth,  blockHeight,  CuCtp,  IsChroma,  IsPcmMode[i],
[[IntraCuFlag]], isIstApply , component)
```

20

7.1.7 Transform Block Definition

| Transform Block Definition | Descriptor |
|---|---|

```
block(i, blockWidth, blockHeight, CuCtp, isChroma, isPcm, [[isIntra]] isIstApply, component) {
                                      ...
    if (! isPcm) {
        if (CuCtp & (1 << i)) {
            if (SrccEnableFlag) {
                                  ...
                if ([[isIntra && (IstEnableFlag || PhIstsEnableFlag) && ! DtSplitFlag]]
isIstApply) {
                    IstTuFlag  =  (!PhIstsEnableFlag  &&  (scan_region_x  >=16  ||
scan_region_y >=16)) ? 0 : NumNonZeroCoeff % 2 ? 1 : 0
                }
            }
            else {
                                  ...
                if ([[isIntra && IstEnableFlag && ! DtSplitFlag]] isIstApply) {
                    IstTuFlag = NumNonZeroCoeff % 2 ? 1 : 0
                }
                                  ...
            }
                                  ...
        }
                                  ...
    }
}
```

45

7.2.2.2 Sequence Header
*Transform skip enable flag ts inter enable flag*
  *Binary variable. A value of '1'*
*means that the local transform skipmethod can be used;*
*a value of '0' meansthat the local transform skip*
*method should not be used.*
*The value of TsInterEnableFlagis equal to*
*ts inter enable flag.If ts inter enable flag does not*
*exist in the bit stream,*
*The value of TsInterEnableFlag is 0.*
*Patrial transform skipenabled flag pts enable flag*
  *Binary variable.  A value of '1'means that the local*
*transform skip method can be used;a value of '0'means*
*that the local transform skipmethod should not be used.*
*The value of PtsEnableFlagis equal to pts enable flag.*
*If pts enable flag does notexist in the bit stream,*
*the value of PtsEnableFlag is 0.*
7.2.3.2 Inter Prediction Picture Header
*transform skip enable flag ph ts inter enable flag*

*Binary variable. A value of '1'means that the luminance*
*inter prediction residual blockand the luminance direct*

*mode residual block of the current*
*frame use the transform skip method;*
*a value of '0' means the luminance*
*inter prediction residual block*
*and the luminance direct mode residual*
*block of the current frame The difference*
*block cannot use the transform skip method.*
*The value of PhTsInterEnableFlag*
*is equal to the value of  ph ts inter enable flag.*
*If ph ts inter enable flag does not exist in the bit stream,*
*the value of  PhTsInterEnableFlag is 0.*
*Partial transform skip  enabled flag ph pts enable flag*
  *Binary variable.*
*A value of '1' indicates that the luminance*
*block of the current frame replicates the intra*
 *prediction residual block using*
*the transform skip method; the value of '0' indicates*
*that the brightness block of*
*the current frame replicates the*
*intra prediction residual block using*
*the transform skip method. The value of*

*PhPtsEnableFlag is equal to the value of ph pts enable flag. If ph pts enable flag does not exist in the bit stream, the value of PhPtsEnableFlag is 0.*

9.6.3 Inverse Transformation

If the intra prediction mode is neither 'Intra_Luma_PCM' nor'Intra_Chroma_PCM' or the current block uses the block copy intra prediction mode, then:

If PhIstsEnableFlag is 0 and the current transform block is a luma intra prediction residual block, the values of M1 and M2 are both less than 64 and the value of IstTuFlag is equal to 1, then the residual sample matrix ResidueMatrix is derived according to the method defined in 9.6.3.2;

Otherwise, if PhIstsEnableFlag is 1, and the current transform block is a luma intra prediction residual block or a luma block copy intra prediction residual block *or luma inter prediction residual block, or the value of the current transform block SbtCuFlag is greater than 0 and PhTsInterEnableFlag is 1Or IbcCuFlag and PhPtsEnableFlag are both 1.* the values of M1 and M2 are both less than 64 and the value of IstTuFlag is equal to 1, then the residual sample matrix ResidueMatrix is derived according to the method defined in 9.6.3.4;

Otherwise, the residual sample matrix ResidueMatrix is derived according to the method defined in 9.6.3.1.

Otherwise (the intra prediction mode is 'Intra_Luma_PCM' or 'Intra_Chroma_PCM'), the residual sample matrix ResidueMatrix is derived according to the method defined in 9.6.3.3.

5.4. Embodiment #4

7.1.2.2 Sequence Header Definition

| Sequence Header Definition | Descriptor |
|---|---|
| ... | ... |
| ist_enable_flag | u(1) |
| ists_enable_flag | u(1) |
| *ts inter enable flag* | *u(1)* |
| *pts enable flag* | *u(1)* |
| *rts enable flag* | *u(1)* |
| srcc_enable_flag | u(1) |

7.1.3.2 Inter Prediction Header Definition

| Inter prediction header definition | Descriptor |
|---|---|
| if (IstsEnableFlag) { | |
|     ph_ists_enable_flag | u(1) |
| } | |
| *if (TsInterEnableFlag) {* | |
|     *(IbcCuFlag && PtsEnableFlag))* | *u(1)* |
| *}* | |
| *if (PtsEnableFlag) {* | |
|     *ph pts enable flag* | *u(1)* |
| *}* | |
| *if RtsEnableFlag) {* | |
|     *ph rts enable flag* | *u(1)* |
| *}* | |
| next_start_code( ) | |

7.1.6 Coding Unit Definition

| Coding Unit Definition | Descriptor |
|---|---|
| coding_unit(x0, y0, width, height, mode, component) { | |
|     ... | |
|     if ((*(*! IntraCuFlag \|\|*(IbcCuFlag&& PtsEnableFlag))* && ! SkipFlag) { | |
|         ... | |
|         if (! CtpZeroFlag) { | |
|             ... | |
|             if (PbtEnableFlag*&& !IbcCuFlag* && (width / height < 4) && (height / width < 4) && (width >= 8) && (width <= 32) && (height >= 8) && (height <= 32) && (InterpfFlag == 0)){ | |
|                 pbt_cu_flag | ae(v) |
|             } | |
|             if (! PbtCuFlag) { | |
|                 ... | |
|                 if (SbtEnableFlag \|\|*(IbcCuFlag && PtsEnableFlag)*)) && (width <= 64) && (height <= 64) && (width >4 height > 4) && (InterpfFlag == 0) && ctp_y[0] ) { | |
|                     sbt_cu_flag | u(1) |
|                     ... | |
|                     *isIstApply = ((((!IntraCuFlag && !DirectFlag&& !SkipFlag && !SbtCuFlag && PhTsInterEnableFlag)\|\| (IntraCuFlag && !IscCuFlag)) && PhIstsEnableFlag) \|\|(IntraCuFlag && !IscCuFlag && !IbcCuFlag && IstEnableFlag)) && !DtSplitFlag && width<64 && height<64 && !isChroma* | |
|                     block(i, blockwidth, blockHeight, CuCtp, IsChroma, IsPcmMode[i], [[IntraCuFlag]]*isIstApply* , component) | |

7.1.7 Transform Block Definition

| Transform Block Definition | Descriptor |
|---|---|
| block(i, blockWidth, blockHeight, CuCtp, isChroma, isPcm, [[isIntra]] *isIstApply*, component) { | |
|     ... | |
|     if (! isPcm) { | |
|         if (CuCtp & (1 «i)) { | |
|             if (SrccEnableFlag) { | |
|                 ... | |
|                 if ([[isIntra && (IstEnableFlag \|\| PhIstsEnableFlag) && ! DtSplitFlag]] *isIstApply*) { | |
|                     IstTuFlag = (! PhIstsEnableFlag && (scan_region_x >=16 \|\| scan_region_y >=16)) ? 0 : NumNonZeroCoeff % 2 ? 1 : 0 | |

-continued

| Transform Block Definition | Descriptor |
|---|---|

```
                }
            }
        else {
                                        ...
            if ([[isIntra && IstEnableFlag && ! DtSplitFlag]] isIstApply) {
                IstTuFlag = NumNonZeroCoeff % 2 ? 1 : 0
            }
                                        ...
        }
                                    ...
    }
                                ...
}
```

7.2.2.2 Sequence Header
*Transform skip enable flag ts inter enable flag*

*Binary variable. A value of '1'means that the local transform skip method can be used;a value of '0'means that the local transform skipmethod should not be used. The value of TsInterEnableFlagis equal to ts inter enable flag. If ts inter enable flag does not exist in the bit stream, the value of TsInterEnableFlag is 0. Patrial transform skip enabled flag pts enable flag*
    *Binary variable. A value of '1' means that the local transform skip method can be used; a value of '0' means that the local transform skip method should not be used. The value of PtsEnableFlag is equal to pts enable flag. If pts enable flag does not exist in the bit stream, the value of PtsEnableFlag is 0. rts enable flag*
    *Binary variable. A value of '1' indicates that the implicitly selective transform skip method can be used; a value of '0' indicates that the implicitly selective transform skip method should not be used. The value of RtsEnableFlag is equal to rts enable flag. If rts enable flag does not exist in the bit stream, the value of RtsEnableFlag is 0.*
7.2.3.2 Inter Prediction Header Definition
*transform skip enable flag ph ts inter enable flag*

*Binary variable. A value of '1' means that the luminance inter prediction residual block and the luminance directr mode residual block of the current frame use the transform skip method; a value of '0' means the luminance inter prediction residual block and the luminance direct mode residual block of the current frame The difference block cannot use the transform skip method The value of PhTsInterEnableFlag is equal to the value of ph ts inter enable flag. If ph ts inter enable flag does not exist in the bit stream, the value of PhTsInterEnableFlag is 0. Partial transform skip enabled flag ph pts enable flag*
    *Binary variable.*
*A value of '1' indicates that the luminance block of the current frame replicates the intra prediction residual block using the transform skip method; the value of '0' indicates that the brightness block of the current frame replicates the intra prediction residual block using the transform skip method. The value of PhPtsEnableFlag is equal to the value of ph pts enable flag. If ph pts enable flag does not exist in the bitstream, the value of PhPtsEnableFlag is 0. Partial transform skip enabled flag ph pts enable flag*

*Binary variable. A value of '1' indicates that the normal luma intra prediction residual block or luma inter prediction residual block or the luma direct mode residual block of the current frame uses the transform skip method; a value of '0' indicates the luma intra prediction block of the current frame The prediction residual block or the luma inter prediction residual block or the luma direct mode residual block cannot use the transform skip method. The value of PhRtsEnableFlag is equal to the value of ph rts enable flag. If ph rts enable flag does not exist in the bit stream, the value of PhRtsEnableFlag is 0.*

9.6.3 Inverse Transformation If the intra prediction mode is neither 'Intra_Luma_PCM' nor 'Intra_Chroma_PCM' or the current block uses the block copy intra prediction mode, then:
    If PhIstsEnableFlag is 0 and the current transform block is a luma intra prediction residual block, the values of M1 and M2 are both less than 64 and the value of IstTuFlag is equal to 1, then the residual sample matrix ResidueMatrix is derived according to the method defined in 9.6.3.2;
    Otherwise, if PhIstsEnableFlag is 1, and the current transform block is a luma intra prediction residual block or a luma block copy intra prediction residual block *or luma inter prediction residual block, or the value of the current transform block SbtCuFlag is greater than 0 and PhTsInterEnableFlag is 1 or IbcCuFlag is 1 and the value of SbtCuFlag is greater than 0,* the values of M1 and M2 are both less than 64 and the value of IstTuFlag is equal to 1, then the residual sample matrix ResidueMatrix is derived according to the method defined in 9.6.3.4;
    Otherwise, the residual sample matrix ResidueMatrix is derived according to the method defined in 9.6.3.1.
    Otherwise (the intra prediction mode is 'Intra_Luma_PCM' or 'Intra_Chroma_PCM'), the residual sample matrix ResidueMatrix is derived according to the method defined in 9.6.3.3.
9.6.3.4 Implicitly Selective Inverse Transform Skip Method
    The implicitly selective inverse transform skip method is as follows:

a) Compute offset shift, shift is equal to 15-BitDepth-((logM1+logM2)>>1)

_b) Compute the position index m and n,_
_the calculation process is as follows:_
_If the current transform block is a_
_normal luma intra prediction residual_
_block or the value of the current_
_transform block SbtCuFlag is greater than 0,_
_and PhRtsEnableFlag is 1:_

Otherwise: _m = M1 − i, n = M2 − j_ _c)_ If shift is greater than or equal to 0, the carry factor rnd_factor is equal to 1 >>(shift-1). Get the matrix W from the transformation coefficient matrix:

$$w_{ij} = (\text{CoeffMatrix}_{[[ij]] \underline{mn}} + \text{rnd\_factor}) >> \text{shift}$$

_d)_ If shift is less than 0, let shift=-shift. Get the matrix W from the transformation matrix:

$$w_{ij} = (\text{CoeffMatrix}_{[[ij]] \underline{mn}} + \text{rnd\_factor}) >> \text{shift}$$

_e)_ The matrix W is directly used as the residual sample matrix ResidueMatrix, and the implicit inverse transformation skip operation is ended.

Figure 17:
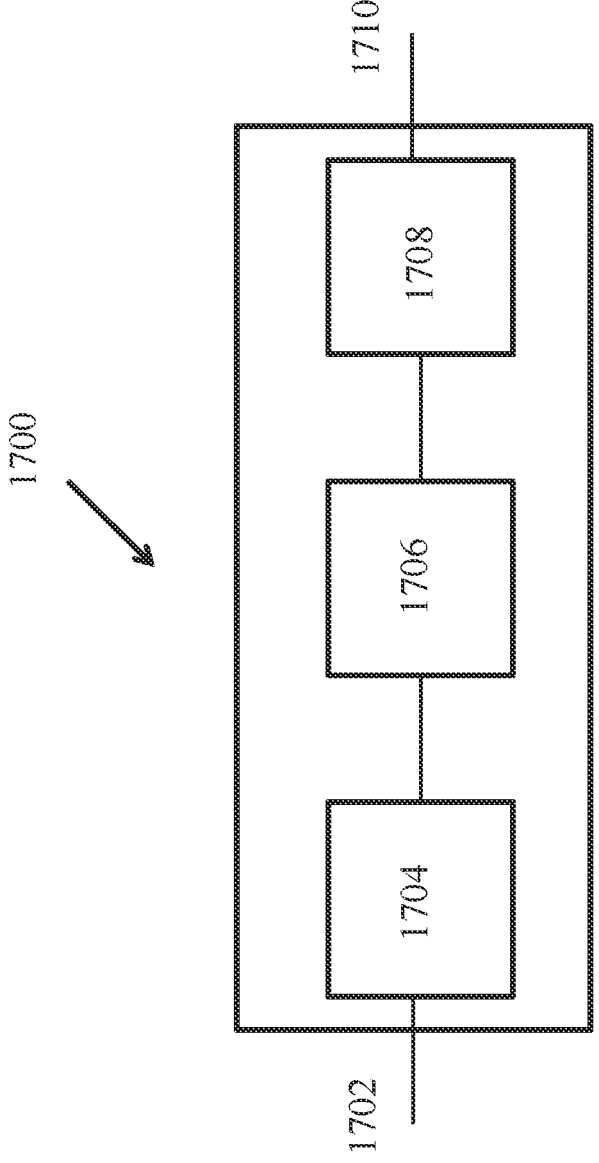
FIG. 17 is a block diagram of an example video processing system.

FIG. 17 is a block diagram showing an example video processing system 1700 in which various techniques disclosed herein may be implemented. Various implementations may include some or all of the components of the system 1700. The system 1700 may include input 1702 for receiving video content. The video content may be received in a raw or uncompressed format, e.g., 8 or 10 bit multi-component pixel values, or may be in a compressed or encoded format. The input 1702 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1700 may include a coding component 1704 that may implement the various coding or encoding methods described in the present document. The coding component 1704 may reduce the average bitrate of video from the input 1702 to the output of the coding component 1704 to produce a coded representation of the video. The coding techniques are therefore sometimes called video compression or video transcoding techniques. The output of the coding component 1704 may be either stored, or transmitted via a communication connected, as represented by the component 1706. The stored or communicated bitstream (or coded) representation of the video received at the input 1702 may be used by the component 1708 for generating pixel values or displayable video that is sent to a display interface 1710. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HIDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 21:
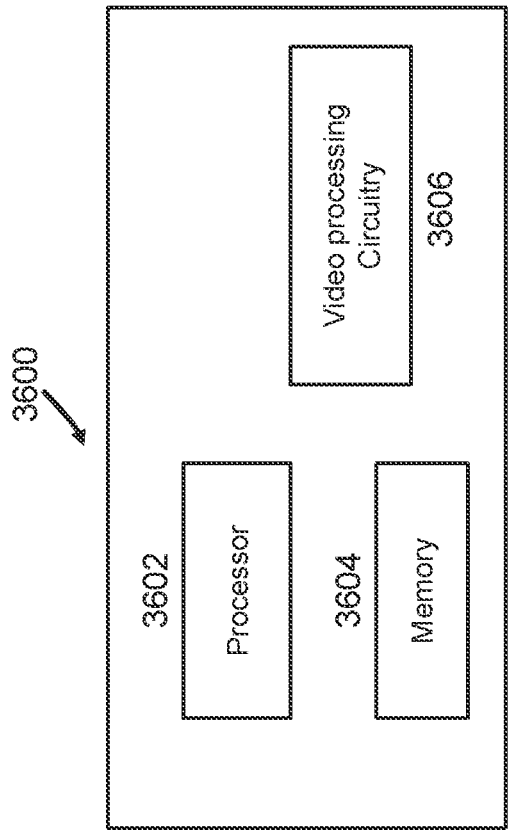
FIG. 21 is a block diagram of a video processing apparatus.

FIG. 21 is a block diagram of a video processing apparatus 2100. The apparatus 2100 may be used to implement one or more of the methods described herein. The apparatus 2100 may be embodied in a smartphone, tablet, computer, Internet of Things (IoT) receiver, and so on. The apparatus 2100 may include one or more processors 2102, one or more memories 2104 and video processing hardware 2106. The processor(s) 2102 may be configured to implement one or more methods described in the present document. The memory (memories) 2104 may be used for storing data and code used for implementing the methods and techniques described herein. The video processing hardware 2106 may be used to implement, in hardware circuitry, some techniques described in the present document.

Figure 18:
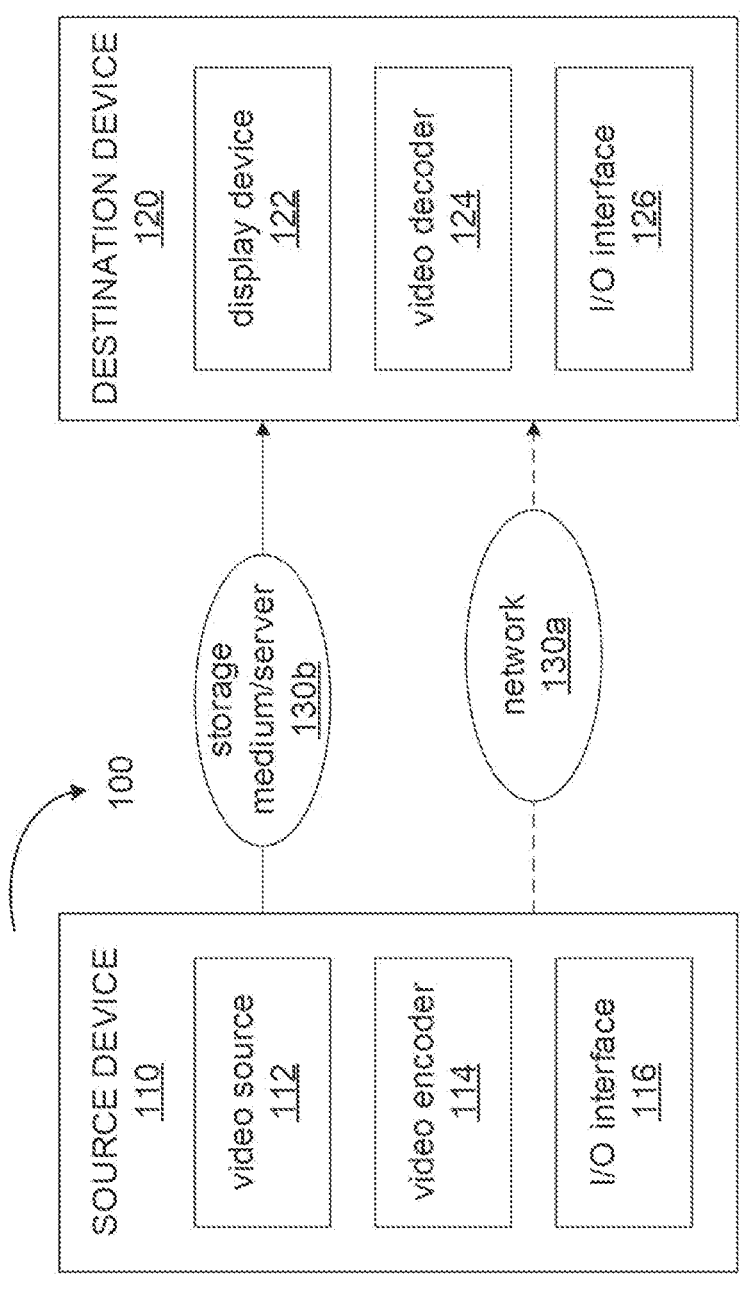
FIG. 18 is a block diagram that illustrates a video coding system in accordance with some embodiments of the present disclosure.

FIG. 18 is a block diagram that illustrates an example video coding system 100 that may utilize the techniques of this disclosure.

As shown in FIG. 18, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130_a_. The encoded video data may also be stored onto a storage medium/server 130_b_ for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130_b_. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 19:
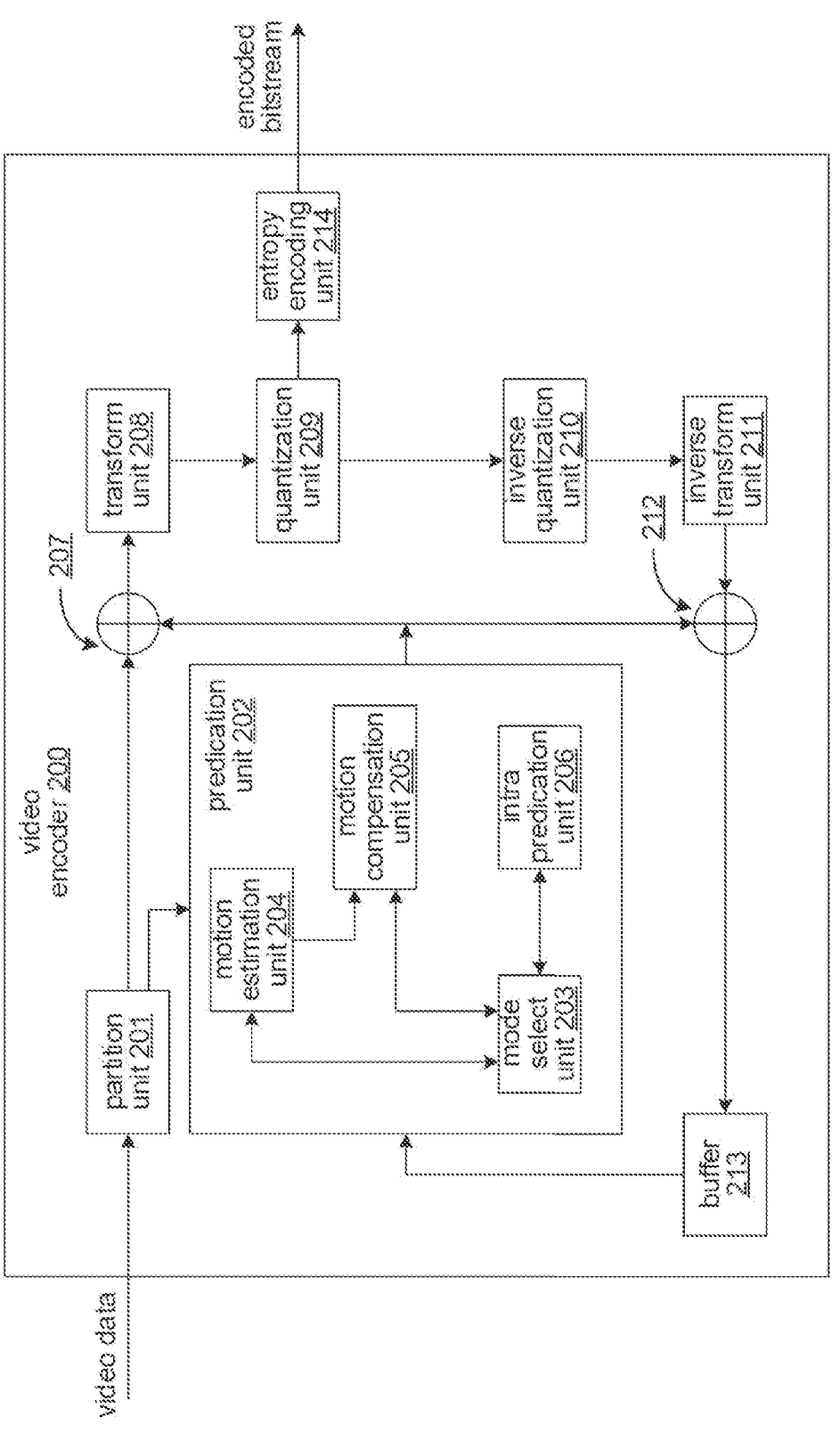
FIG. 19 is a block diagram that illustrates an encoder in accordance with some embodiments of the present disclosure.

FIG. 19 is a block diagram illustrating an example of video encoder 200, which may be video encoder 114 in the system 100 illustrated in FIG. 18.

Video encoder 200 may be configured to perform any or all of the techniques of this disclosure. In the example of FIG. 19, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 19 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 20:
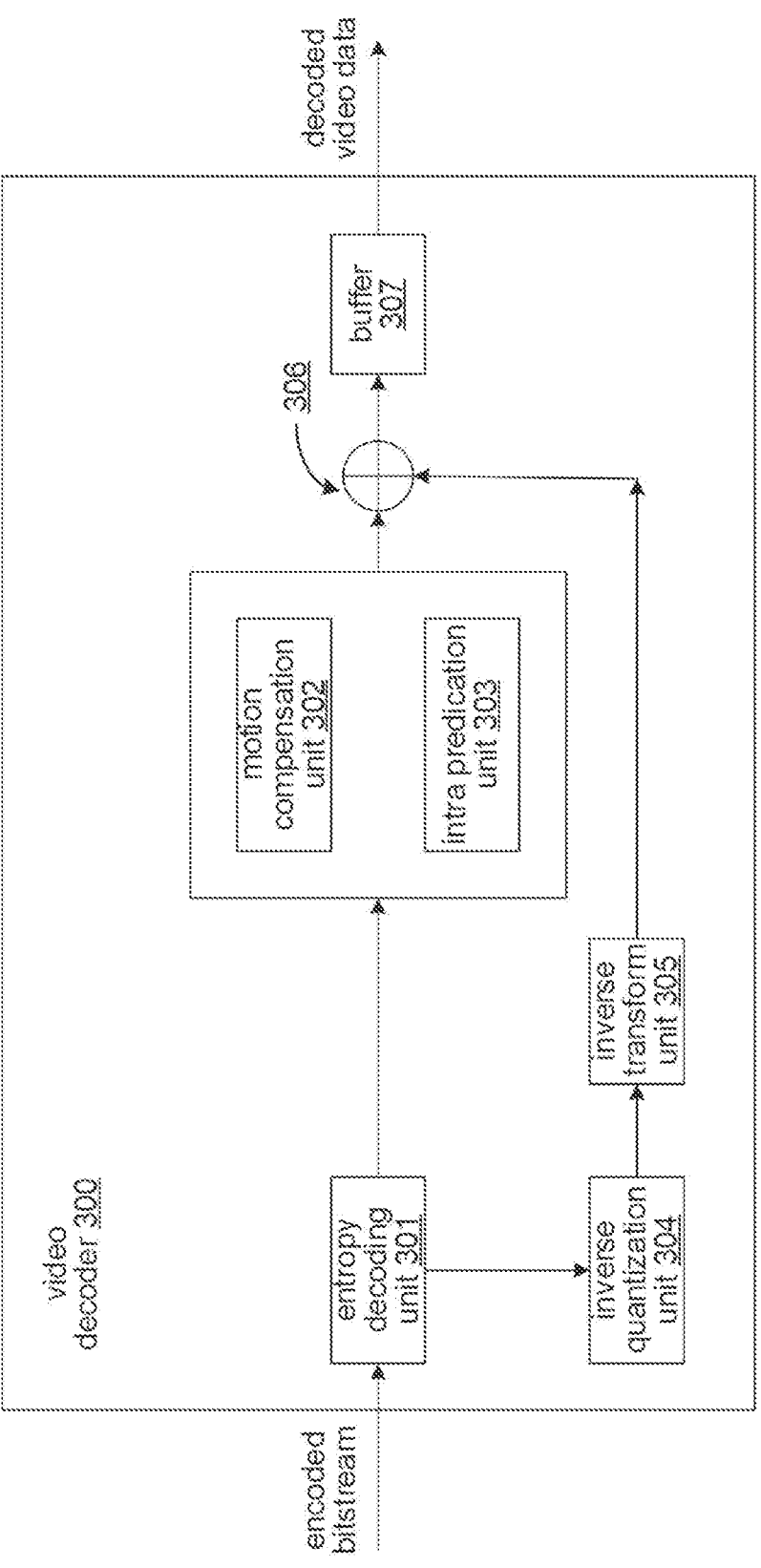
FIG. 20 is a block diagram that illustrates a decoder in accordance with some embodiments of the present disclosure.

FIG. 20 is a block diagram illustrating an example of video decoder 300 which may be video decoder 114 in the system 100 illustrated in FIG. 18.

The video decoder 300 may be configured to perform any or all of the techniques of this disclosure. In the example of FIG. 20, the video decoder 300 includes a plurality of functional components. The techniques described in this disclosure may be shared among the various components of the video decoder 300. In some examples, a processor may be configured to perform any or all of the techniques described in this disclosure.

In the example of FIG. 20, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 19).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, e.g., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions preferred by some embodiments is provided next.

The following solutions show example embodiments of techniques discussed in the previous section (e.g., item 1).

Figure 22:
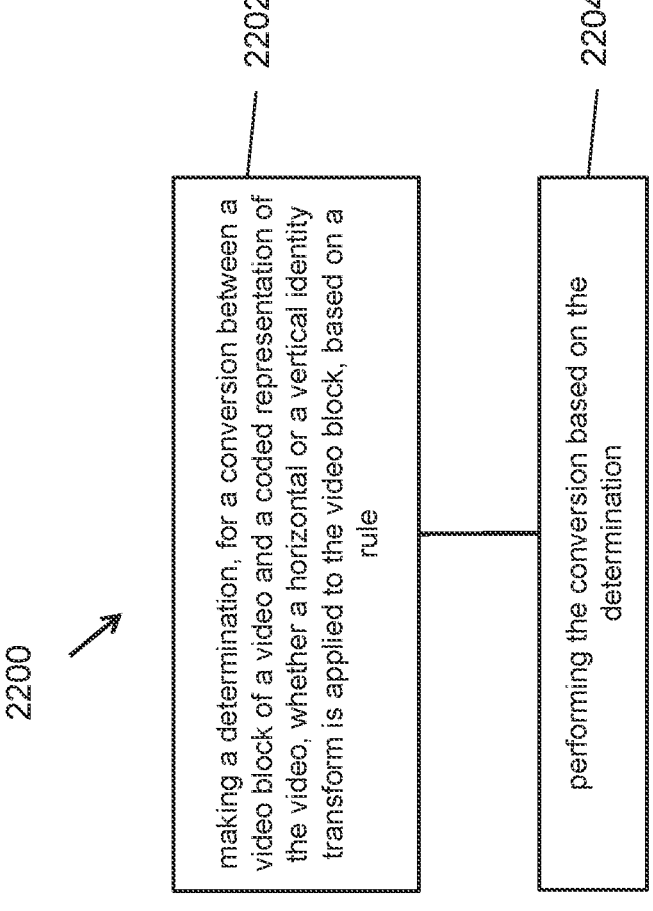
FIG. 22 is a flowchart for an example method of video processing.

1. A video processing method (e.g., method 2200 depicted in FIG. 22) comprising: making a determination (2202), for a conversion between a video block of a video and a coded representation of the video, whether a horizontal or a vertical identity transform is applied to the video block, based on a rule; and performing (2204) the conversion based on the determination, wherein the rule specifies a relationship between the determination and representative coefficients from decoded coefficients of one or more representative blocks of the video.

2. The method of solution 1, wherein the one or more representative blocks belong to a color component to which the video block belongs.

3. The method of solution 1, wherein the one or more representative blocks belong to a different color component than that of the video block.

4. The method of any of solutions 1-3, wherein the one or more representative blocks correspond to the video block.

5. The method of any of solutions 1-3, wherein the one or more representative blocks exclude the video block.

The following solutions show example embodiments of techniques discussed in the previous section (e.g., items 1 and 2).

6. The method of any of solutions 1-5, wherein the representative coefficients comprise decoded coefficients having non-zero values.

7. The method of any of solutions 1-6, wherein the relationship specifies to use the representative coefficients based on modified coefficients that are determined by modifying the representative coefficients.

8. The method of any of solutions 1-7, wherein the representative coefficients correspond to significant coefficients of the decoded coefficients.

The following solutions show example embodiments of techniques discussed in the previous section (e.g., item 3).

9. A video processing method, comprising: making a determination, for a conversion between a video block of a video and a coded representation of the video, whether a horizontal or a vertical identity transform is applied to the video block, based on a rule; and performing the conversion based on the determination, wherein the rule specifies a relationship between the determination and decoded luma coefficients of the video block.

10. The method of solution 1, wherein performing the conversion comprises applying the horizontal or the vertical identity transform luma component of the video block and applying DCT2 to chroma components of the video block.

The following solutions show example embodiments of techniques discussed in the previous section (e.g., items 1 and 4).

11. A video processing method, comprising: making a determination, for a conversion between a video block of a video and a coded representation of the video, whether a horizontal or a vertical identity transform is applied to the video block, based on a rule; and performing the conversion based on the determination, wherein the rule specifies a relationship between the determination and a value V associates with representative coefficients of decoded coefficients or a representative block.

12. The method of solution 11, wherein V is equal to a number of representative coefficients.

13. The method of solution 11, wherein V is equal to a sum of values of the representative coefficients.

14. The method of solution 11, wherein V is a function of residual energy distribution of the representative coefficients.

15. The method of any of solutions 11-14, wherein the relationship is defined with respect to a parity of the value V.

The following solutions show example embodiments of techniques discussed in the previous section (e.g., item 5).

16. The method of any of above solutions, wherein the rule specifies that the relationship is further dependent on a coded information of the video block.

17. The method of solution 16, wherein the coded information is a coding mode of the video block.

18. The method of solution 16, wherein the coded information includes a smallest rectangular region that covers all significant coefficients of the video block.

The following solutions show example embodiments of techniques discussed in the previous section (e.g., item 6).

19. The method of any of above solutions, wherein the determination is performed due to the video block having a mode or a constraint on coefficients.

20. The method of solution 19, wherein the type corresponds to an intra-block copy (IBC) mode.

21. The method of solution 19, wherein the constraint on coefficients is such that coefficients outside a rectangular interior of the current block are zero.

The following solutions show example embodiments of techniques discussed in the previous section (e.g., item 7).

22. The method of any of solutions 1-21, wherein, in case that the determination is not to use the horizontal and the vertical identity transform, the conversion is performed using a DCT-2 or a DST-7 transform.

The following solutions show example embodiments of techniques discussed in the previous section (e.g., items 9).

23. The method of any of solutions 1-22, wherein one or more syntax fields in the coded representation is indicative of whether the method is enabled for the video block.

24. The method of solution 23, wherein the one or more syntax fields are included at a sequence level or a picture level or a slice level or a tile group level or a tile level or subpicture level.

25. The method of any of solutions 23-24, wherein the one or more syntax fields are included in a slice header or a picture header.

The following solutions show example embodiments of techniques discussed in the previous section (e.g., items 1 and 8).

26. A video processing method, comprising: determining that one or more syntax fields are present in a coded representation of a video wherein the video contains one or more video blocks; making a determination, based on the one or more syntax fields, whether a horizontal or a vertical identity transform is enabled for video blocks in the video.

27. The method of solution 1, wherein in response that the one or more syntax fields indications implicit determination of transform skip mode is enabled, making a determination, for a conversion between a first video block of the video and the coded representation of the video, whether a horizontal or a vertical identity transform is applied to the video block, based on a rule; and performing the conversion based on the determination, wherein the rule specifies a relationship between the determination and representative coefficients from decoded coefficients of one or more representative blocks of the video.

28. The method of solution 27, the first video block is coded with an intra block copy mode.

29. The method of solution 27, the first video block is coded with an intra mode.

30. The method of solution 27, the first video block is coded with intra mode but not a derived tree (DT) mode.

31. The method of solution 27, the determination is based on the parity of number of non-zero coefficients in the first video block.

32. The method of solution 27, when the parity of number of non-zero coefficients in the first video block is even, horizontal and vertical identity transform is applied to the first video block.

33. The method of solution 27, when the parity of number of non-zero coefficients in the first video block is even, horizontal and vertical identity transform is not applied to the first video block.

34. The method of solution 33, DCT-2 is applied to the first video block.

35. The method of solution 32, further including in response that the one or more syntax fields indications implicit determination of transform skip mode is disabled, horizontal and vertical identity transform is not applied to the first video block.

36. The method of solution 32, wherein DCT-2 is applied to the first video block.

The following solutions show example embodiments of techniques discussed in the previous section (e.g., items 9, 10).

37. A method of video processing, comprising: making a first determination regarding whether use of an identity transform is enabled for a conversion between a video block of a video and a coded representation of the video; making a second determination regarding whether a zero-out operation is enabled during the conversion; and performing the conversion based on the first determination and the second determination.

38. The method of solution 37, wherein one or more syntax fields at a first level in the coded representation are indicative of the first determination.

39. The method of any of solutions 37-38, wherein one or more syntax fields at a second level in the coded representation are indicative of the second determination.

40. The method of any of solutions 38-39, wherein the first level and the second level correspond to a header field at sequence or picture level or a parameter set at a sequence level or a picture level or an adaptation parameter set.

41. The method of any of solutions 37-40, wherein the conversion uses either the identify transform or the zero-out operation but not both.

The following solutions show example embodiments of techniques discussed in the previous section (e.g., items 12 and 13).

42. A video processing method, comprising: performing a conversion between a video block of a video and a coded representation of the video; wherein the video block is represented in the coded representation as a coded block, wherein non-zero coefficients of the coded block are restricted to be within one or more sub-regions; and wherein an identity transform is applied for generating the coded block.

43. The method of solution 1, wherein the one or more sub-regions comprises a top-right sub-region of the video block having a dimension K×L, where K and L are integers, and K is min(T1, W) and L is min(T2, H) wherein W and H are width and height of the video block, respectively and T1 and T2 are thresholds.

44. The method of any of solutions 42-43, wherein the coded representation indicates the one or more sub-regions.

The following solutions show example embodiments of techniques discussed in the previous section (e.g., items 16 and 17).

45. The method of any of solutions 1-44, wherein the video region comprises a video coding unit.

46. The method of solutions 1-45, wherein the video region is a prediction unit or a transform unit.

47. The method of any of solutions 1-46, wherein the video block meets a certain dimension condition.

The following solutions show example embodiments of techniques discussed in the previous section (e.g., items 18-23).

49. A method of video processing, comprising: performing a conversion between a video comprising one or more video regions and a coded representation of the video, wherein the coded representation complies with a format rule; wherein the format rule specifies that coefficients of a video region are reordered according to a map after parsing from the coded representation.

50. The method of solution 49, wherein the coefficients are reordered prior to de-quantization, prior to inverse transformation or prior to reconstruction.

51. The method of any of solutions 49-50, wherein the format rule specifies that the video region corresponds to a coding unit or a transform unit or a prediction unit.

52. The method of any of solutions 49-51, wherein the format rule specifies that a coded information of the coded representation determines how to reorder the coefficients after parsing.

53. The method of any of solutions 49-52, wherein the format rule specifies that the map is determined by a transform type used in a slice or a picture or a tile type of the video region.

54. The method of any of solutions 49-52, wherein the format rule specifies that the map is determined by a transform type used in a coding tree unit, a coding unit or a block type for the video region.

55. The method of any of solutions 49-52, wherein the format rule specifies that the map is determined by syntax field included in a parameter set or a header field in the coded representation.

The following solutions show example embodiments of techniques discussed in the previous section (e.g., items 24-25).

56. A method of video processing, comprising: determining, for a conversion of a video block of a video and a coded representation of the video, whether the video block meets a condition for signaling in the coded representation as a partial residual block; and performing the conversion according to determining; wherein the partial residual block is partitioned into at least two parts, with at least one part having no non-zero residues signaled in the coded representation.

57. The method of solution 56, wherein the condition is based on a mode used for coding the video block into the coded representation.

58. The method of solutions 56-57, wherein one or more of the at least two parts are signaled in the coded representation according to a format rule.

59. The method of any of solutions 1-58, wherein the video region comprises a video picture.

60. The method of any of solutions 1 to 59, wherein the conversion comprises encoding the video into the coded representation.

61. The method of any of solutions 1 to 59, wherein the conversion comprises decoding the coded representation to generate pixel values of the video.

62. A video decoding apparatus comprising a processor configured to implement a method recited in one or more of solutions 1 to 61.

63. A video encoding apparatus comprising a processor configured to implement a method recited in one or more of solutions 1 to 61.

64. A computer program product having computer code stored thereon, the code, when executed by a processor, causes the processor to implement a method recited in any of solutions 1 to 61.

65. A method, apparatus or system described in the present document.

Figure 24:
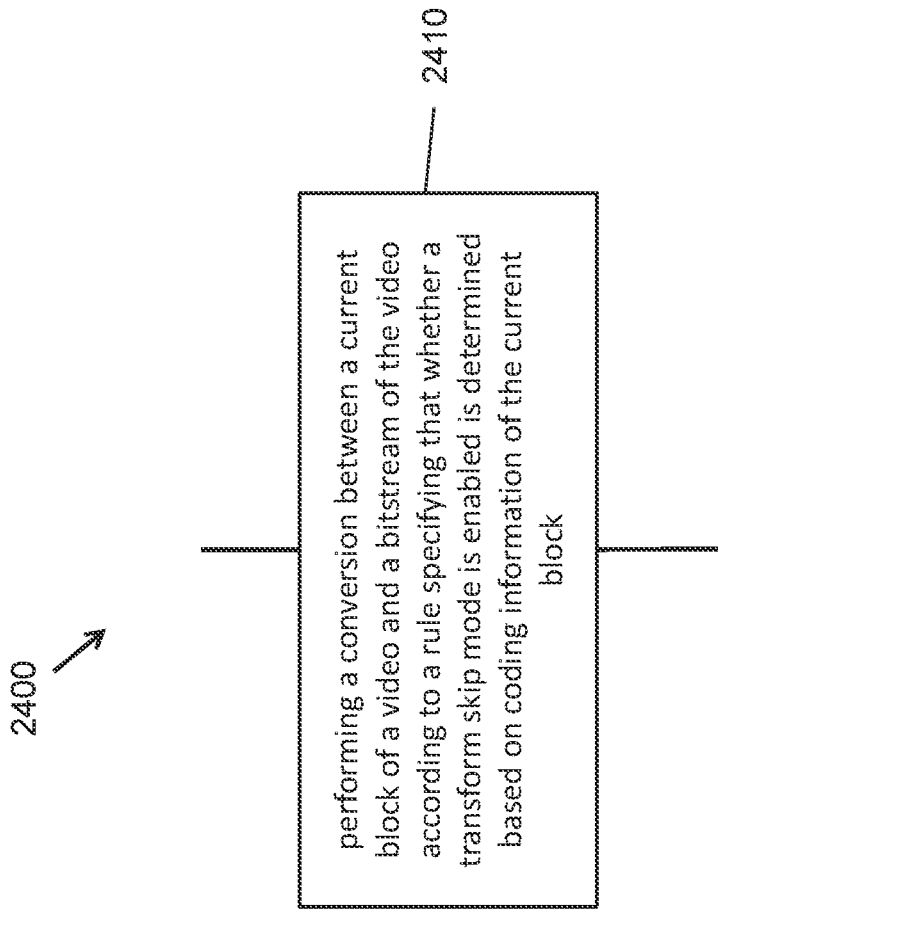
FIG. 24 is a flowchart representation of a method of processing video data in accordance with the present technology.

FIG. 24 is a flowchart representation of a method for video processing in accordance with the present technology. The method 2400 includes, at operation 2410, performing a conversion between a current block of a video and a bitstream of the video according to a rule. The rule specifies that whether a transform skip mode is enabled is determined based on coding information of the current block. The transform skip mode is a coding mode in which a transform is skipped on a prediction residual of a video block.

In some embodiments, the coding information includes whether subblock transform is applicable to the current block. In some embodiments, the determining is further based on a syntax element included in a sequence parameter set. In some embodiments, the determining is further based on a syntax element included in a picture header, a sequence header, a picture parameter set, a video parameter set, or a slice header. In some embodiments, the coding information includes whether the current block is coded in an inter mode. In some embodiments, the coding information includes whether the current block is coded in a direct mode. In some embodiments, the coding information includes whether the current block is coded in an intra-block copy (IBC) mode. In some embodiments, the coding information includes whether the current block is coded using a subblock transform. In some embodiments, the coding information includes whether the current block is coded using a position based transform (PBT).

In some embodiments, the transform skip mode is determined based on representative coefficients of the current block. In some embodiments, the current block is coded in the inter-coded mode. The direct mode and subblock transform are not applicable to the current block. In some embodiments, the transform skip mode is determined based on representative coefficients of the current block that is coded in the inter-coded mode, wherein subblock transform is applicable to the current block. In some embodiments, in response to the current block being coded in the inter-coded mode and subblock transform being applicable to the current block, the transform skip mode is applicable to the current block. In some embodiments, in response to the current block being coded in an intra copy mode and subblock transform being applicable to the current block, the transform skip mode is applicable to the current block. In the intra copy mode, prediction samples are derived from blocks of sample values of a same decoded video region. In some embodiments, the determining is invoked in response to the coding information of the current block satisfies a condition.

Figure 25:
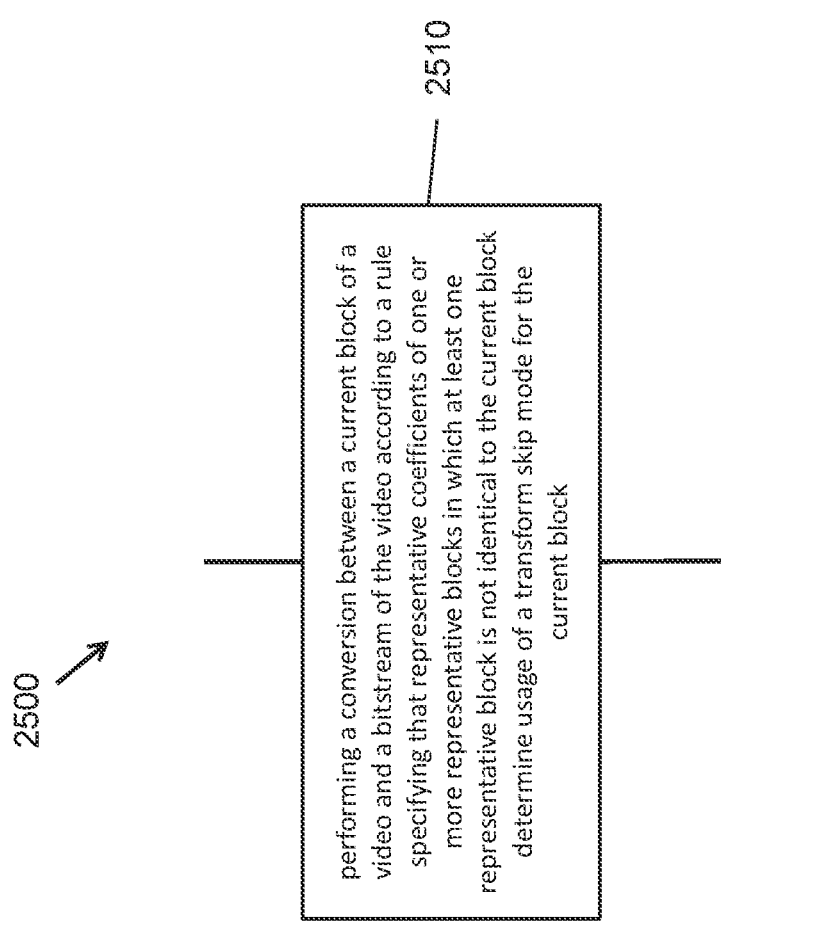
FIG. 25 is a flowchart representation of another method of processing video data in accordance with the present technology.

FIG. 25 is a flowchart representation of a method of processing video data in accordance with the present technology. The method 2500 includes, at operation 2510, performing a conversion between a current block of a video and a bitstream of the video according to a rule. The rule specifies that representative coefficients of one or more representative blocks in which at least one representative block is not identical to the current block determine usage of a transform skip mode for the current block, wherein the one or more representative blocks comprise last N blocks before the current block in a decoding order that have a same prediction mode, N being an integer greater than 1.

In some embodiments, the same prediction mode comprises an inter-coded mode. In some embodiments, the same prediction mode comprises a direct-coded mode.

FIG. 26 is a flowchart representation of a method for video processing in accordance with the present technology. The method 2600 includes, at operation 2610, performing a conversion between a current block of a video and a bitstream of the video according to a rule. The rule specifies that representative coefficients of one or more representative blocks of the video determine usage of a transform skip mode for the conversion of the current video block wherein the representative coefficients include a coefficient at a predefined location (xPos, yPos) relative to a representative block.

In some embodiments, xPos is equal to or smaller than a threshold Tx and/or yPos is equal to or smaller than a threshold Ty. In some embodiments, Tx is 31 and/or Ty is 31. In some embodiments, xPos is equal to or greater than a threshold Tx and/or yPos is equal to or greater than a threshold Ty. In some embodiments, Tx is 32 and/or Ty is 32. In some embodiments, xPos and/or yPos are determined according to one or more syntax elements indicating an allowed subblock with non-zero coefficients. In some embodiments, the one or more syntax elements also indicate a pattern of subblock transform. In some embodiments, the method is applicable to video blocks coded in an inter-coded mode. In some embodiments, the method is applicable to video blocks coded in a direct-coded mode.

Figure 27:
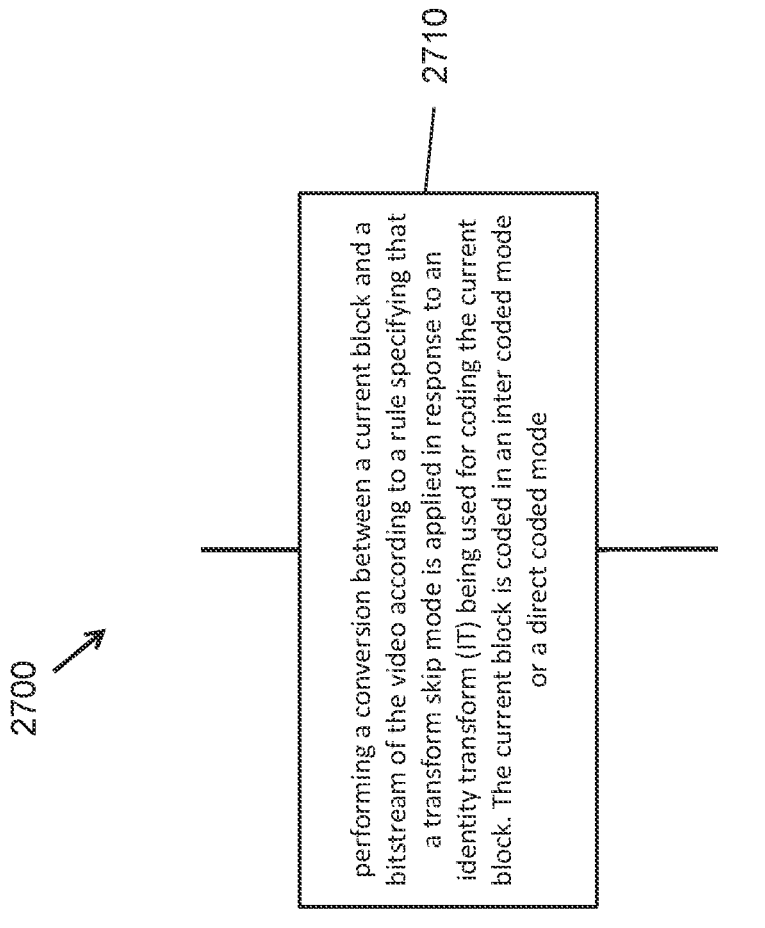
FIG. 27 is a flowchart representation of another method of processing video data in accordance with the present technology.

FIG. 27 is a flowchart representation of a method of processing video data in accordance with the present technology. The method 2700 includes, at operation 2710, performing a conversion between a current block and a bitstream of the video according to a rule. The rule specifies that a transform skip mode is applied in response to an identity transform (IT) being used for coding the current block. The current block is coded in an inter coded mode or a direct coded mode.

In some embodiments, in case the transform skip mode is not applicable, at least one of DCT2, DST7, or DCT8 is used. In some embodiments, DCT2, DST7, or DCT8 is used according to usage of subblock transform. In some embodiments, two allowed transform sets include {DCT2}and {DCT2, IT}. In some embodiments, the two allowed transform sets are used for non-DT-coded blocks. In some embodiments, an allowed transform set includes {DCT2, IT}. In some embodiments, the allowed transform set is determined based on whether implicit selection of transform (IST) or subblock transform is enabled.

In some embodiments, whether the transform skip mode is applicable is determined based on a first syntax element in a picture header indicates that transform skip is enabled. In some embodiments, a second syntax element in a sequence header is included in the bitstream in response to the first syntax element indicating that the transform skip is enabled, and the second syntax element in the sequence header is omitted in the bitstream in response to the first syntax element being omitted in the bitstream. In some embodiments, whether the transform skip mode is applicable is determined further based on whether an additional condition is satisfied, the additional condition including whether parity of the representative coefficients of the current block satisfied a predefined requirement. In some embodiments, the current block is coded in an inter-coded mode or an intra-block copy mode.

FIG. 28 is a flowchart representation of a method of processing video data in accordance with the present technology. The method 2800 includes, at operation 2810, performing a conversion between a current block of a video and a bitstream of the video according to a rule. The rule specifies that coded information of the current block determines usage of coefficient reordering by which coefficients of the current block parsed from the bitstream are reordered prior to applying a dequantization process, an inverse transform process, or a reconstruction process.

In some embodiments, the current block is a coding unit, a transform unit or a prediction unit, and wherein the coefficient reordering is performed at a coding unit level. In some embodiments, the coded information includes a transform type applicable to the conversion. In some embodiments, the transform type is determined based on the coefficients. In some embodiments, the transform type comprises at least one of a DCI-2 mode, a DST-7 mode, a DCT-8 mode, or a transform skip mode in which coefficients of a video block are coded without applying a non-identity transform. In some embodiments, the usage of the coefficient reordering is based on whether the transform skip mode is used. In some embodiments, the parsed coefficients are re-arranged in a reversed order before the dequantization process, the inverse transform process, or the reconstruction process.

In some embodiments, the rule specifies that the usage of the coefficient reordering is further based on a coding tree unit type, a coding unit type, or a block type. In some embodiments, the usage of the coefficient reordering is based on the transform type of blocks having a specific type. In some embodiments, the usage of the coefficient reordering is not based on the transform type of blocks not being the specific type. In some embodiments, blocks having the specific type includes blocks that are intra-coded. In some embodiments, the rule specifies that the usage of the coefficient reordering is further based on a slice type, a picture type, or a tile type. In some embodiments, the usage of the coefficient reordering is based on the transform type of an I slice or an I picture. In some embodiments, the usage of the coefficient reordering is not based on the transform type of a P slice, a B slice, a P picture, or a B picture.

In some embodiments, the coded information includes a transform unit location for a transform-unit level subblock. In some embodiments, whether the usage of the coefficient reordering is based on the transform type is indicated by a syntax flag in a video parameter set, a sequence parameter set, a picture parameter set, a sequence header, a picture header, a slice header, a coding tree unit, a coding unit, or a coding block. In some embodiments, the syntax flag is conditionally included in the bitstream in response to a block not being a zero-residue block, wherein the block is at a coding unit level, a transform unit level, or a partial subblock level. In some embodiments, the syntax flag is conditionally included in the bitstream in response to the transform type indicating that a transform skip mode is enabled. In some embodiments, a first syntax element is included in a sequence header indicating the transform type, and a second syntax element is conditionally included in a picture header according to the first syntax element.

In some embodiments, the usage of the coefficient reordering is indicated by in a video parameter set, a sequence parameter set, a picture parameter set, a sequence header, a picture header, a slice header, a coding tree unit, a coding unit, or a coding block.

Figure 29:
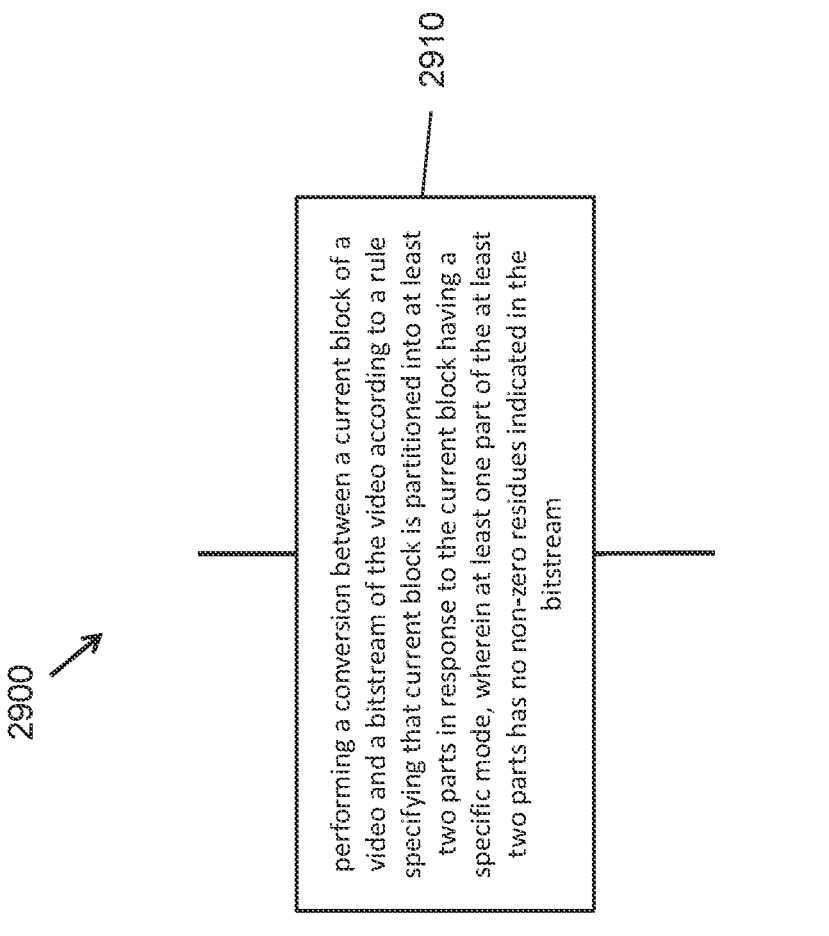
FIG. 29 is a flowchart representation of yet another method of processing video data in accordance with the present technology.

FIG. 29 is a flowchart representation of a method of processing video data in accordance with the present technology. The method 2900 includes, at operation 2910, performing a conversion between a current block of a video and a bitstream of the video according to a rule. The rule specifies that current block is partitioned into at least two parts in response to the current block having a specific mode. At least one part of the at least two parts has no non-zero residues indicated in the bitstream.

In some embodiments, the specific mode includes an intra-block copy mode. In some embodiments, a syntax element indicating whether a position-based transform is applied is omitted in the bitstream. In some embodiments, an identity transform and/or a DCT2 transform is applied to the current block. In some embodiments, a syntax element indicating whether sub-block transform is used is included in the bitstream. In some embodiments, the specific mode includes an inter-coded mode. In some embodiments, only one of an identity transform or a DCT2 transform is applied to the current block.

In some embodiments, the current block has a size of M×N, and wherein the at least two parts include a first part of (M/k)×N and a second part of (M-M/k)×N, wherein k is an integer greater than 1. In some embodiments, the current block has a size of M×N, and wherein the at least two parts include a first part of M×(N/k) and a second part of M×(N−N/k), wherein k is an integer greater than 1. In some embodiments, the current block has a size of M×N, and wherein the at least two parts include a first part of (M/k)×(N/k) and a second part having an L shape, wherein k is an integer grater than 1. In some embodiments, k is 2, 4, 8, or 16.

In some embodiments, a syntax element indicating whether a part has non-zero residues is conditionally included in the bitstream. In some embodiments, the part that has non-zero residues is indicated in the bitstream. In some embodiments, a transform skip mode in which coefficients of a video block are coded without applying a non-identity transform is applicable to the current block in response to a dimension of the current block satisfying a constraint. In some embodiments, the constraint specifies that (W<=T1 and H<=T2), W is a width of the current block, H is a height of the current block, and T1 and T2 are integers. In some embodiments, T1 and T2 are equal to 32 or 64. In some embodiments, the constraint specifies that (W >T3 or H >T4), where W is a width of the current block, H is a height of the current block, and T3 and T4 are integers. In some embodiments, T3 and T4 are equal to 4 or 8.

In some embodiments, a transform skip mode is applicable to the part that has non-zero residues. In some embodiments, whether the current block is a PRB and/or how the current block is partitioned is indicated in a video parameter set, a sequence parameter set, a picture parameter set, a sequence header, a picture header, a slice header, a coding tree unit, a coding unit, or a block.

In some embodiments, the bitstream includes multiple levels of signaling to indicate whether and/or how the current block is partitioned. In some embodiments, a first indication in a first level indicates whether the PRB is enabled, and a second indication in a second level indicates whether the PRB is applied. In some embodiments, the first level includes a sequence level or a picture level, and wherein the second level includes a block level. In some embodiments, the first level includes a picture header, and wherein the second level includes a sequence header. In some embodiments, whether the current block is a PRB and/or how the current block is partitioned is determined during the conversion.

In some embodiments, the conversion comprises encoding the video into the bitstream. In some embodiments, the conversion comprises decoding the bitstream to generate the video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
performing a conversion between a current block of a video and a bitstream of the video according to a rule,
wherein the rule specifies that whether a transform skip mode is applied to the current block is determined based on coding information of the current block, wherein the transform skip mode is a coding mode in which a transform is skipped on a prediction residual of a video block,
wherein the coding information includes whether a subblock transform (SBT) is applicable to a coding unit including the current block, whether the current block is coded in an inter mode and whether the current block has a width and a height smaller than a threshold, and
wherein the transform skip mode is applied to the current block when the following are met: a value of a higher level enable syntax element indicates that transform skip mode is enabled, the current block has a width and a height smaller than the threshold, the current block is coded in the inter mode and the SBT is applicable to the current block.

2. The method of claim 1, wherein the determining is further based on a higher level enable syntax element included in a sequence parameter set.

3. The method of claim 1, wherein the determining is further based on a higher level enable syntax element included in a picture header, a sequence header, a picture parameter set, a video parameter set, or a slice header.

4. The method of claim 1, wherein the threshold is equal to 64.

5. The method of claim 1, wherein the transform skip mode is applied to the current block further when the following are met: a value of a higher level enable syntax element indicates that the transform skip mode is enabled, a coding unit including the current block is not coded in a direct mode, the current block has a width and a height smaller than the threshold, the current block is coded in the inter mode, and the SBT is not applicable to the current block.

6. The method of claim 1, wherein the current block is a transform block.

7. The method of claim 1, wherein the conversion comprises encoding the video into the bitstream.

8. The method of claim 1, wherein the conversion comprises decoding the video from the bitstream.

9. An apparatus for processing video data comprising a processor and a non-transitory memory with instructions thereon, wherein the instructions upon execution by the processor, cause the processor to:

perform a conversion between a current block of a video and a bitstream of the video according to a rule, wherein the rule specifies that whether a transform skip mode is applied to the current block is determined based on coding information of the current block, wherein the transform skip mode is a coding mode in which a transform is skipped on a prediction residual of a video block, wherein the coding information includes whether a sub-block transform (SBT) is applicable to a coding unit including the current block, whether the current block is coded in an inter mode and whether the current block has a width and a height smaller than a threshold, and wherein the transform skip mode is applied to the current block when the following are met: a value of a higher level enable syntax element indicates that transform skip mode is enabled, the current block has a width and a height smaller than the threshold, the current block is coded in the inter mode and the SBT is applicable to the current block.

10. The apparatus of claim 9, wherein the determining is further based on a higher level enable syntax element included in a sequence parameter set.

11. The apparatus of claim 9, wherein the determining is further based on a higher level enable syntax element included in a picture header, a sequence header, a picture parameter set, a video parameter set, or a slice header.

12. The apparatus of claim 9, wherein the threshold is equal to 64.

13. The apparatus of claim 9, wherein the transform skip mode is applied to the current block further when the following are met: a value of a higher level enable syntax element indicates that the transform skip mode is enabled, a coding unit including the current block is not coded in a direct mode, the current block has a width and a height smaller than the threshold, the current block is coded in the inter mode, and the SBT is not applicable to the current block.

14. The apparatus of claim 9, wherein the current block is a transform block.

15. A non-transitory computer-readable storage medium storing instructions that cause a processor to:

perform a conversion between a current block of a video and a bitstream of the video according to a rule, wherein the rule specifies that whether a transform skip mode is applied to the current block is determined based on coding information of the current block, wherein the transform skip mode is a coding mode in which a transform is skipped on a prediction residual of a video block, wherein the coding information includes whether a sub-block transform (SBT) is applicable to a coding unit including the current block, whether the current block is coded in an inter mode and whether the current block has a width and a height smaller than a threshold, and wherein the transform skip mode is applied to the current block when the following are met:

a value of a higher level enable syntax element indicates that transform skip mode is enabled, the current block has a width and a height smaller than the threshold, the current block is coded in the inter mode and the SBT is applicable to the current block.

16. The non-transitory computer-readable storage medium of claim 15, wherein the determining is further based on a higher level enable syntax element included in a sequence parameter set.

17. A non-transitory computer-readable recording medium storing a bitstream of a video which is generated by a method performed by a video processing apparatus, wherein the method comprises:

generating, for a current block of the video, the bitstream of the video according to a rule, wherein the rule specifies that whether a transform skip mode is applied to the current block is determined based on coding information of the current block, wherein the transform skip mode is a coding mode in which a transform is skipped on a prediction residual of a video block, wherein the coding information includes whether a sub-block transform (SBT) is applicable to a coding unit including the current block, whether the current block is coded in an inter mode and whether the current block has a width and a height smaller than a threshold, and wherein the transform skip mode is applied to the current block when the following are met: a value of a higher level enable syntax element indicates that transform skip mode is enabled, the current block has a width and a height smaller than the threshold, the current block is coded in the inter mode and the SBT is applicable to the current block.

18. The non-transitory computer-readable recording medium of claim 17, wherein the determining is further based on a higher level enable syntax element included in a sequence parameter set.

* * * * *